(12) United States Patent
Gaither et al.

(10) Patent No.: US 12,713,202 B2
(45) Date of Patent: Aug. 18, 2026

(54) CONTEXT-AWARE CONTENT DELIVERY FOR ELECTRIC VEHICLES AT CHARGING STATIONS

(71) Applicant: TOYOTA MOTOR NORTH AMERICA, INC., Plano, TX (US)

(72) Inventors: Geoffrey David Gaither, Ann Arbor, MI (US); James G. Swartz, Prosper, TX (US); Frederick W. Mau, Plano, TX (US)

(73) Assignees: TOYOTA MOTOR NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/809,773

(22) Filed: Aug. 20, 2024

(65) Prior Publication Data

US 2025/0068441 A1 Feb. 27, 2025

Related U.S. Application Data

(60) Provisional application No. 63/578,042, filed on Aug. 22, 2023.

(51) Int. Cl.
*B60L 53/60* (2019.01)
*B60L 53/30* (2019.01)
(Continued)

(52) U.S. Cl.
CPC ........... *H04W 4/021* (2013.01); *B60L 53/305* (2019.02); *B60L 53/62* (2019.02); *B60L 53/64* (2019.02);
(Continued)

(58) Field of Classification Search
None
See application file for complete search history.

(56) References Cited

U.S. PATENT DOCUMENTS 9,448,083 B2 * 9/2016 Loftus ................ G01C 21/3469
11,176,577 B2 * 11/2021 Kaneichi ............ G06Q 30/0265
(Continued)

FOREIGN PATENT DOCUMENTS

DE 102022115122 A1 12/2023
JP 2013188003 A 9/2013
KR 20210036178 A 4/2021

OTHER PUBLICATIONS

International Search Report and Written Opinion issued in the International Application No. PCT/US24/43503, mailed on Oct. 31, 2024.

*Primary Examiner* — Jonathan M Dager

(57) ABSTRACT

An example operation includes one or more of receiving a request for charge from a vehicle from a software application on the vehicle, where the request comprises an identifier of a destination of the vehicle and a state of charge (SOC) of the vehicle, determining a charging time for the vehicle at a charging station based on the SOC, dynamically selecting content from among a database of content based on the destination and the charging time, detecting the vehicle performing a charging operation at the charging station, and delivering the dynamically selected content to a graphical user interface (GUI) of the software application while the vehicle is performing the charging operation.

20 Claims, 36 Drawing Sheets

(51) Int. Cl.

| | |
|---|---|
| ***B60L 53/62*** | (2019.01) |
| ***B60L 53/64*** | (2019.01) |
| ***B60L 53/65*** | (2019.01) |
| ***B60L 53/66*** | (2019.01) |
| ***B60L 53/68*** | (2019.01) |
| ***G06F 3/14*** | (2006.01) |
| ***G06F 9/451*** | (2018.01) |
| ***G06N 20/00*** | (2019.01) |
| ***G06Q 50/06*** | (2012.01) |
| ***G06V 20/62*** | (2022.01) |
| ***G07C 5/02*** | (2006.01) |
| ***G07C 5/08*** | (2006.01) |
| ***H04L 67/12*** | (2022.01) |
| ***H04N 21/414*** | (2011.01) |
| ***H04W 4/021*** | (2018.01) |
| ***H04W 4/44*** | (2018.01) |
| *B60L 55/00* | (2019.01) |
| *B60L 58/12* | (2019.01) |
| *G06F 3/16* | (2006.01) |
| *G06Q 30/0251* | (2023.01) |
| *G07C 11/00* | (2006.01) |

(52) U.S. Cl.

CPC ............... *B60L 53/65* (2019.02); *B60L 53/66* (2019.02); *B60L 53/665* (2019.02); *B60L 53/68* (2019.02); *G06F 3/1423* (2013.01); *G06F 9/451* (2018.02); *G06N 20/00* (2019.01); *G06Q 50/06* (2013.01); *G06V 20/625* (2022.01); *G07C 5/02* (2013.01); *G07C 5/0816* (2013.01); *H04L 67/12* (2013.01); *H04N 21/41422* (2013.01); *H04W 4/44* (2018.02); *B60L 55/00* (2019.02); *B60L 58/12* (2019.02); *B60L 2240/72* (2013.01); *B60L 2250/16* (2013.01); *G06F 3/167* (2013.01); *G06Q 30/0266* (2013.01); *G06V 2201/08* (2022.01); *G07C 2011/04* (2013.01)

(56) References Cited

U.S. PATENT DOCUMENTS

| | | | | |
|---|---|---|---|---|
| 11,392,988 | B1 * | 7/2022 | Isgar | H04W 4/46 |
| 11,796,340 | B2 * | 10/2023 | Goei | B60L 53/62 |
| 11,991,218 | B2 * | 5/2024 | Jacobs | B60L 53/305 |
| 11,993,245 | B2 * | 5/2024 | Schoenherr | B60L 53/00 |
| 12,148,004 | B2 * | 11/2024 | Logvinov | G06Q 30/0268 |
| 12,211,069 | B2 * | 1/2025 | Isgar | H04W 4/90 |
| 12,483,762 | B2 * | 11/2025 | George | H04N 21/41422 |
| 2008/0312788 | A1 | 12/2008 | Aulakh et al. | |
| 2011/0204847 | A1 * | 8/2011 | Turner | B60L 53/14 320/109 |
| 2012/0197690 | A1 * | 8/2012 | Agulnek | G06Q 30/0261 705/14.1 |
| 2013/0124320 | A1 * | 5/2013 | Karner | G06Q 10/02 705/14.57 |
| 2013/0162221 | A1 * | 6/2013 | Jefferies | B60L 53/11 320/155 |
| 2014/0250168 | A1 | 9/2014 | Damola et al. | |
| 2014/0258457 | A1 * | 9/2014 | Han | G07F 15/003 709/217 |
| 2015/0226567 | A1 * | 8/2015 | North | G01C 21/3469 701/533 |
| 2016/0042401 | A1 * | 2/2016 | Menendez | G06Q 30/0269 705/14.43 |
| 2017/0208363 | A1 | 7/2017 | Glazier et al. | |
| 2018/0065494 | A1 * | 3/2018 | Mastrandrea | G06Q 10/02 |
| 2018/0370379 | A1 * | 12/2018 | Chen | B60L 53/665 |
| 2019/0126767 | A1 * | 5/2019 | Sakuma | G08G 1/143 |
| 2019/0130451 | A1 * | 5/2019 | Logvinov | G06Q 30/0268 |
| 2020/0406771 | A1 | 12/2020 | Okumura | |
| 2022/0016999 | A1 | 1/2022 | Burk et al. | |
| 2023/0134076 | A1 | 5/2023 | Komich | |
| 2023/0384105 | A1 * | 11/2023 | Hu | B60L 50/60 |
| 2024/0190289 | A1 * | 6/2024 | Bove, Jr. | H04N 21/41422 |
| 2024/0196038 | A1 * | 6/2024 | Bove, Jr. | H04N 21/41407 |
| 2025/0065758 | A1 * | 2/2025 | Yang | G06F 3/1423 |
| 2025/0065765 | A1 * | 2/2025 | Gaither | G06F 3/1423 |
| 2025/0071363 | A1 * | 2/2025 | Wilder | G06F 3/1423 |
| 2025/0071510 | A1 * | 2/2025 | Yang | G06F 3/1423 |
| 2025/0252141 | A1 * | 8/2025 | Yang | B60L 53/68 |
| 2025/0256605 | A1 * | 8/2025 | Gaither | B60L 53/62 |
| 2025/0269276 | A1 * | 8/2025 | Gaither | H04W 4/40 |

* cited by examiner

100A 100B
140
Server
Content DB
130
131
132
133
134
135
N
120
Charging Station
122
133
117
GUI
118
Mobile Device
113
GUI
114
GUI
116
110
Vehicle

100C

100D

140
Server
142
Access Code
117
GUI 118
Access Code
Mobile Device
110
Vehicle
Terminate
120
Charging Station

700B
User Profile 732
730
Server
Sensor Data
Sensor Data
710
Vehicle
726
728
724
GeoFence
720
Charging Station 700C
730
Server
Content
A
Content
B
710
Vehicle
(T1)
GeoFence
710
Vehicle
(T2)
720

800C

820
Server
Confirm
830
Incentive
Vehicle
810
Reservations 822
8:00 AM
Vehicle A
9:00 AM
Vehicle B
10:00 AM
Vehicle 810
6:00 PM
Vehicle N
824

Figure 9B:
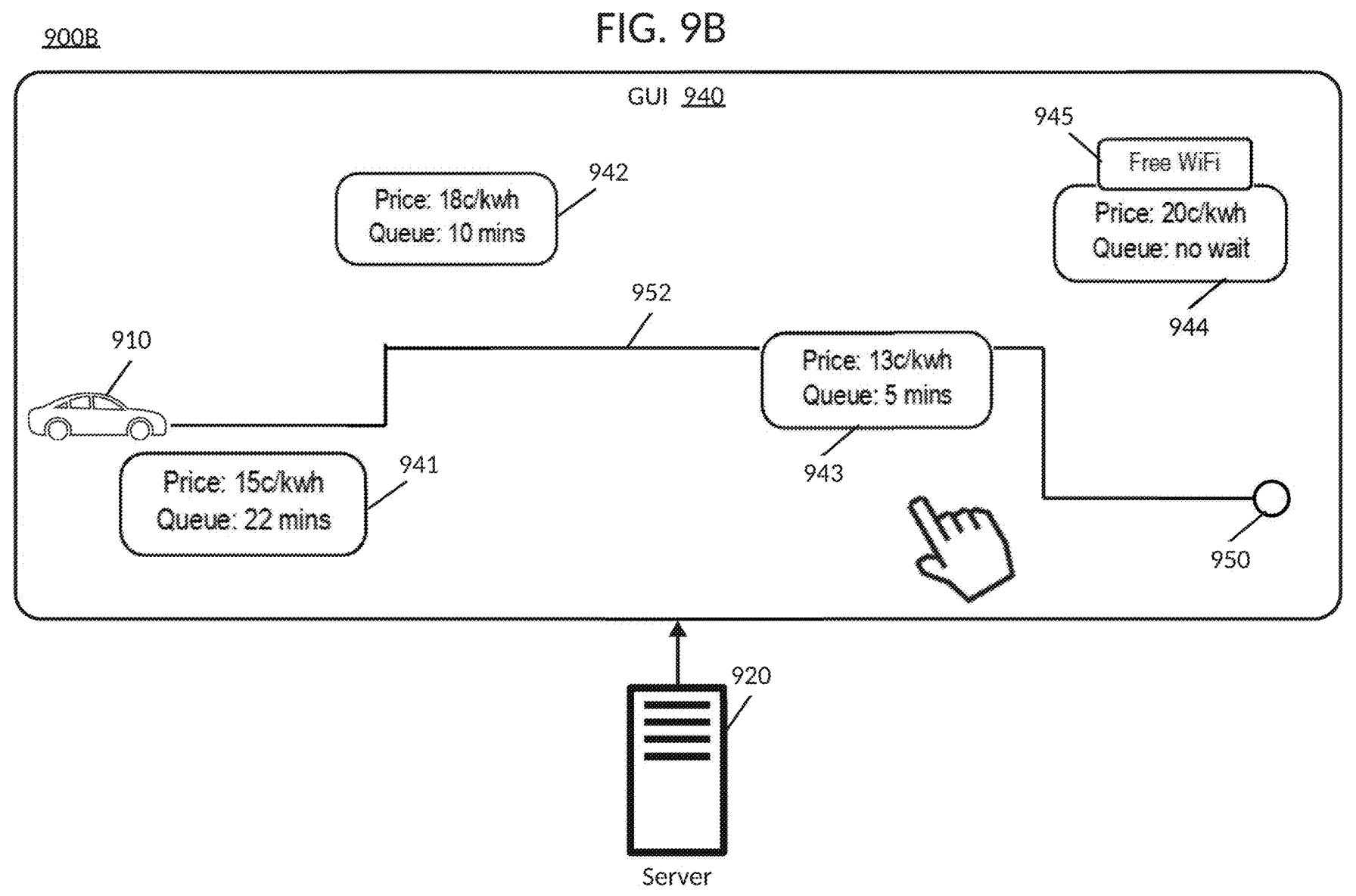

GUI 940

Free WiFi

945

Price: 20c/kwh
Queue: no wait

944

950

Price: 18c/kwh
Queue: 10 mins

942

952

Price: 13c/kwh
Queue: 5 mins

943

Price: 15c/kwh
Queue: 22 mins

941

910

920

Server

CONTEXT-AWARE CONTENT DELIVERY FOR ELECTRIC VEHICLES AT CHARGING STATIONS

CROSS-REFERENCE TO RELATED APPLICATIONS

This application claims priority to U.S. Provisional Patent Application No. 63/578,042, filed on Aug. 22, 2023 and is related to co-pending U.S. Non-Provisional Application titled "Geofence-Triggered Content Delivery for Electric Vehicles at Charging Stations", filed on Aug. 20, 2024, U.S. Non-Provisional Application titled "Reservation-Linked Content Delivery to Electric Vehicles at Charging Stations", filed on Aug. 20, 2024, and U.S. Non-Provisional Application titled "Dynamic Queue Management for Optimized Electric Vehicle Charging Station Selection", filed Aug. 20, 2024, the entire disclosures of which are incorporated by reference herein.

BACKGROUND

Vehicles or transports, such as cars, motorcycles, trucks, planes, trains, etc., generally provide transportation to occupants and/or goods in a variety of ways. Functions related to vehicles may be identified and utilized by various computing devices, such as a smartphone or a computer located on and/or off the vehicle.

SUMMARY

The instant solution provides a method that includes one or more of receiving a request for charge from a vehicle from a software application on the vehicle, where the request comprises an identifier of a destination of the vehicle and a state of charge (SOC) of the vehicle, determining a charging time for the vehicle at a charging station based on the SOC, dynamically selecting content from among a database of content based on the destination and the charging time, detecting the vehicle performing a charging operation at the charging station, and delivering the dynamically selected content to a graphical user interface (GUI) of the software application while the vehicle is performing the charging operation.

The instant solution also provides a system that includes a memory communicably coupled to at least one processor, wherein the at least one processor is configured to perform one or more of receive a request for charge from a vehicle from a software application on the vehicle, where the request comprises an identifier of a destination of the vehicle and a state of charge (SOC) of the vehicle, determine a charging time for the vehicle at a charging station based on the SOC, dynamically select content from among a database of content based on the destination and the charging time, detect the vehicle performing a charging operation at the charging station, and deliver the dynamically selected content to a graphical user interface (GUI) of the software application while the vehicle is performing the charging operation.

The instant solution further provides a computer-readable storage medium comprising instructions, that when read by a processor, cause the processor to perform one or more of receiving a request for charge from a vehicle from a software application on the vehicle, where the request comprises an identifier of a destination of the vehicle and a state of charge (SOC) of the vehicle, determining a charging time for the vehicle at a charging station based on the SOC, dynamically selecting content from among a database of content based on the destination and the charging time, detecting the vehicle performing a charging operation at the charging station, and delivering the dynamically selected content to a graphical user interface (GUI) of the software application while the vehicle is performing the charging operation.

BRIEF DESCRIPTION OF THE DRAWINGS

FIG. 5F illustrates an example of a new data block, according to an example of the instant solution.

FIGS. 9A-9C are diagrams illustrating a process of providing real-time visibility into charging station attributes according to examples of the instant solution.

DETAILED DESCRIPTION

Figure 1A:
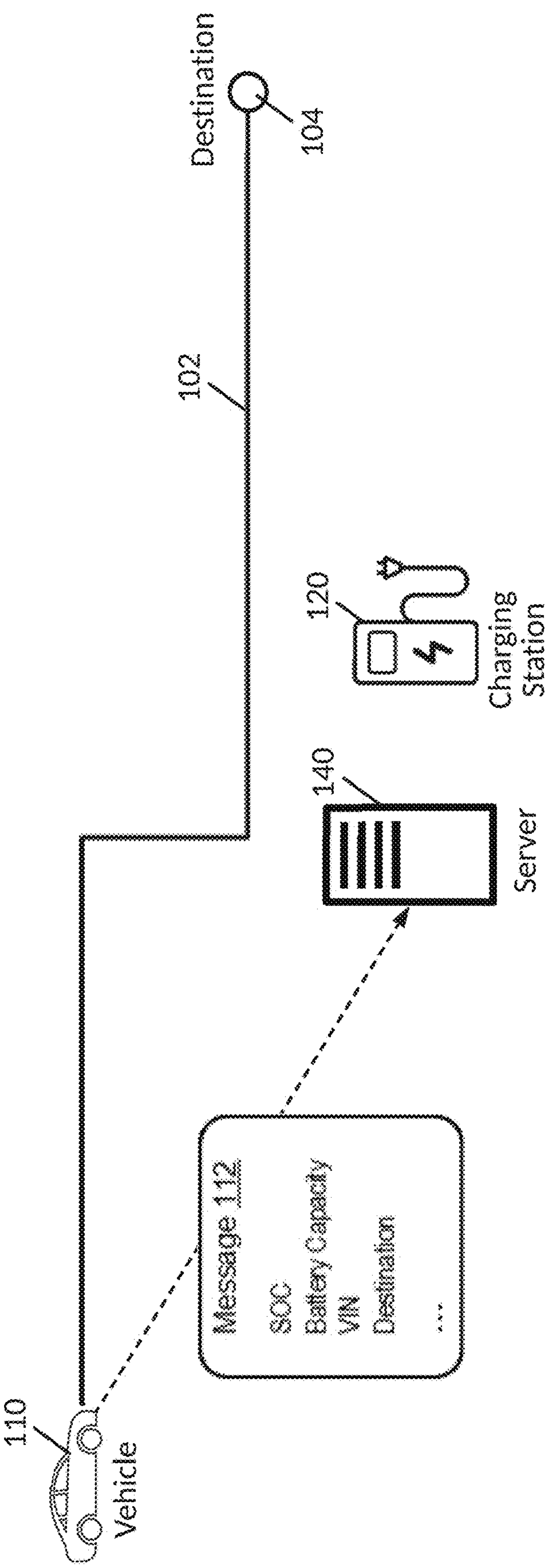
FIG. 1A is a diagram illustrating a process of a vehicle requesting a charging operation at a charging station according to an example of the instant solution.

It will be readily understood that the instant components, as generally described and illustrated in the figures herein, may be arranged and designed in a wide variety of different configurations. Thus, the following detailed description of the instant solution of at least one of a method, apparatus, computer-readable storage medium system, and other element, structure, component, or device as represented in the attached figures, is not intended to limit the scope of the application as claimed but is merely representative of aspects of the instant solution.

Communications between the vehicle(s) and certain entities, such as remote servers, other vehicles, and local computing devices (e.g., smartphones, personal computers, vehicle-embedded computers, etc.) may be sent and/or received and processed by one or more 'components' which may be hardware, firmware, software, or a combination thereof. The components may be part of any of these entities or computing devices or certain other computing devices. In one example, consensus decisions related to blockchain transactions may be performed by one or more computing devices or components (which may be any element described and/or depicted herein) associated with the vehicle(s) and one or more of the components outside or at a remote location from the vehicle(s).

The instant features, structures, or characteristics described in this specification may be combined in any suitable manner in the instant solution. Thus, the one or more features, structures, or characteristics of the instant solution, described or depicted in this specification, are utilized in various manners. Thus, the one or more features, structures, or characteristics of the instant solution may work in conjunction with one another, may not be functionally separate, and these features, structures, or characteristics may be combined in any suitable manner. Although presented in a particular manner, by example only, one or more feature(s), element(s), and step(s) described or depicted herein may be utilized together and in various combinations, without exclusivity, unless expressly indicated otherwise herein. In the figures, any connection between elements (for example, a line or an arrow) can permit one-way and/or two-way communication, even if the depicted connection shown is a one-way or two-way connection.

In the instant solution, a vehicle may include one or more of cars, trucks, Internal Combustion Engine (ICE) vehicles, battery electric vehicle (BEV), fuel cell vehicles, any vehicle utilizing renewable sources, hybrid vehicles, e-Palettes, buses, motorcycles, scooters, bicycles, boats, recreational vehicles, planes, drones, Unmanned Aerial Vehicles and any object that may be used to transport people and/or goods from one location to another.

In addition, while the term "message" may have been used in the description of method, apparatus, computer-readable storage medium system, and other element, structure, component, or device, other types of network data, such as, a packet, frame, datagram, etc. may also be used. Furthermore, while certain types of messages and signaling may be depicted in exemplary configurations they are not limited to a certain type of message and signaling.

Example configurations of the instant solution provide methods, systems, components, non-transitory computer-readable storage mediums, devices, and/or networks, which provide at least one of a transport (also referred to as a vehicle or car herein), a data collection system, a data monitoring system, a verification system, an authorization system, and a vehicle data distribution system. The vehicle status condition data received in the form of communication messages, such as wireless data network communications and/or wired communication messages, may be processed to identify vehicle status conditions and provide feedback on the condition and/or changes of a vehicle. In one example, a user profile may be applied to a particular vehicle to authorize a current vehicle event, service stops at service stations, to authorize subsequent vehicle rental services, and enable vehicle-to-vehicle communications.

An instant method, apparatus, computer-readable storage medium system, and other element, structure, component, or device provides a service to a particular vehicle and/or a user profile that is applied to the vehicle. For example, a user may be the owner of a vehicle or the operator of a vehicle owned by another party. The vehicle may require service at certain intervals, and the service needs may require authorization before permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more vehicle and/or road sensors or cameras, which report sensed data to a central controller computer device in and/or apart from the vehicle. This data is forwarded to a management server for review and action. A sensor may be located on one or more of the interior of the vehicle, the exterior of the vehicle, on a fixed object apart from the vehicle, and/or on another vehicle proximate the vehicle. The sensor may also be associated with the vehicle's speed, the vehicle's braking, the vehicle's acceleration, fuel levels, service needs, the gear-shifting of the vehicle, the vehicle's steering, and the like. A sensor, as described herein, may also be a device, such as a wireless device in and/or proximate to the vehicle. Also, sensor information may be used to identify whether the vehicle is operating safely and whether an occupant has engaged in any unexpected vehicle conditions, such as during a vehicle access and/or utilization period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group.

Each interested party (i.e., owner, user, company, agency, etc.) may want to limit the exposure of private information, and therefore the blockchain and its immutability can be used to manage permissions for each user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a consensus approach associated with the blockchain. Such an approach may not be implemented on a traditional centralized database.

Various driving systems of the instant solution can utilize software, an array of sensors as well as machine learning functionality, light detection and ranging (LiDAR) projectors, radar, ultrasonic sensors, etc. to create a map of terrain and road that a vehicle can use for navigation and other purposes. In some examples of the instant solution, global positioning system (GPS), maps, cameras, sensors, and the like can also be used in autonomous vehicles in place of LiDAR.

The instant solution includes, in certain instant examples, authorizing a vehicle for service via an automated and quick authentication scheme. For example, driving up to a charging station or fuel pump may be performed by a vehicle operator or an autonomous vehicle and the authorization to receive charge or fuel may be performed without any delays provided the authorization is received by the service and/or charging station. A vehicle may provide a communication signal that provides an identification of a vehicle that has a currently active profile linked to an account that is authorized to accept a service, which can be later rectified by compensation. Additional measures may be used to provide further authentication, such as another identifier may be sent from the user's device wirelessly to the service center to replace or supplement the first authorization effort between the vehicle and the service center with an additional authorization effort.

Data shared and received may be stored in a database, which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as having a single storing place of all data and also implies that a given set of data only has one primary record. A decentralized database, such as a blockchain, may be used for storing vehicle-related data and transactions.

Any of the actions described herein may be performed by one or more processors (such as a microprocessor, a sensor, an Electronic Control Unit (ECU), a head unit, and the like), with or without memory, which may be located on-board the vehicle and/or off-board the vehicle (such as a server, computer, mobile/wireless device, etc.). The one or more processors may communicate with other memory and/or other processors on-board or off-board other vehicles to utilize data being sent by and/or to the vehicle. The one or more processors and the other processors can send data, receive data, and utilize this data to perform one or more of the actions described or depicted herein.

The example embodiments are directed to a system that addresses the opportunity to deliver context-specific content to occupants of an electric vehicle (EV) while the vehicle is at a charging station, for example, during the charging process, while waiting in line for a charging station, on approach to the charging station, and the like. The system may leverage the knowledge of key factors such as a destination, estimated charging time, user profiles, and whether users are inside or outside the vehicle. The system gathers data related to the vehicle's journey, such as the destination and route, and combines this information with the estimated time for charging, taking into account factors like the current queue length at the charging station and a charging speed of the charging station. The system may profile users associated with the vehicle, considering their preferences, past behaviors, and demographic information, which may include data about who is present in or near the vehicle.

Based on these inputs, the system dynamically generates and delivers tailored content. This content may include targeted advertisements, relevant news or entertainment options, local area information, and suggestions for activities to perform at the destination, at or around the charging station, or the like, which align with the users' interests or the amount of time they have available while charging. For example, if a user is expected to be at the charging station for an extended period, the system might suggest nearby restaurants, shops, or points of interest. As another example, if the user's destination is a business meeting, the system may deliver related information, such as recent emails, calendar reminders, or traffic updates. Additionally, the solution can adjust the content delivery based on whether users remain in the vehicle or have exited the vehicle. For those still in the vehicle, entertainment or productivity-related content could be prioritized, while users who have left the vehicle might receive content via mobile devices that guide them to nearby attractions or services.

In some embodiments, when the EV arrives at the charging station, the system detects the vehicle's presence and initiates a multi-device content delivery protocol. The system leverages user profiles, historical data, and real-time environmental information to curate a personalized content stream that is dynamically distributed across the user's devices.

For example, as the vehicle begins charging, the in-car infotainment system might display entertainment content, such as movies, music, or podcasts, that align with the user's preferences. Simultaneously, the user's smartphone could receive notifications about local deals, events, or services, tailored to the duration of the charging session and the user's interests. If the system detects that the user is likely to be working during the charging period, it could sync with the user's tablet or laptop, delivering productivity tools, documents, or communication apps to those devices.

FIG. 1A illustrates a process 100A of a vehicle requesting a charging operation at a charging station according to an example of the instant solution. Referring to FIG. 1A, a vehicle 110 may be travelling along a route 102 toward a destination 104. In this example, the vehicle 110 may transmit a message 112 to a server 140 that is associated with a charging station 120 to request charge from the charging station 120 prior to arriving at the charging station 120. For example, the charging station 120 may be located along the route 102 toward the destination 104 of the vehicle 110, however, embodiments are not limited thereto. In this example, the message 112 includes an identifier of a current state of charge (SOC) of a rechargeable battery of the vehicle 110. In addition, the message 112 also includes a total capacity of the rechargeable battery, an identifier of the vehicle 110 (e.g., a vehicle identifier number), an identifier of the destination 104 of the vehicle 110, and the like.

The charging station 120 may include sensors such as cameras, infrared, etc., which can monitor the queues and the wait times at the charging station 120. For example, the charging station 120 may be open/available without any wait time necessary. As another example, the charging station 120 may have a wait at each charging bay thereby requiring a wait of some sort by the vehicle 110. In this example, the server 140 may monitor traffic at the charging station 120 including a current wait time, queue length, charging rate, etc. of the charging station 120, and estimate an amount of time to charge the vehicle 110, for example, from the current SOC to the total capacity, or some ratio of the total capacity. Here, the server 140 may factor in any wait times into the total estimated amount of time because the vehicle will be present at the charging station 120 while waiting in a queue.

Figure 1B:
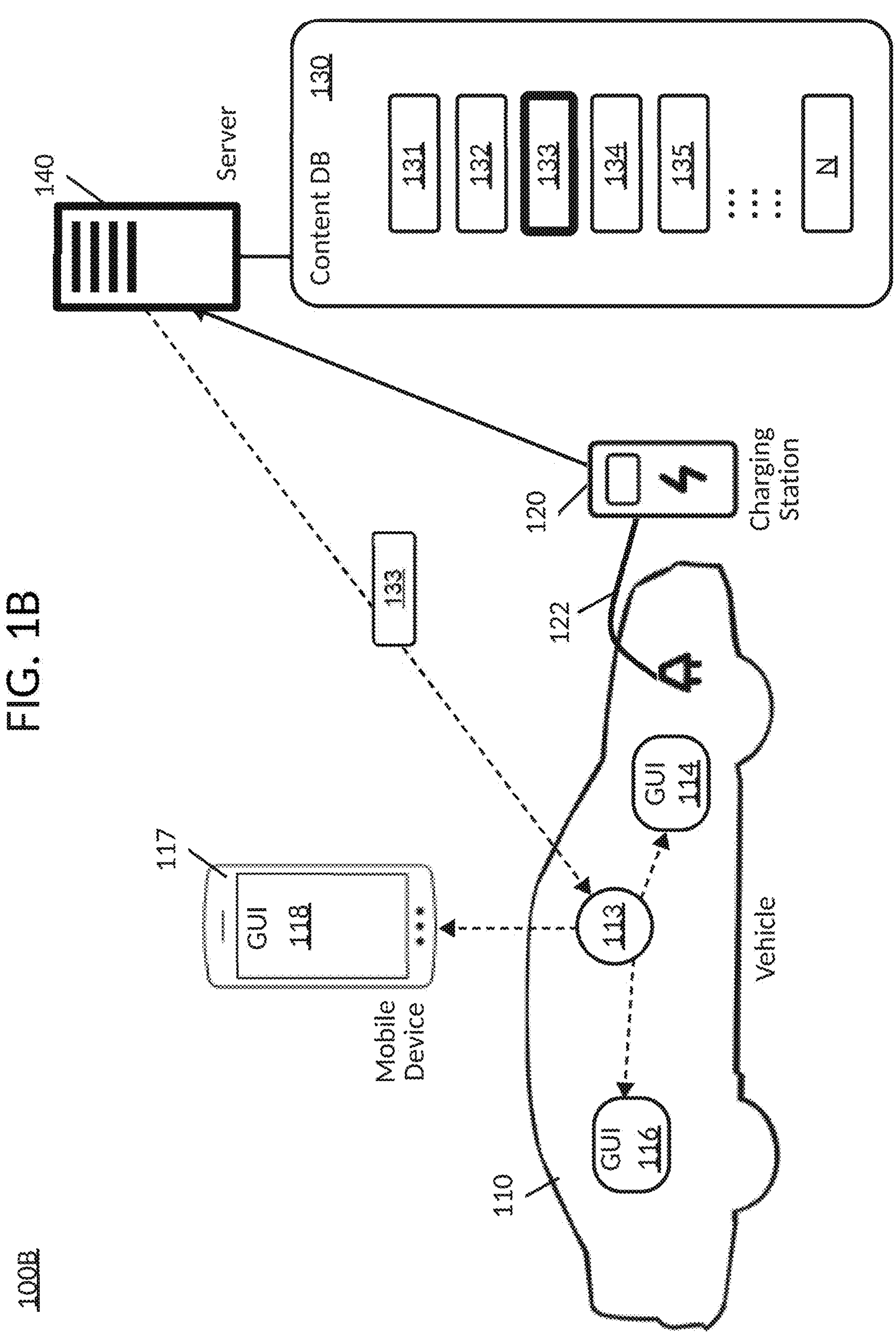
FIG. 1B is a diagram illustrating a process of dynamically selecting content and delivering the content to the vehicle during a charging operation according to an example of the instant solution.

FIG. 1B illustrates a process 100B of dynamically selecting content and delivering the content to the vehicle 110 during a charging operation at the charging station 120 according to an example of the instant solution. Referring to FIG. 1B, the vehicle 110 may arrive at the charging station 120 and plug into a charging point of the charging station 120. For example, the charging station 120 may include a cable 122 with a port at the end thereof which mates with a battery port on the vehicle 110. Here, the vehicle 110 may receive charge from the charging station 120. As another example, the vehicle 110 may provide charge to the charging station 120. Upon detecting the vehicle being plugged into the charging station 120 or otherwise being electrically coupled to the charging station 120 and receiving charge, the charging station 120 may transmit a notification to a server 140 indicating the charging operation is being performed by the vehicle 110.

In response, the server 140 may dynamically select content to deliver to the vehicle 110 from among a content database 130. The content may include movies, music, web pages, news, entertainment, and the like, and may be stored in files. For example, the content database 130 may include a content file 131, a content file 132, a content file 133, a content file 134, a content file 135, and the like. Here, the server 140 may dynamically select content based on the destination 104 of the vehicle 110. For example, the server 140 may select media content, news, entertainment opportunities, restaurant web pages, and the like, as the content to be delivered to the vehicle 110. Furthermore, the server 140 may select the content based on a total charge duration of the vehicle 110. For example, the server 140 may select a television show, a movie, and the like, with a playable duration that is at least as long as the total charge duration of the vehicle 110.

In the example of FIG. 1B, the server 140 selects the content file 133 based on the destination 104 and the estimated charging duration of the vehicle 110 at the charging station 120. In this example, the server delivers the content file 133 for playing by the vehicle 110. Here, the server 140 may transmit the content file, play the content, execute the content, display the content, etc. In some embodiments, the vehicle 110 may include multiple display devices, for example, the vehicle 110 may include a graphical user interface (GUI) 116 embedded within a head rest, a GUI 114 included in the infotainment system, a GUI 118 on a mobile device 117 of an occupant within the vehicle 110, and the like. Here, the server 140 can deliver the content from the content file 133 to any of the display devices. In some embodiments, the server 140 may simultaneously transmit the content from the content file 133 to a plurality of the display devices.

As another example, the server 140 may deliver the content file 133 to a head unit 113 of the vehicle 110, and the head unit 113 may dynamically decide which display device of display devices to play the content. In this example, the head unit 113 may analyze sensor data within the vehicle 110 to identify that the occupant is located in the driver's seat only. In response, the head unit 113 may control the content from the content file 133 to be played on the GUI 114 of the infotainment system which is closest to the occupant location. As another example, if the occupant was in the backseat, the head unit 113 may determine to play the content on the GUI 116 in the head rest of the vehicle 110. As another example, if the occupant is outside of the vehicle 110, the head unit 113 may determine to play the content on the GUI 118 of the mobile device 117.

Figure 1C:
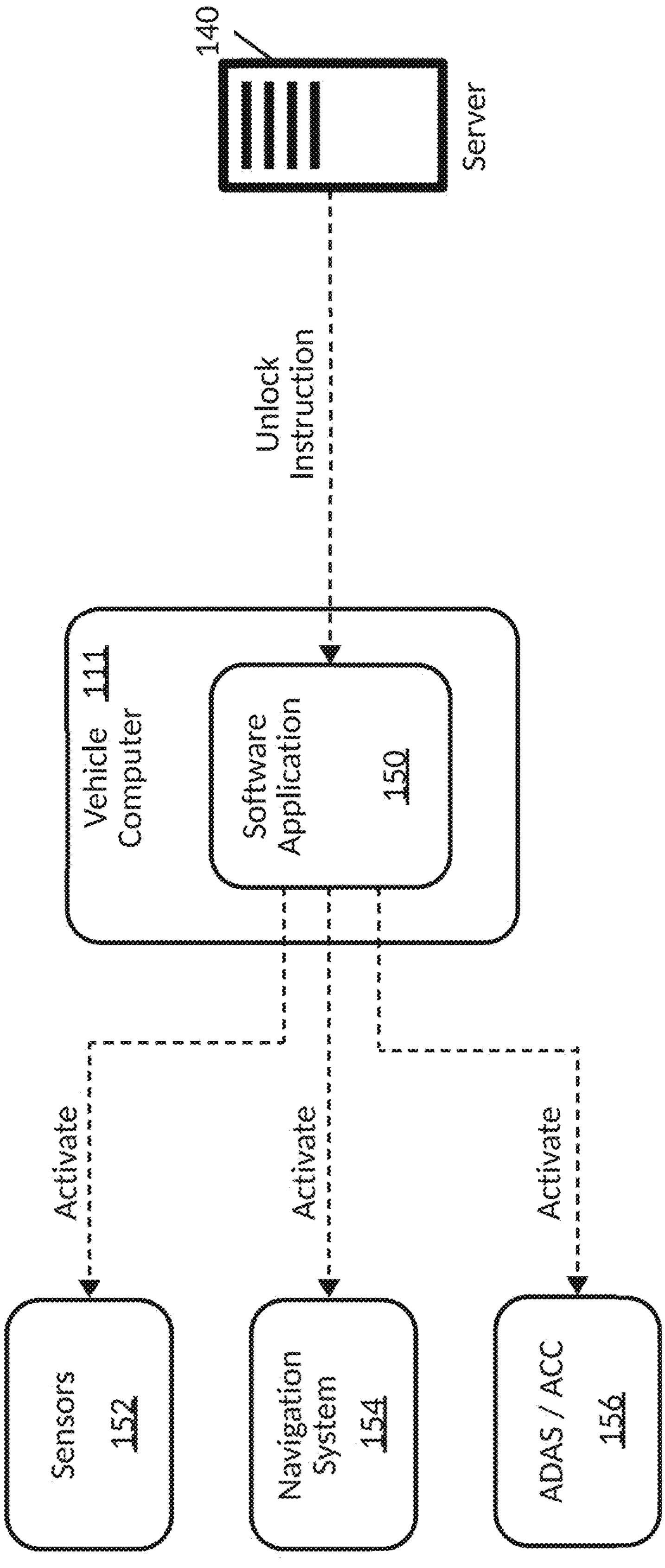
FIG. 1C is a diagram illustrating a process of activating a previously-installed feature within the vehicle according to an example of the instant solution.

FIG. 1C illustrates a process 100C of activating a previously-installed feature within the vehicle according to an example of the instant solution. In the example of FIG. 1B, the content that is delivered to the vehicle 110 is media content, music, web content, etc. As another example, the server 140 may deliver different features, services, etc. to the vehicle 110 during the charging operation with the charging station 120. For example, the server 140 may incentivize the vehicle 110 to perform a charging operation at the charging station 120 by offering to activate a feature that is already installed on the vehicle 110, which just needs to be activated/unlocked.

Referring to FIG. 1C, the server may send an unlock instruction to a software application 150 installed within a vehicle computer 111 of the vehicle 110 shown in FIG. 1B. Here, the unlock instruction may include a software update, a key, passcode, decryption, etc. which the software application 150 can use to unlock/decrypt a software program associated with the installed feature to thereby activate the use of the feature. Examples of such features include sensors 152 that may be activated such as blind spot monitoring sensors, parking sensors, collision warning sensors, and the like. As another example, the features that may be activated may include navigation system features 154 such as new user interface features, map updates, software updates, and the like. As another example, the features that may be activated may include adaptive cruise control (ACC) functionality 156, advanced driver assistance systems (ADAS), and the like.

To activate the feature, the server 140 may instruct the software application 150 to enable use of the feature on the vehicle using software to unlock the feature. This may include codes, serial numbers, keys, passwords, and the like, being entered by the software application 150 into the vehicle features.

Figure 1D:
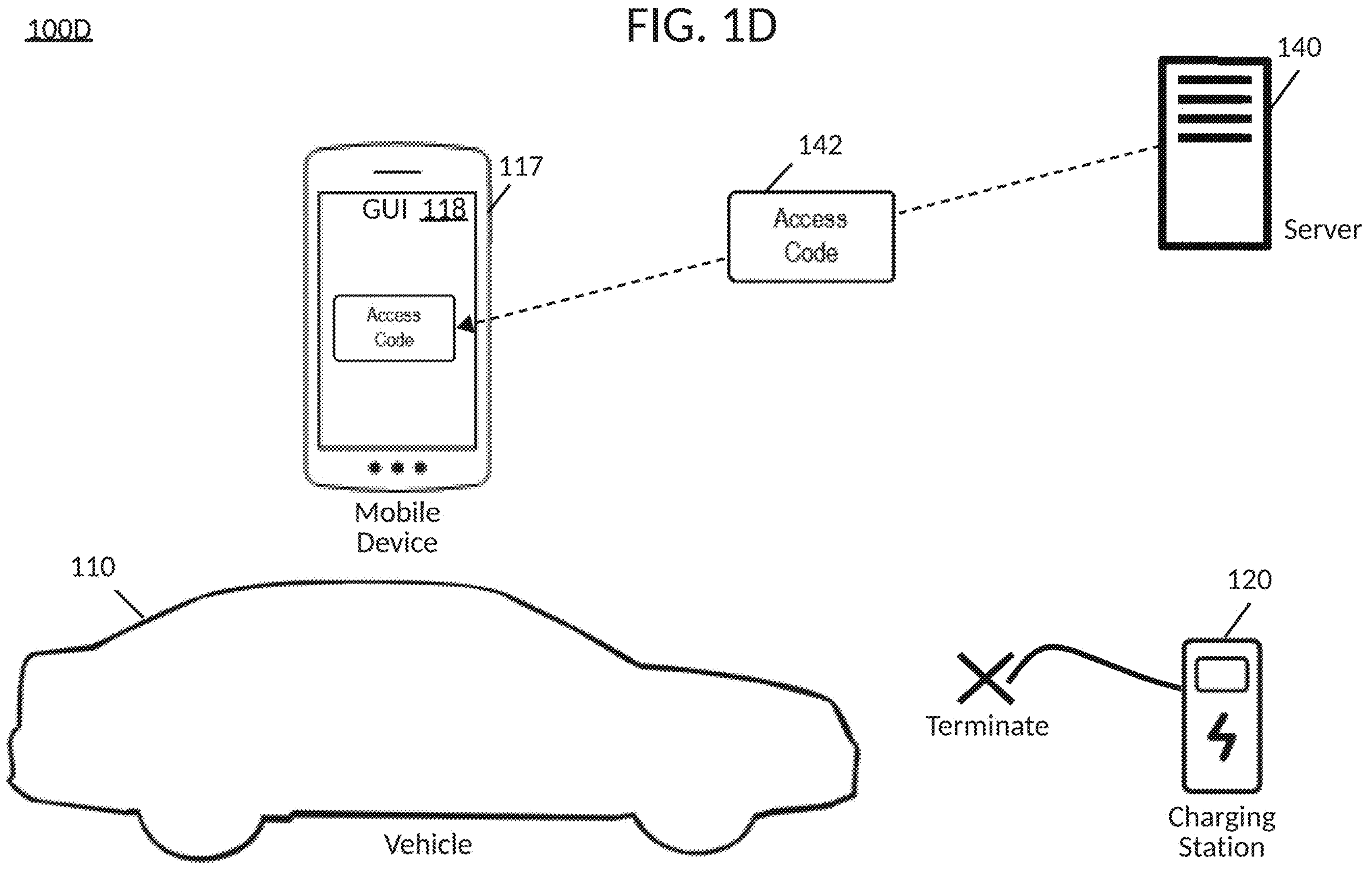
FIG. 1D is a diagram illustrating a process of providing an access code for resuming unfinished content in response to a termination of a charging operation according to an example of the instant solution.

FIG. 1D illustrates a process 100D of providing an access code for resuming unfinished content in response to a termination of a charging operation according to an example of the instant solution. According to various embodiments, the vehicle 110 may terminate a charging operation with the charging station 120 prior to the content being completed/fully played. In this case, the server 140 may detect the termination of the charging operation, for example, based on a message from at least one of the charging station 120 and the vehicle 110. In response, the server 140 may stop the content being delivered to the vehicle 110, and record an identifier of the timestamp or other indicator of the point in time at which the content has been stopped.

According to various embodiments, the server 140 may generate an access code 142 such as a serial number, QR code, bar code, or the like, which can be used to resume the content from the point in time at which the content has been stopped. The server 140 may record the access code 142 with the content, including the timestamp at which the content was stopped in a storage of the server 140. Furthermore, the server 140 may transmit the access code 142 to a GUI of the vehicle 110, for example, the GUI 118 on the mobile device 117 of the occupant of the vehicle 110. In this example, the access code 142 may be used by the mobile device 117 to access the content from the point in time at which it was stopped. For example, the server 140 may provide a web application, website, or the like, with an interface that can be accessed by the mobile device 117. The user may enter the access code 142 into the web application and the access code 142 may be sent to the server 140. In response, the server 140 may resume playing of the content on the GUI 118 of the mobile device 117 (e.g., via the web application, etc.) from the point in time in which the content was stopped on the vehicle 110.

Although the flow diagrams depicted herein, such as FIG. 2C, FIG. 2D, FIG. 2E, and FIG. 2F, may be presented as separate flow diagrams, the steps depicted therein may be utilized in conjunction with one another with departing from the scope of the instant solution. Any of the operations in one flow diagram may be utilized and shared with another flow diagram. No example operation is intended to limit the subject matter of any feature, structure, or characteristic of the instant solution or corresponding claim.

It is important to note that all the flow diagrams and corresponding steps and processes derived from FIG. 2C, FIG. 2D, FIG. 2E, and FIG. 2F may be part of a same process or may share sub-processes/steps with one another thus making the diagrams combinable into a single preferred configuration that does not require any one specific operation but which performs certain operations from one example process and from one or more additional processes. All the example processes are related to the same physical system and can be used separately or interchangeably.

The instant solution can be used in conjunction with one or more types of vehicles: battery electric vehicles, hybrid vehicles, fuel cell vehicles, internal combustion engine vehicles and/or vehicles utilizing renewable sources.

Figure 2A:
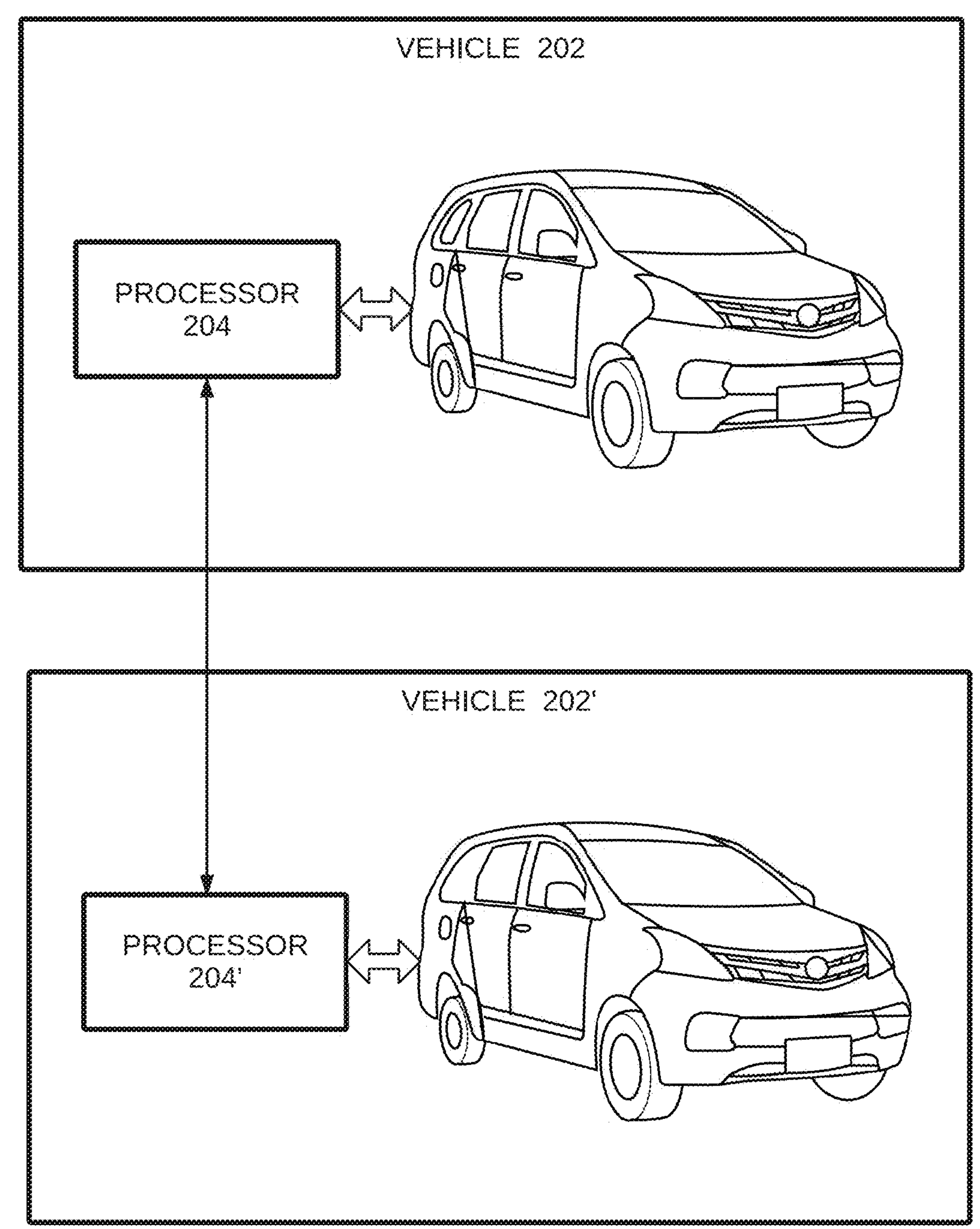
FIG. 2A illustrates a vehicle network diagram, according to an example of the instant solution.

FIG. 2A illustrates a vehicle network diagram 200, according to the instant solution. The network comprises elements including a vehicle 202 including a processor 204, as well as a vehicle 202' including a processor 204'. The vehicles 202, 202' communicate with one another via the processors 204, 204', as well as other elements (not shown) including transceivers, transmitters, receivers, storage, sensors, and other elements capable of providing communication. The communication between the vehicles 202, and 202' can occur directly, via a private and/or a public network (not shown), or via other vehicles and elements comprising one or more of a processor, memory, and/or software. Although depicted as single vehicles and processors, a plurality of vehicles and processors may be present. One or more of the applications, features, steps, solutions, etc., described and/or depicted herein may be utilized and/or provided by the instant elements.

Figure 2B:
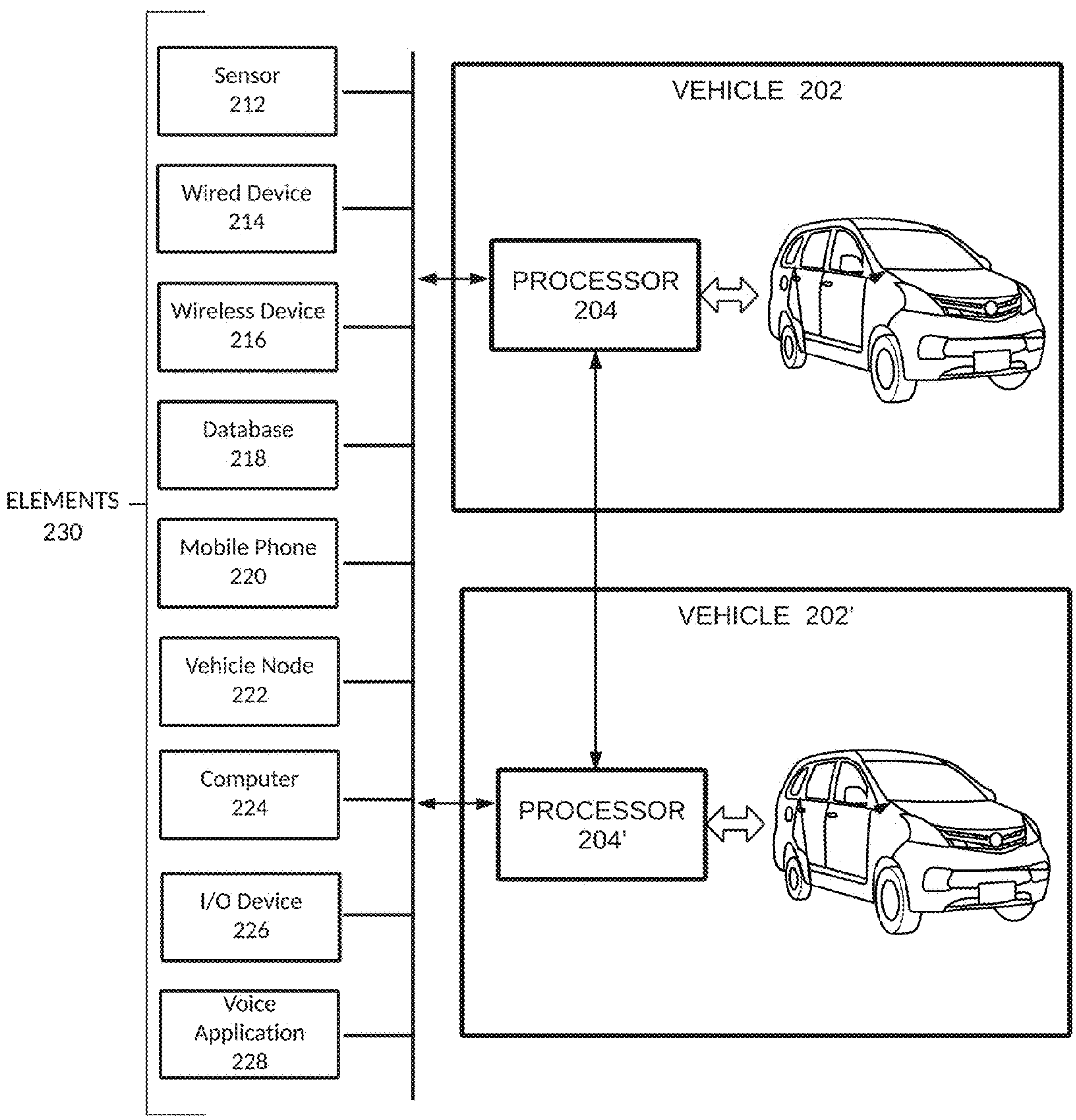
FIG. 2B illustrates another vehicle network diagram, according to an example of the instant solution.

FIG. 2B illustrates another vehicle network diagram 210, according to the instant solution. The network comprises elements including a vehicle 202 including a processor 204, as well as a vehicle 202' including a processor 204'. The vehicles 202, 202' communicate with one another via the processors 204, 204', as well as other elements (not shown), including transceivers, transmitters, receivers, storage, sensors, and other elements capable of providing communication. The communication between the vehicles 202, and 202' can occur directly, via a private and/or a public network (not shown), or via other vehicles and elements comprising one or more of a processor, memory, and software. The processors 204, 204' can further communicate with one or more elements 230 including sensor 212, wired device 214, wireless device 216, database 218, mobile phone 220, vehicle node 222, computer 224, input/output (I/O) device 226, and voice application 228. The processors 204, 204' can further communicate with elements comprising one or more of a processor, memory, and/or software.

Although depicted as single vehicles, processors and elements, a plurality of vehicles, processors and elements may be present. Information or communication can occur to and/or from any of the processors 204, 204' and elements 230. For example, the mobile phone 220 may provide information to the processor 204, which may initiate the vehicle 202 to take an action, may further provide the information or additional information to the processor 204', which may initiate the vehicle 202' to take an action, and may further provide the information or additional information to the mobile phone 220, the vehicle 222, and/or the computer 224. One or more of the applications, features, steps, solutions, etc., described and/or depicted herein may be utilized and/or provided by the instant elements.

Figure 2C:
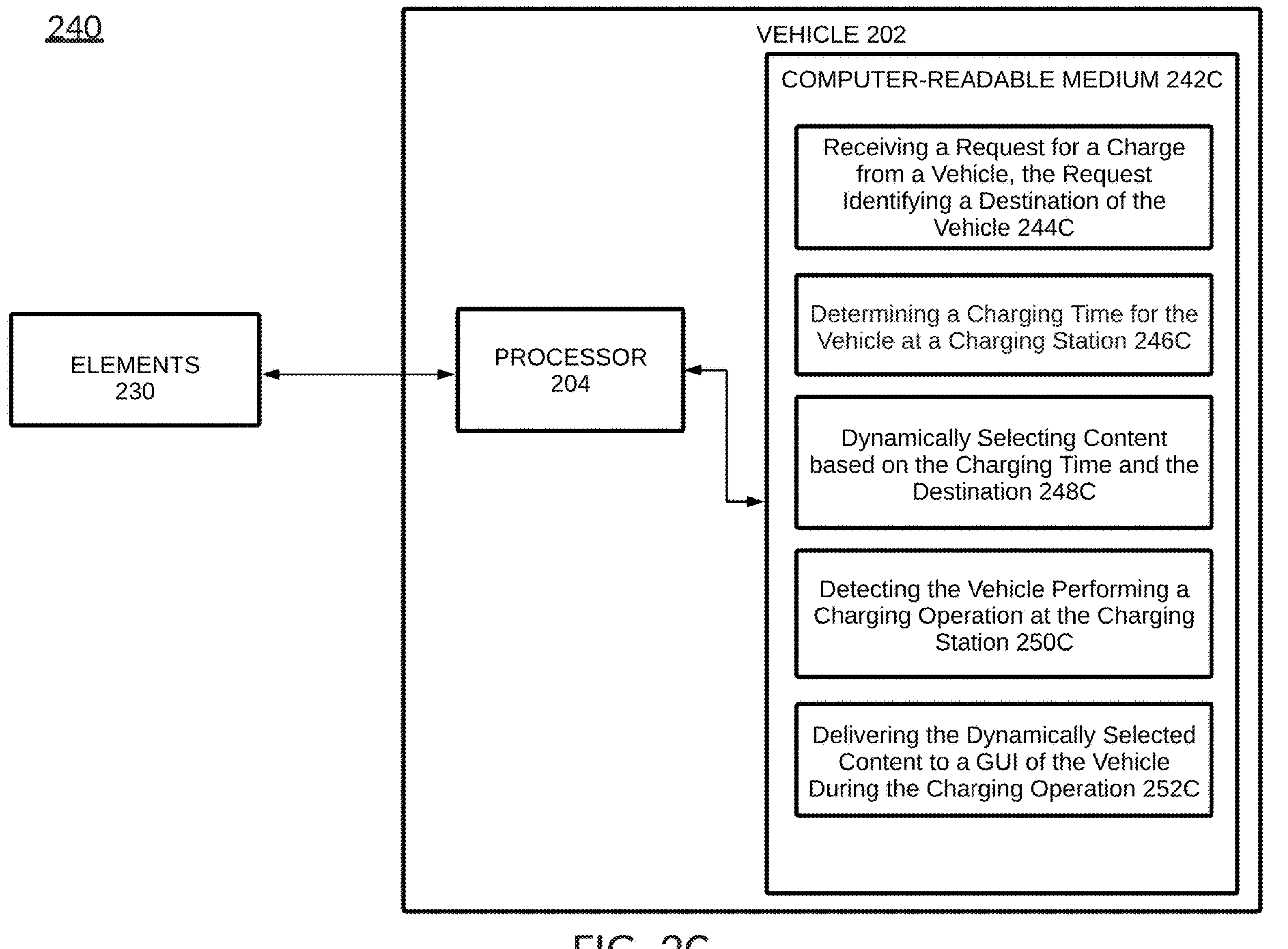
FIG. 2C illustrates yet another vehicle network diagram, according to an example of the instant solution.

FIG. 2C illustrates yet another vehicle network diagram 240, according to the instant solution. The network comprises elements including a vehicle 202, a processor 204, and a non-transitory computer-readable storage medium 242C. The processor 204 is communicably coupled to the non-transitory computer-readable storage medium 242C and elements 230 (which were depicted in FIG. 2B). The vehicle 202 may be a vehicle, server, or any device with a processor and memory.

The processor 204 performs one or more of receiving a request for charge from a vehicle from a software application on the vehicle, where the request comprises an identifier of a destination of the vehicle and a state of charge (SOC) of the vehicle in 244C, determining a charging time for the vehicle at a charging station based on the SOC in 246C, dynamically selecting content from among a database of content based on the destination and the charging time in 248C, detecting the vehicle performing a charging operation at the charging station in 250C, and delivering the dynamically selected content to a graphical user interface (GUI) of the software application while the vehicle is performing the charging operation in 252C.

Figure 2D:
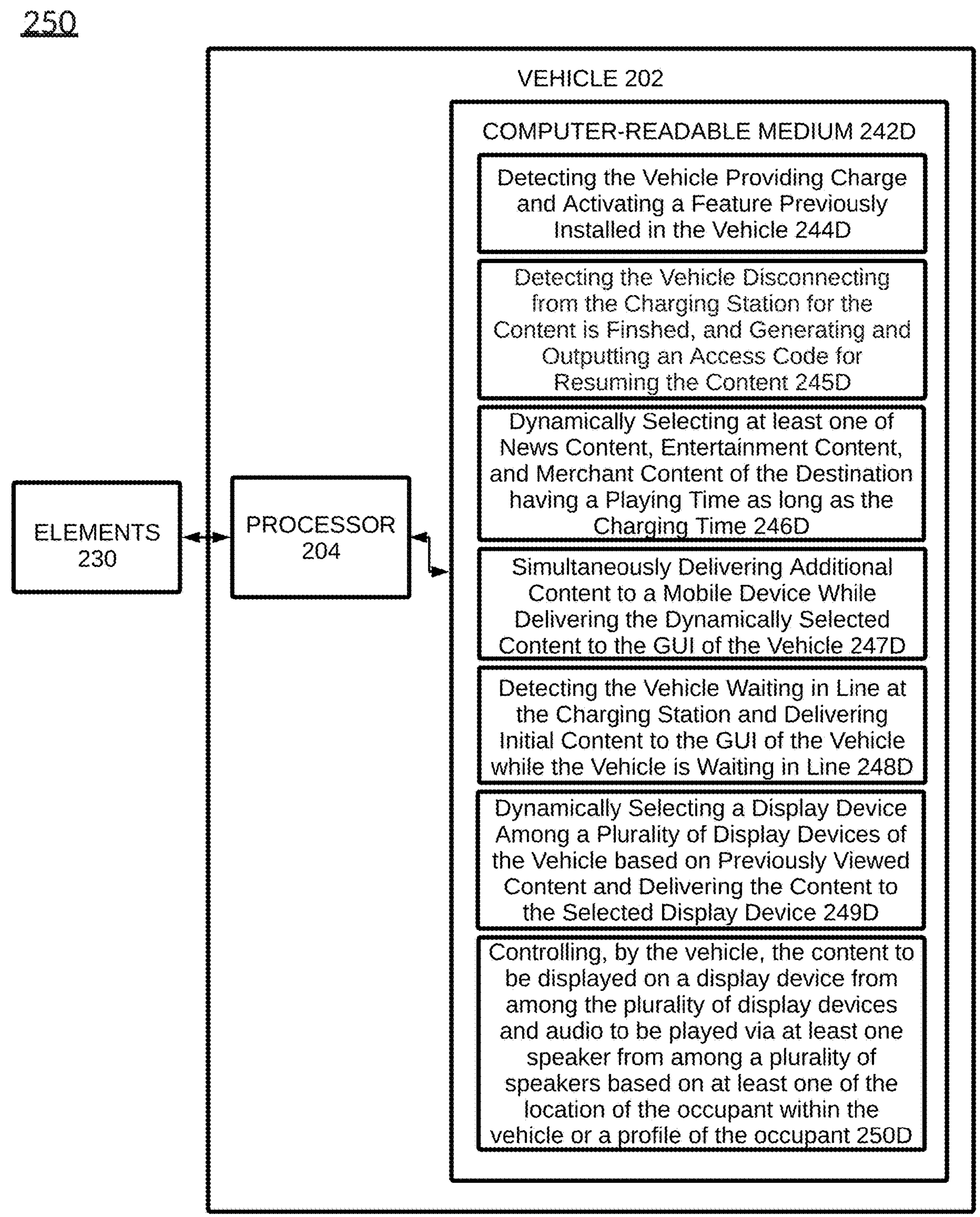
FIG. 2D illustrates a further vehicle network diagram, according to an example of the instant solution.

FIG. 2D illustrates a further vehicle network diagram 250, according to the instant solution. The network comprises elements including a vehicle 202, a processor 204, and a non-transitory computer-readable storage medium 242D. The processor 204 is communicably coupled to the non-transitory computer-readable storage medium 242D and elements 230 (which were depicted in FIG. 2B). The vehicle 202 may be a vehicle, server or any device with a processor and memory.

The processor 204 performs one or more of detecting the vehicle providing charge to the charging station and dynamically activating a previously-installed feature on the vehicle in response to the vehicle providing the charge to the charging station in 244D, dynamically playing content on the GUI of the software application of the vehicle while the vehicle receives charge from the charging station, detecting the vehicle disconnecting from the charging station at a point in time before the dynamically selected content is finished playing, generating an access code for continuing the play of the dynamically selected content from the point in time, and outputting the access code to the GUI of the software application in 245D, dynamically selecting at least one of news content, entertainment content, and merchant content associated with the destination comprising a playing time that is at least as long as the charging time for the vehicle in 246D, simultaneously delivering additional content to a mobile device of an occupant of the vehicle while delivering the dynamically selected content to the GUI of the software application in 247D, detecting the vehicle waiting in line at the charging station prior to detecting the vehicle performing the charging operation, and delivering initial content to the GUI of the software application while the vehicle is waiting in line at the charging station in 248D, receiving previously viewed content from a plurality of display devices on the vehicle and dynamically selecting a display device from among the plurality of display devices within the vehicle based on the previously viewed content, wherein the delivering includes delivering the dynamically selected content to the dynamically selected display device in 249D, and determining a location of an occupant within the vehicle, and controlling, by the vehicle, the content to be displayed on a display device from among the plurality of display devices and audio to be played via at least one speaker from among a plurality of speakers based on at least one of the location of the occupant within the vehicle or a profile of the occupant in 250D.

While this example describes in detail only one vehicle 202, multiple such nodes may be connected, such as via a network or blockchain. It should be understood that the vehicle 202 may include additional components and that some of the components described herein may be removed and/or modified without departing from the scope of the instant application. The vehicle 202 may have a computing device or a server computer, or the like, and may include a processor 204, which may be a semiconductor-based microprocessor, a central processing unit (CPU), an application-specific integrated circuit (ASIC), a field-programmable gate array (FPGA), and/or another hardware device. Although a single processor 204 is depicted, it should be understood that the vehicle 202 may include multiple processors, multiple cores, or the like without departing from the scope of the instant application. The vehicle 202 may be a vehicle, server or any device with a processor and memory.

The processors and/or computer-readable storage medium may fully or partially reside in the interior or exterior of the vehicles. The steps or features stored in the computer-readable storage medium may be fully or partially performed by any of the processors and/or elements in any order. Additionally, one or more steps or features may be added, omitted, combined, performed at a later time, etc.

Figure 2E:
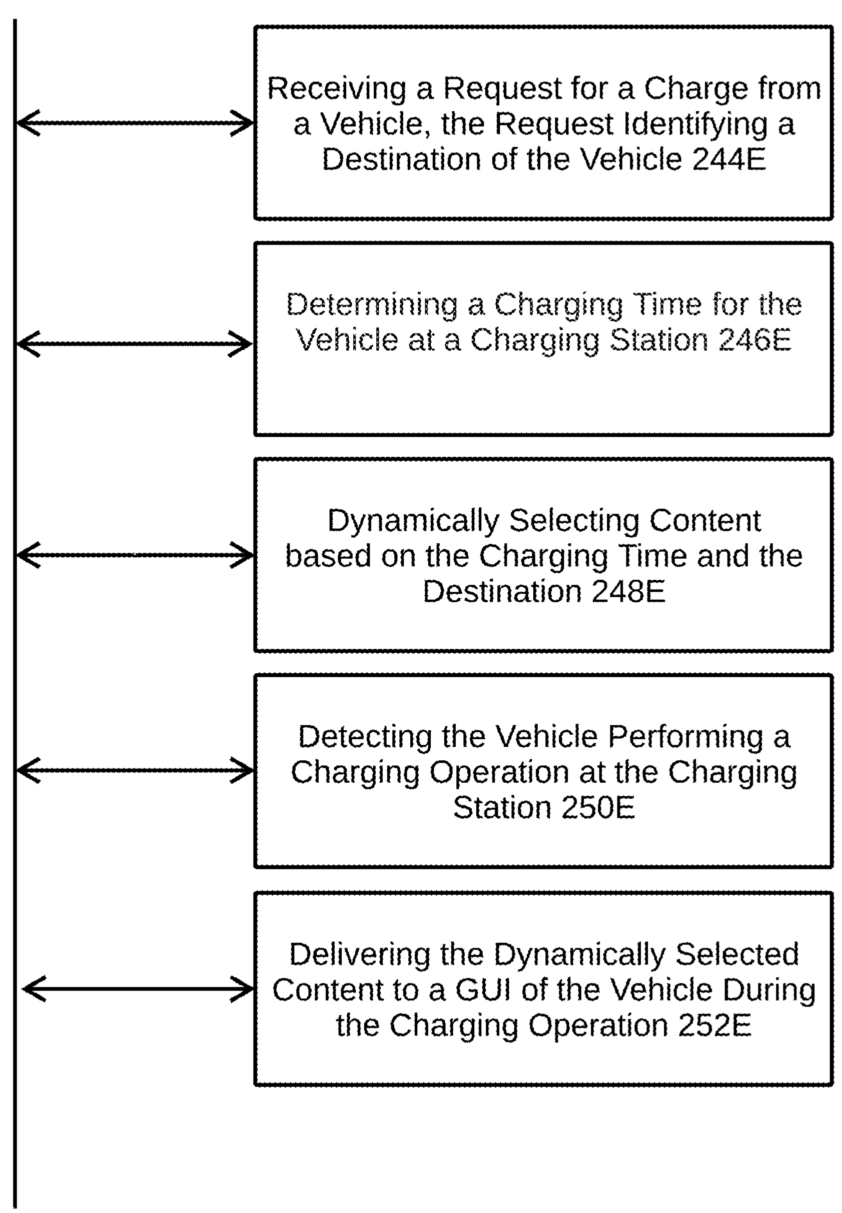
FIG. 2E illustrates a flow diagram, according to an example of the instant solution.

FIG. 2E illustrates a flow diagram 260, according to the instant solution. Referring to FIG. 2E, the instant solution includes one or more of receiving a request for charge from a vehicle from a software application on the vehicle, where the request comprises an identifier of a destination of the vehicle and a state of charge (SOC) of the vehicle in 244E, determining a charging time for the vehicle at a charging station based on the SOC in 246E, dynamically selecting content from among a database of content based on the destination and the charging time in 248E, detecting the vehicle performing a charging operation at the charging station in 250E, and delivering the dynamically selected content to a graphical user interface (GUI) of the software application while the vehicle is performing the charging operation in 252E.

Figure 2F:
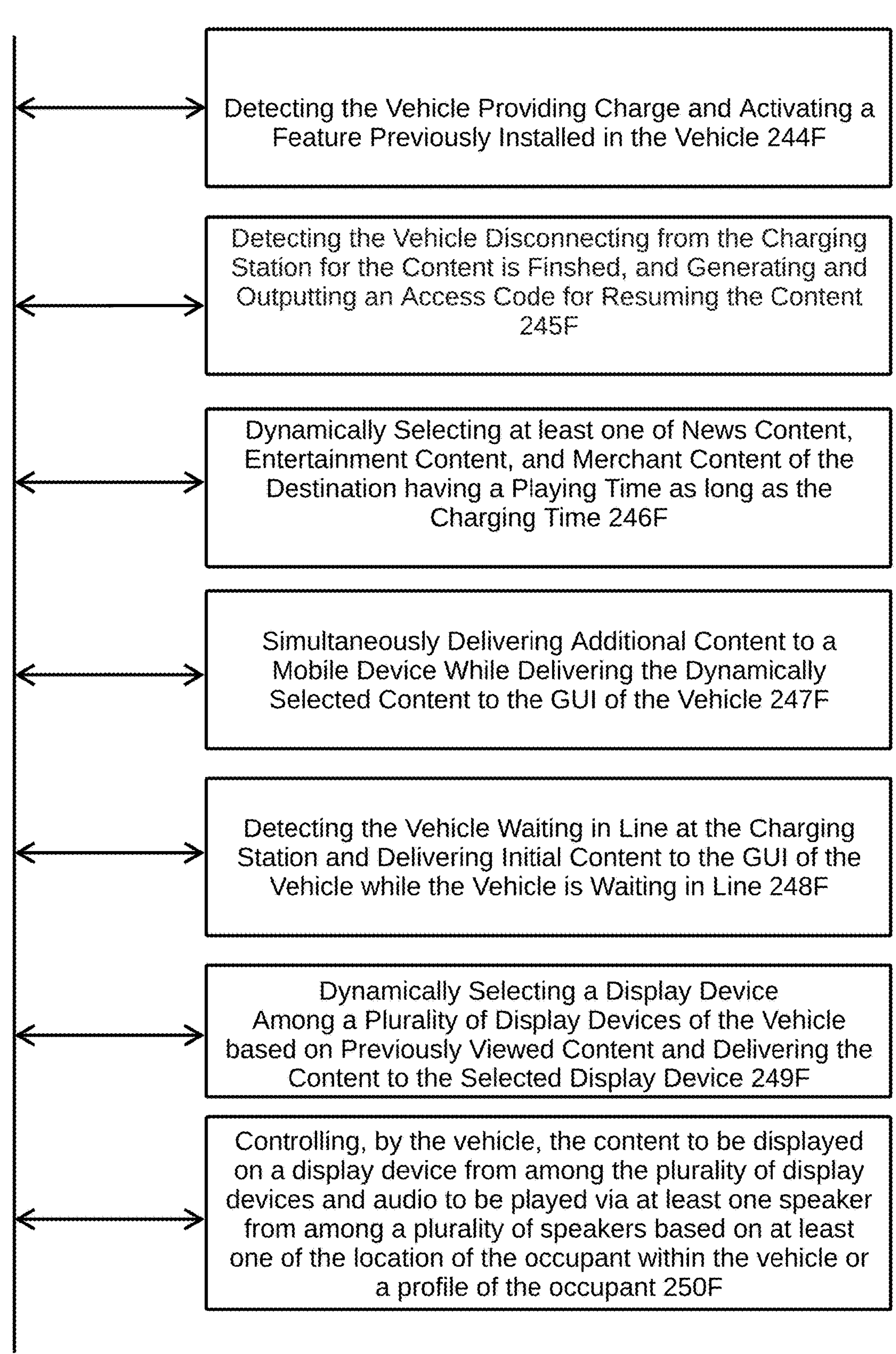
FIG. 2F illustrates another flow diagram, according to an example of the instant solution.

FIG. 2F illustrates another flow diagram 270, according to the instant solution. Referring to FIG. 2F, the instant solution includes one or more of detecting the vehicle providing charge to the charging station and dynamically activating a previously-installed feature on the vehicle in response to the vehicle providing the charge to the charging station in 244F, dynamically playing content on the GUI of the software application of the vehicle while the vehicle receives charge from the charging station, detecting the vehicle disconnecting from the charging station at a point in time before the dynamically selected content is finished playing, generating an access code for continuing the play of the dynamically selected content from the point in time, and outputting the access code to the GUI of the software application in 245F, dynamically selecting at least one of news content, entertainment content, and merchant content associated with the destination comprising a playing time that is at least as long as the charging time for the vehicle in 246F, simultaneously delivering additional content to a mobile device of an occupant of the vehicle while delivering the dynamically selected content to the GUI of the software application in 247F, detecting the vehicle waiting in line at the charging station prior to detecting the vehicle performing the charging operation, and delivering initial content to the GUI of the software application while the vehicle is waiting in line at the charging station in 248F, receiving previously viewed content from a plurality of display devices on the vehicle and dynamically selecting a display device from among the plurality of display devices within the vehicle based on the previously viewed content, wherein the delivering includes delivering the dynamically selected content to the dynamically selected display device in 249F, and determining a location of an occupant within the vehicle, and controlling, by the vehicle, the content to be displayed on a display device from among the plurality of display devices and audio to be played via at least one speaker from among a plurality of speakers based on at least one of the location of the occupant within the vehicle or a profile of the occupant in 250F.

Technological advancements typically build upon the fundamentals of predecessor technologies; such is the case with Artificial Intelligence (AI) models. An AI classification system describes the stages of AI progression. The first classification is known as "Reactive Machines," followed by present-day AI classification "Limited Memory Machines" (also known as "Artificial Narrow Intelligence"), then progressing to "Theory of Mind" (also known as "Artificial General Intelligence"), and reaching the AI classification "Self-Aware" (also known as "Artificial Superintelligence"). Present-day Limited Memory Machines are a growing group of AI models built upon the foundation of its predecessor, Reactive Machines. Reactive Machines emulate human responses to stimuli; however, they are limited in their capabilities as they cannot typically learn from prior experience. Once the AI model's learning abilities emerged, its classification was promoted to Limited Memory Machines. In this present-day classification, AI models learn from large volumes of data, detect patterns, solve problems, generate and predict data, and the like, while inheriting all of the capabilities of Reactive Machines. Examples of AI models classified as Limited Memory Machines include, but are not limited to, Chatbots, Virtual Assistants. Machine Learning (ML), Deep Learning (DL), Natural Language Processing (NLP), Generative AI (GenAI) models, and any future AI models that are yet to be developed possessing characteristics of Limited Memory Machines, Generative AI models combine Limited Memory Machine technologies, incorporating ML and DL, forming the foundational building blocks of future AI models. For example, Theory of Mind is the next progression of AI that may be able to perceive, connect, and react by generating appropriate reactions in response to an entity with which the AI model is interacting; all of these capabilities rely on the fundamentals of Generative AI. Furthermore, in an evolution into the Self-Aware classification, AI models will be able to understand and evoke emotions in the entities they interact with, as well as possess their own emotions, beliefs, and needs, all of which rely on the Generative AI fundamentals of learning from experiences to generate and draw conclusions about itself and its surroundings. Generative AI models are integral and core to future artificial intelligence models. As described herein, Generative AI refers to present-day Generative AI models and future AI models.

Figure 3A:
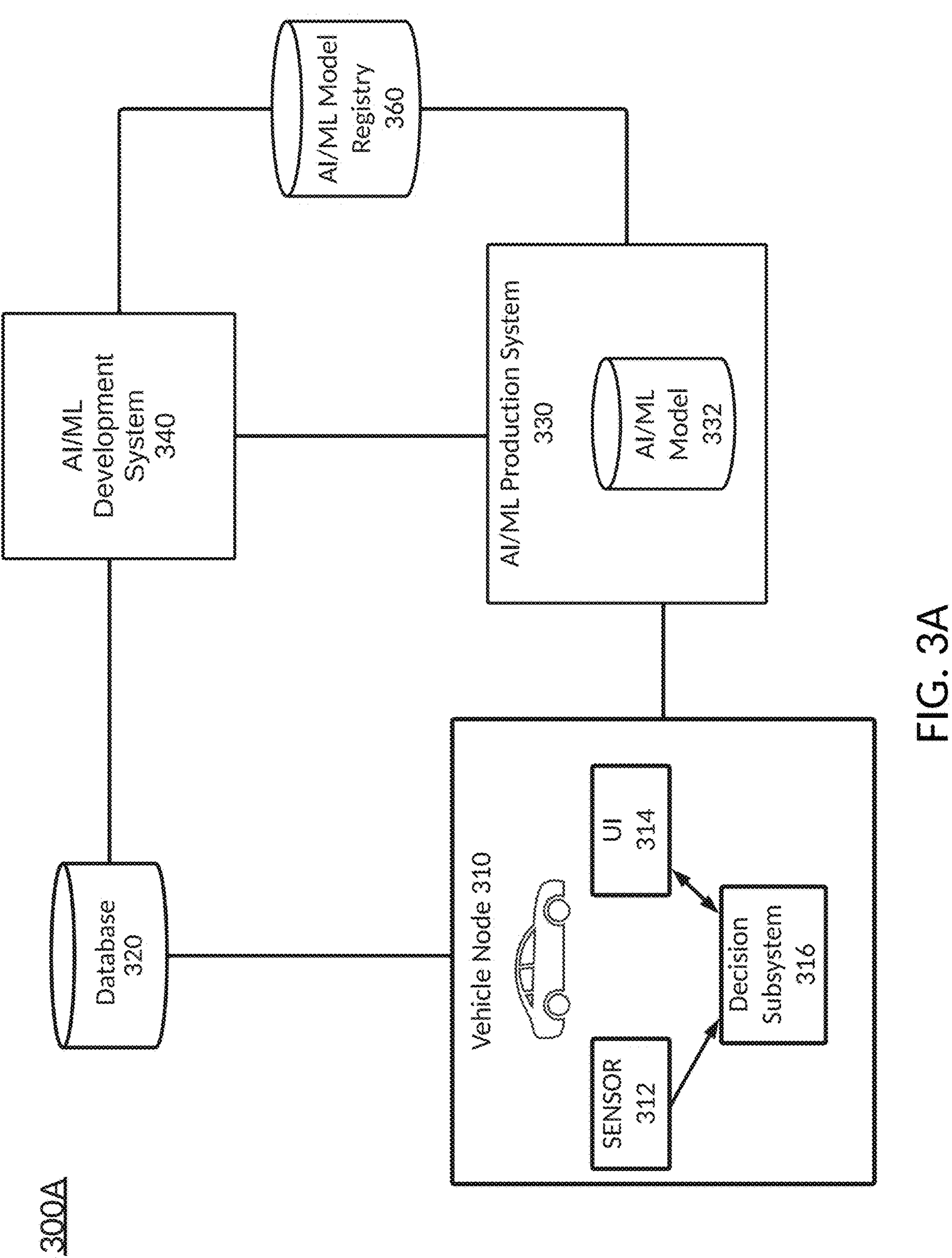
FIG. 3A illustrates an Artificial Intelligence (AI)/Machine Learning (ML) network diagram for integrating an artificial intelligence (AI) model into any decision point in an example of the instant solution.

FIG. 3A illustrates an AI/ML network diagram 300A that supports AI-assisted vehicle or occupant decision points. Vehicle node 310 may include a plurality of sensors 312 that may include but are not limited to, light sensors, weight sensors, cameras, LiDAR, and radar. In some configurations of the instant solution, these sensors 312 send data to a database 320 that stores data about the vehicle and occupants of the vehicle. In some configurations of the instant solution, these sensors 312 send data to one or more decision subsystems 316 in vehicle node 310 to assist in decision-making.

Vehicle node 310 may include one or more user interfaces (UIs) 314, such as a steering wheel, navigation controls, audio/video controls, temperature controls, etc. In some configurations of the instant solution, these UIs 314 send data to a database 320 that stores event data about the UIs 314 that includes but is not limited to selection, state, and display data. In some configurations of the instant solution, these UIs 314 send data to one or more decision subsystems 316 in vehicle node 310 to assist decision-making.

Vehicle node 310 may include one or more decision subsystems 316 that drive a decision-making process around, but not limited to, vehicle control, temperature control, charging control, etc. In some configurations of the instant solution, the decision subsystems 316 gather data from one or more sensors 312 to aid in the decision-making process. In some configurations of the instant solution, a decision subsystem 316 may gather data from one or more UIs 314 to aid in the decision-making process. In some configurations of the instant solution, a decision subsystem 316 may provide feedback to a UI 314.

An AI/ML production system 330 may be used by a decision subsystem 316 in a vehicle node 310 to assist in its decision-making process. The AI/ML production system 330 includes one or more AI/ML models 332 that are executed to retrieve the needed data, such as, but not limited to, a prediction, a categorization, a UI prompt, etc. In some configurations of the instant solution, an AI/ML production system 330 is hosted on a server. In some configurations of the instant solution, the AI/ML production system 330 is cloud-hosted. In some configurations of the instant solution, the AI/ML production system 330 is deployed in a distributed multi-node architecture. In some configurations of the instant solution, the AI production system resides in vehicle node 310.

An AI/ML development system 340 creates one or more AI/ML models 332. In some configurations of the instant solution, the AI/ML development system 340 utilizes data in the database 320 to develop and train one or more AI models 332. In some configurations of the instant solution, the AI/ML development system 340 utilizes feedback data from one or more AI/ML production systems 330 for new model development and/or existing model re-training. In another configuration of the instant solution, the AI/ML development system 340 resides and executes on a server. In another configuration of the instant solution, the AI/ML development system 340 is cloud-hosted. In a further configuration of the instant solution, the AI/ML development system 340 utilizes a distributed data pipeline/analytics engine.

Once an AI/ML model 332 has been trained and validated in the AI/ML development system 340, it may be stored in an AI/ML model registry 360 for retrieval by either the AI/ML development system 340 or by one or more AI/ML production systems 330. The AI/ML model registry 360 resides in a dedicated server in one configuration of the instant solution. In some configurations of the instant solution, the AI/ML model registry 360 is cloud-hosted. The AI/ML model registry 360 is a distributed database in other examples of the instant solution. In further examples of the instant solution, the AI/ML model registry 360 resides in the AI/ML production system 330.

Figure 3B:
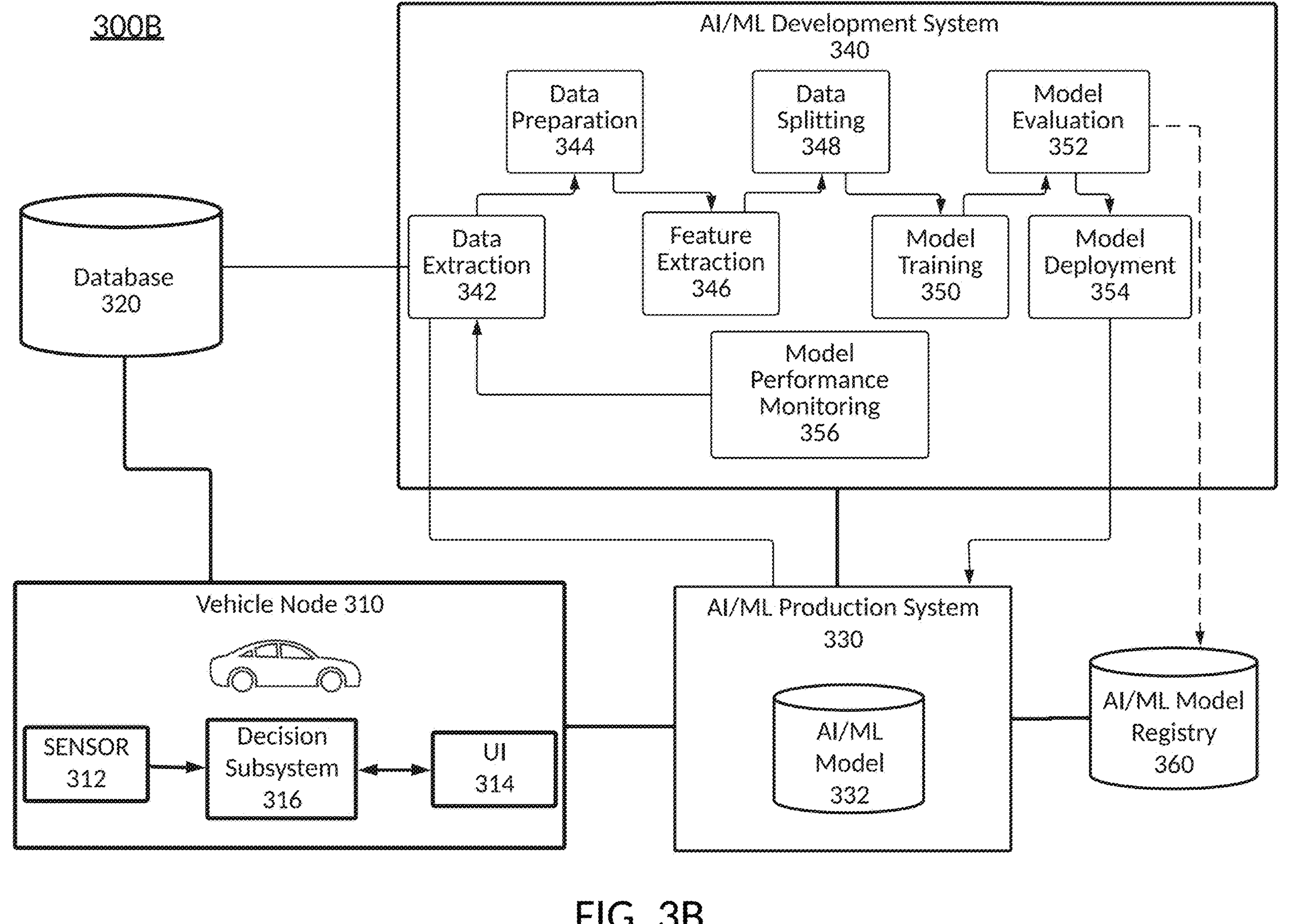
FIG. 3B illustrates a process for developing an Artificial Intelligence (AI)/Machine Learning (ML) model that supports AI-assisted vehicle or occupant decision points.

FIG. 3B illustrates a process 300B for developing one or more AI/ML models that support AI-assisted vehicle or occupant decision points. An AI/ML development system 340 executes steps to develop an AI/ML model 332 that begins with data extraction 342, in which data is loaded and ingested from one or more data sources. In some examples of the instant solution, vehicle and user data is extracted from a database 320. In some examples of the instant solution, model feedback data is extracted from one or more AI/ML production systems 330.

Once the required data has been extracted 342, it must be prepared 344 for model training. In some examples of the instant solution, this step involves statistical testing of the data to see how well it reflects real-world events, its distribution, the variety of data in the dataset, etc. In some examples of the instant solution, the results of this statistical testing may lead to one or more data transformations being employed to normalize one or more values in the dataset. In some examples of the instant solution, this step includes cleaning data deemed to be noisy. A noisy dataset includes values that do not contribute to the training, such as but not limited to, null and long string values. Data preparation 344 may be a manual process or an automated process using one or more of the elements and/or functions described or depicted herein.

Features of the data are identified and extracted 346. In some examples of the instant solution, a feature of the data is internal to the prepared data from step 344. In other examples of the instant solution, a feature of the data requires a piece of prepared data from step 344 to be enriched by data from another data source to be used in developing an AI/ML model 332. In some examples of the instant solution, identifying features is a manual process or an automated process using one or more of the elements and/or functions described or depicted herein. Once the features have been identified, the values of the features are collected into a dataset that will be used to develop the AI/ML model 332.

The dataset output from feature extraction step 346 is split 348 into a training and a validation data set. The training data set is used to train the AI/ML model 332, and the validation data set is used to evaluate the performance of the AI/ML model 332 on unseen data.

The AI/ML model 332 is trained and tuned 350 using the training data set from the data splitting step 348. In this step, the training data set is fed into an AI/ML algorithm with an initial set of algorithm parameters. The performance of the AI/ML model 332 is then tested within the AI/ML development system 340 utilizing the validation data set from step 348. These steps may be repeated with adjustments to one or more algorithm parameters until the model's performance is acceptable based on various goals and/or results.

The AI/ML model 332 is evaluated 352 in a staging environment (not shown) that resembles the ultimate AI/ML production system 330. This evaluation uses a validation dataset to ensure the performance in an AI/ML production system 330 matches or exceeds expectations. In some examples of the instant solution, the validation dataset from step 348 is used. In other examples of the instant solution, one or more unseen validation datasets are used. In some examples of the instant solution, the staging environment is part of the AI/ML development system 340. In other examples of the instant solution, the staging environment is managed separately from the AI/ML development system 340. Once the AI/ML model 332 has been validated, it is stored in an AI/ML model registry 360, which can be retrieved for deployment and future updates. As before, in some configurations of the instant solution, the model evaluation step 352 is a manual process or an automated process using one or more of the elements and/or functions described or depicted herein.

Once an AI/ML model 332 has been validated and published to an AI/ML model registry 360, it may be deployed 354 to one or more AI/ML production systems 330. In some examples of the instant solution, the performance of deployed AI/ML models 332 is monitored 356 by the AI/ML development system 340. In some examples of the instant solution, AI/ML model 332 feedback data is provided by the AI/ML production system 330 to enable model performance monitoring 356. In some examples of the instant solution, the AI/ML development system 340 periodically requests feedback data for model performance monitoring 356. In some examples of the instant solution, model performance monitoring includes one or more triggers that result in the AI/ML model 332 being updated by repeating steps 342-354 with updated data from one or more data sources.

Figure 3C:
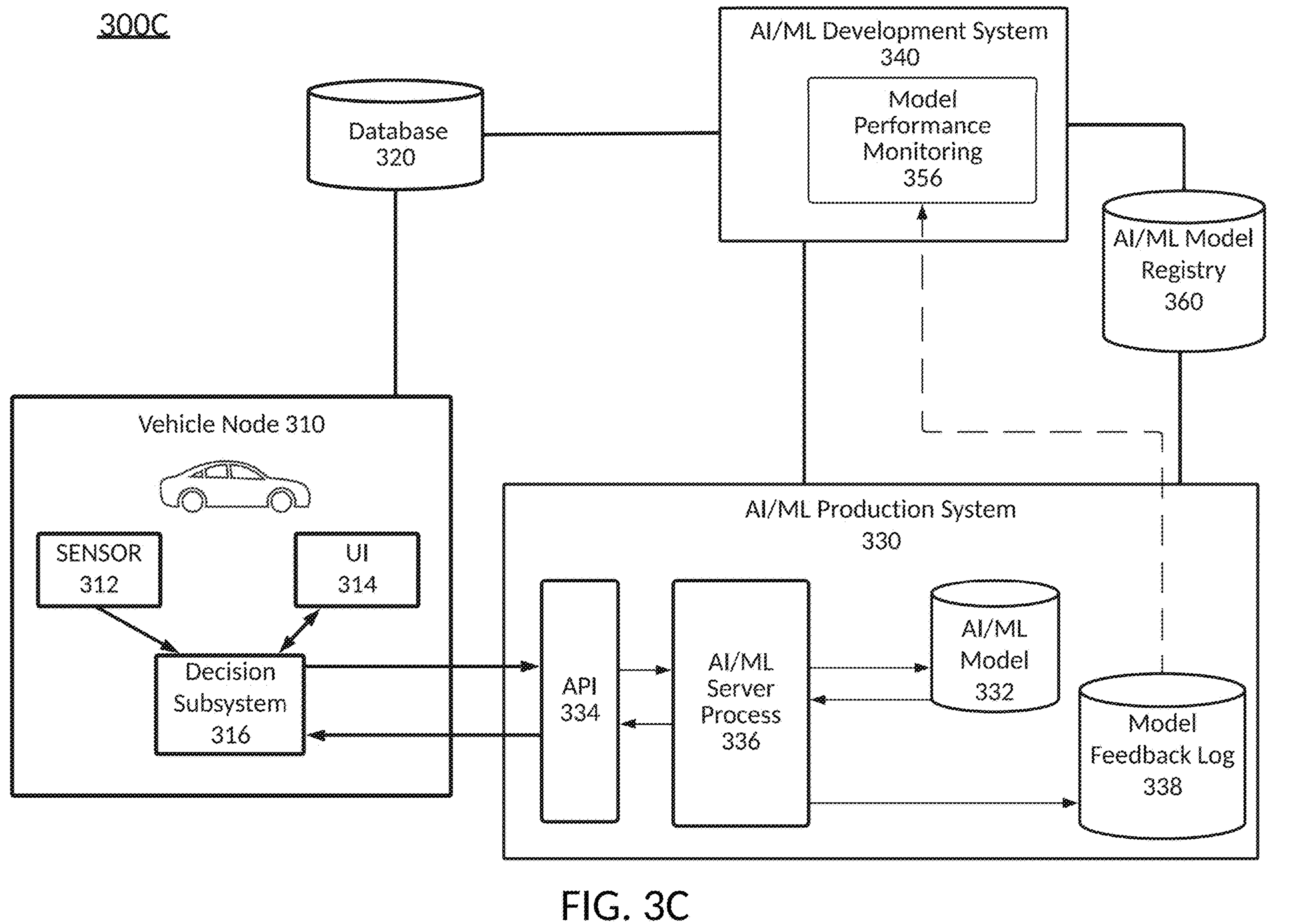
FIG. 3C illustrates a process for utilizing an Artificial Intelligence (AI)/Machine Learning (ML) model that supports AI-assisted vehicle or occupant decision points.

FIG. 3C illustrates a process 300C for utilizing an AI/ML model that supports AI-assisted vehicle or occupant decision points. As stated previously, the AI model utilization process depicted herein reflects ML, which is a particular branch of AI, but the instant solution is not limited to ML and is not limited to any AI algorithm or combination of algorithms.

Referring to FIG. 3C, an AI/ML production system 330 may be used by a decision subsystem 316 in vehicle node 310 to assist in its decision-making process. The AI/ML production system 330 provides an application programming interface (API) 334, executed by an AI/ML server process 336 through which requests can be made. In some examples of the instant solution, a request may include an AI/ML model 332 identifier to be executed. In some examples of the instant solution, the AI/ML model 332 to be executed is implicit based on the type of request. In some examples of the instant solution, a data payload (e.g., to be input to the model during execution) is included in the request. In some examples of the instant solution, the data payload includes sensor 312 data received from vehicle node 310. In some examples of the instant solution, the data payload includes UI 314 data from vehicle node 310. In some examples of the instant solution, the data payload includes data from other vehicle node 310 subsystems (not shown), including but not limited to, occupant data subsystems. In some examples of the instant solution, one or more elements or nodes 320, 330, 340, or 360 may be located in the vehicle node 310.

Upon receiving the API 334 request, the AI/ML server process 336 may need to transform the data payload or portions of the data payload to be valid feature values in an AI/ML model 332. Data transformation may include but is not limited to combining data values, normalizing data values, and enriching the incoming data with data from other data sources. Once any required data transformation occurs, the AI/ML server process 336 executes the appropriate AI/ML model 332 using the transformed input data. Upon receiving the execution result, the AI/ML server process 336 responds to the API caller, which is a decision subsystem 316 of vehicle node 310. In some examples of the instant solution, the response may result in an update to a UI 314 in vehicle node 310. In some examples of the instant solution, the response includes a request identifier that can be used later by the decision subsystem 316 to provide feedback on the AI/ML model 332 performance. Further, in some configurations of the instant solution, immediate performance feedback may be recorded into a model feedback log 338 by the AI/ML server process 336. In some examples of the instant solution, execution model failure is a reason for immediate feedback.

In some examples of the instant solution, the API 334 includes an interface to provide AI/ML model 332 feedback after an AI/ML model 332 execution response has been processed. This mechanism may be used to evaluate the performance of the AI/ML model 332 by enabling the API caller to provide feedback on the accuracy of the model results. For example, if the AI/ML model 332 provided an estimated time of arrival of 20 minutes, but the actual travel time was 24 minutes, that may be indicated. In some examples of the instant solution, the feedback interface includes the identifier of the initial request so that it can be used to associate the feedback with the request. Upon receiving a call into the feedback interface of API 334, the AI/ML server process 336 records the feedback in the model feedback log 338. In some examples of the instant solution, the data in this model feedback log 338 is provided to model performance monitoring 356 in the AI/ML development system 340. This log data is streamed to the AI/ML development system 340 in one example of the instant solution. In some examples of the instant solution, the log data is provided upon request. In some examples and features of the instant solution, the model feedback records in the model feedback log 338 are used as input for retraining the AI model 332.

Model retraining involves repeating steps 342-354 using the current data in the data source along with the model feedback log 338. In some examples and features of the instant solution, the AI model 332 is retrained periodically as a matter of business process to consider the latest data and/or retrained based on a trigger, such as, but not limited to, a recent model accuracy falling below a predetermined threshold. In some examples and features of the instant solution, the model feedback data 338 is used as input to determine the recent model accuracy.

A number of the steps/features that may utilize the AI/ML process described herein include one or more of: receiving a request for charge from a vehicle from a software application on the vehicle, where the request comprises an identifier of a destination of the vehicle and a state of charge (SOC) of the vehicle, determining a charging time for the vehicle at a charging station based on the SOC, dynamically selecting content from among a database of content based on the destination and the charging time, detecting the vehicle performing a charging operation at the charging station, delivering the dynamically selected content to a graphical user interface (GUI) of the software application while the vehicle is performing the charging operation, detecting the vehicle providing charge to the charging station and dynamically activating a previously-installed feature on the vehicle in response to the vehicle providing the charge to the charging station, dynamically playing content on the GUI of the software application of the vehicle while the vehicle receives charge from the charging station, detecting the vehicle disconnecting from the charging station at a point in time before the dynamically selected content is finished playing, generating an access code for continuing the play of the dynamically selected content from the point in time, and outputting the access code to the GUI of the software application, dynamically selecting at least one of news content, entertainment content, and merchant content associated with the destination comprising a playing time that is at least as long as the charging time for the vehicle, simultaneously delivering additional content to a mobile device of an occupant of the vehicle while delivering the dynamically selected content to the GUI of the software application, detecting the vehicle waiting in line at the charging station prior to detecting the vehicle performing the charging operation, and delivering initial content to the GUI of the software application while the vehicle is waiting in line at the charging station, receiving previously viewed content from a plurality of display devices on the vehicle and dynamically selecting a display device from among the plurality of display devices within the vehicle based on the previously viewed content, wherein the delivering includes delivering the dynamically selected content to the dynamically selected display device, and determining a location of an occupant within the vehicle, and controlling, by the vehicle, the dynamically selected content to be displayed on a display device from among the plurality of display devices based on the location of an occupant within the vehicle.

Data associated with any of these steps/features, as well as any other features or functionality described or depicted herein, the AI/ML production system 330, as well as one or more of the other elements depicted in FIG. 3C may be used to process this data in a pre-transformation and/or post-transformation process. Data related to this process can be used by the vehicle node 310. In one example of the instant solution, data related to this process may be used with a charging infrastructure, such as charging station/charging point, a server, a wireless device, and/or any of the processors described or depicted herein.

Figure 3D:
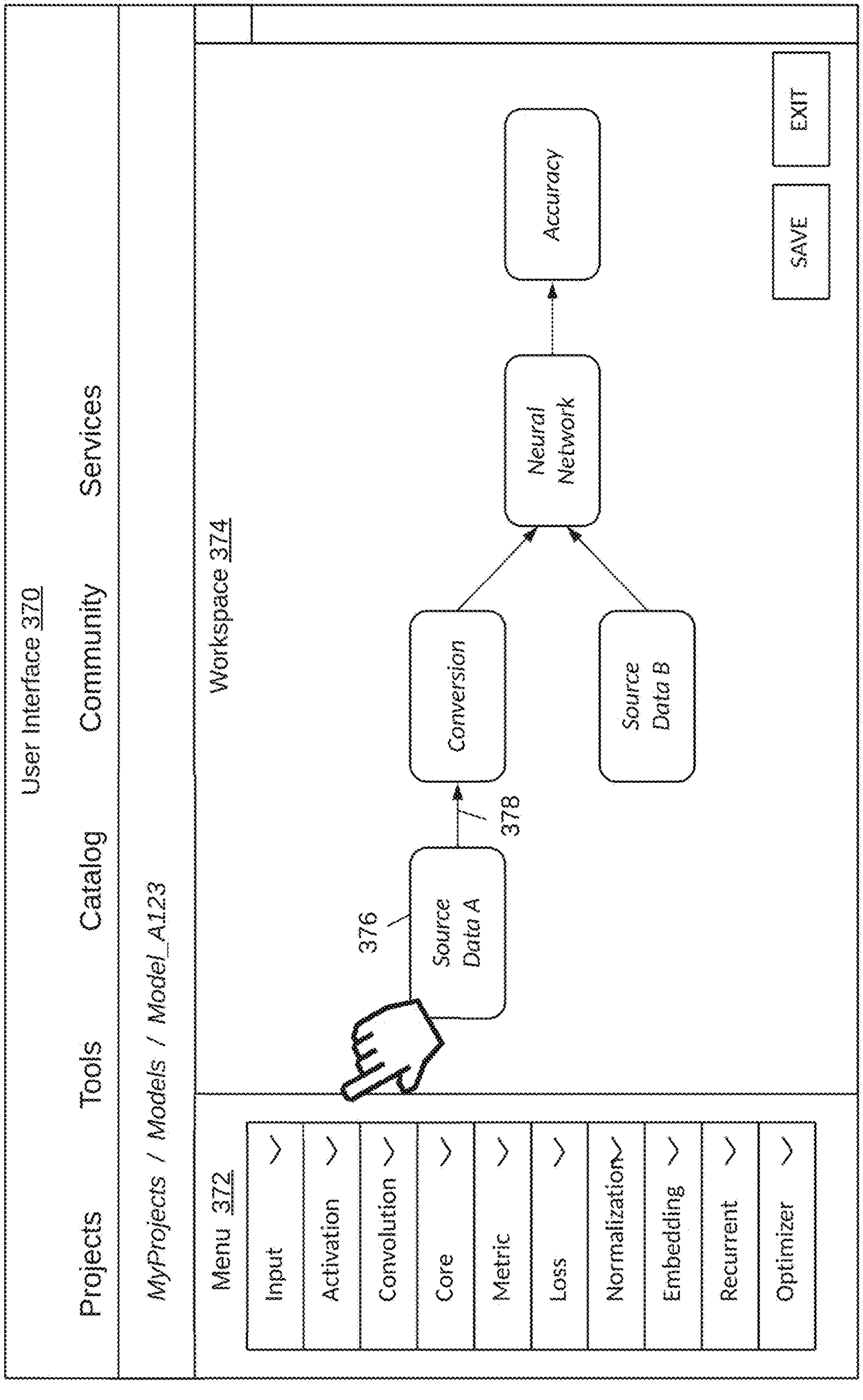
FIG. 3D illustrates a machine learning network diagram, according to an example of the instant solution.

FIG. 3D illustrates a process 300D of designing a new machine learning model via a user interface 370 of the system according to examples of the instant solution. As an example, a model may be output as part of the AI/ML Development System 340. Referring to FIG. 3D, a user can use an input mechanism from a menu 372 of a user interface 370 to add pieces/components to a model being developed within a workspace 374 of the user interface 370.

The menu 372 includes a plurality of graphical user interface (GUI) menu options which can be selected to reveal additional components that can be added to the model design shown in the workspace 374. The GUI menu includes options for adding elements to the workspace, such as features which may include neural networks, machine learning models, AI models, data sources, conversion processes (e.g., vectorization, encoding, etc.), analytics, etc. The user can continue to add features to the model and connect them using edges or other elements to create a flow within the workspace 374. For example, the user may add a node 376 to a flow of a new model within the workspace 374. For example, the user may connect the node 376 to another node in the diagram via an edge 378, creating a dependency within the diagram. When the user is done, the user can save the model for subsequent training/testing.

In another example, the name of the object can be identified from a web page or a user interface 370 where the object is visible within a browser or the workspace 374 on the user device. A pop-up within the browser or the workspace 374 can be overlayed where the object is visible. The pop-up includes an option to navigate to the identified web page corresponding to the alternate object via a rule set.

Figure 3E:
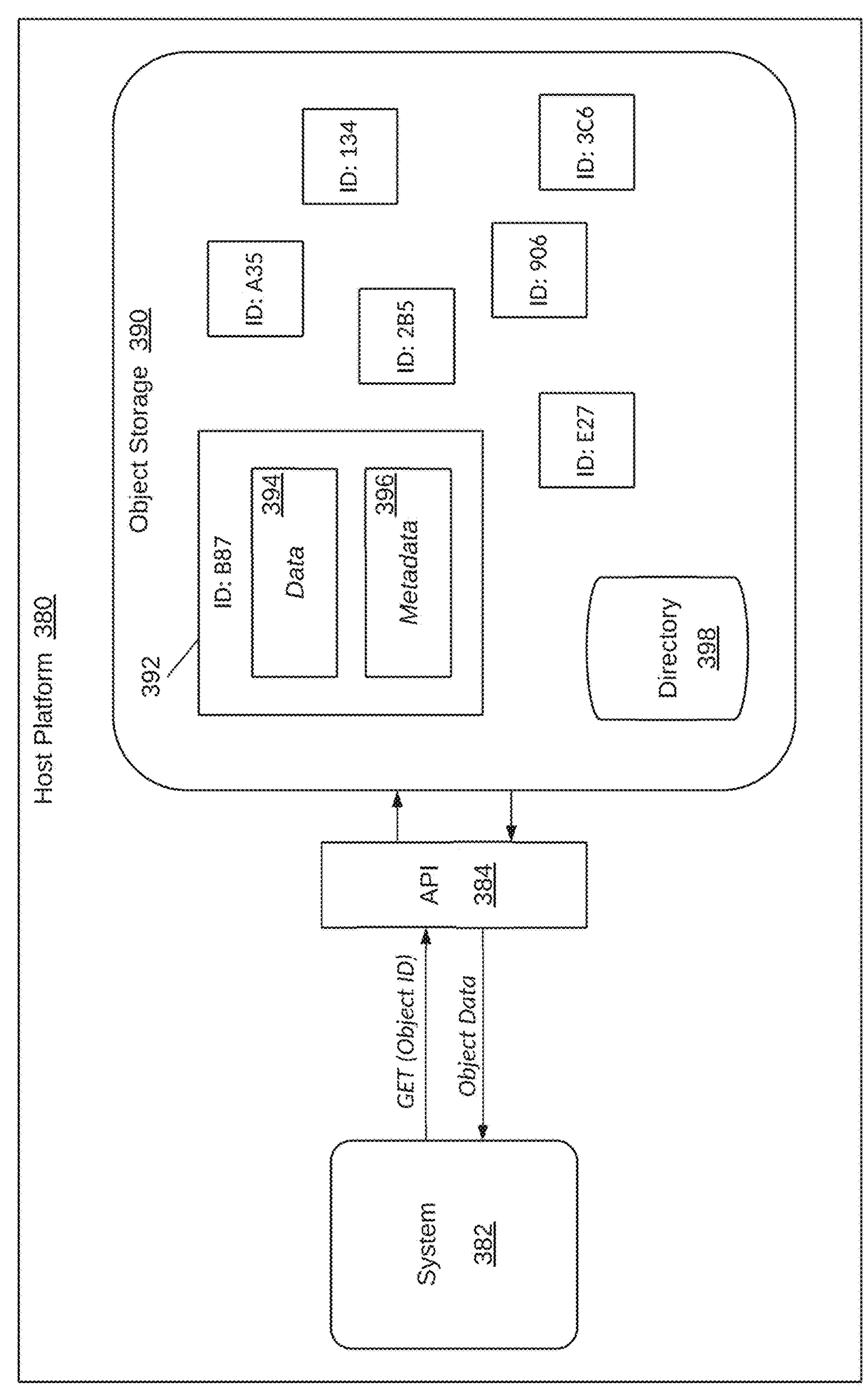
FIG. 3E illustrates a machine learning network diagram, according to an example of the instant solution.

FIG. 3E illustrates a process 300E of accessing an object 392 from an object storage 390 of the host platform 380 according to examples of the instant solution. For example, the object storage 390 may store data that is used by the AI models and machine learning (ML) models, including but not limited to training data, expected outputs for testing, training results, and the like. The object storage 390 may also store any other kind of data. Each object may include a unique identifier, a data section 394, and a metadata section 396, which provide a descriptive context associated with the data, including data that can later be extracted for purposes of machine learning. The unique identifier may uniquely identify an object with respect to all other objects in the object storage 390. The data section 394 may include unstructured data such as web pages, digital content, images, audio, text, and the like.

Instead of breaking files into blocks stored on disks in a file system, the object storage 390 handles objects as discrete units of data stored in a structurally flat data environment. Here, the object storage may not use folders, directories, or complex hierarchies. Instead, each object may be a simple, self-contained repository that includes the data, the metadata, and the unique identifier that a client application can use to locate and access it. In this case, the metadata is more descriptive than a file-based approach. The metadata can be customized with additional context that can later be extracted and leveraged for other purposes, such as data analytics.

The objects that are stored in the object storage 390 may be accessed via an API 384. The API 384 may be a Hypertext Transfer Protocol (HTTP)-based RESTful API (also known as a RESTful Web service). The API 384 can be used by the client application or system 382 to query an object's metadata to locate the desired object data via the Internet from anywhere on any device. The API 384 may use HTTP commands such as "PUT" or "POST" to upload an object, "GET" to retrieve an object, "DELETE" to remove an object, and the like.

The object storage 390 may provide a directory 398 that uses the metadata of the objects to locate appropriate data files. The directory 398 may contain descriptive information about each object stored in the object storage 390, such as a name, a unique identifier, a creation timestamp, a collection name, etc. To query the object within the object storage 390, the client application may submit a command, such as an HTTP command, with an identifier of the object 392, a payload, etc. The object storage 390 can store the actions and results described herein, including associating two or more lists of ranked assets with one another based on variables used by the two or more lists of ranked assets that have a correlation at or above a predetermined threshold.

Figure 4A:
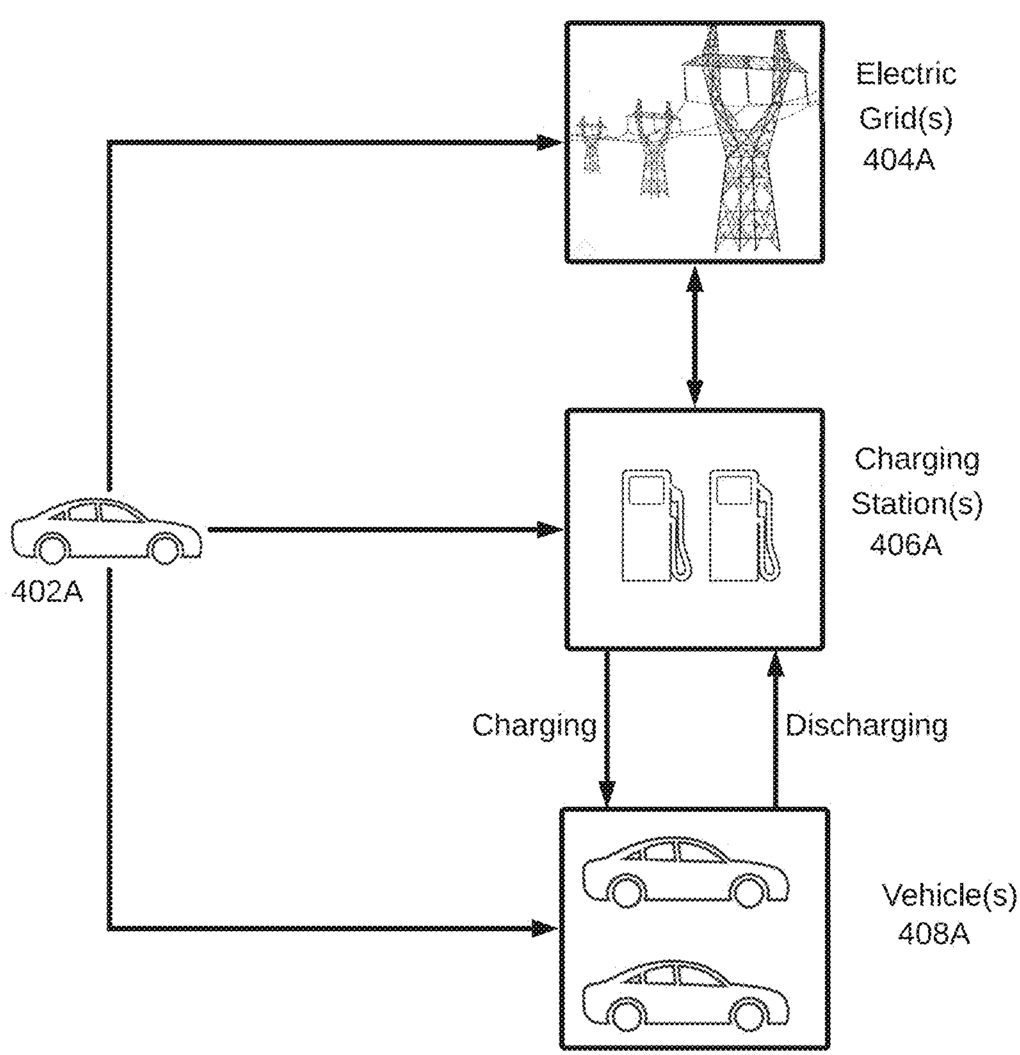
FIG. 4A illustrates a diagram depicting electrification of one or more elements, according to an example of the instant solution.

FIG. 4A illustrates a diagram 400A depicting the electrification of one or more elements. In one example, a vehicle 402A may provide energy stored in its batteries to one or more elements, including other vehicle(s) 408A, charging station(s) 406A, and electric grid(s) 404A. The electric grid(s) 404A is/are coupled to one or more of the charging station(s) 406A, which may be coupled to one or more of the vehicle(s) 408A. This configuration allows the distribution of electricity/power received from the vehicle 402A. The vehicle 402A may also interact with the other vehicle(s) 408A, such as via V2V technology, communication over cellular networks, Wi-Fi®, and the like. The vehicle 402A may also interact via wired and/or wireless connections with other vehicles 408A, the charging station(s) 406A and/or with the electric grid(s) 404A. In one example, the vehicle 402A is routed (or routes itself) in a safe and efficient manner to the electric grid(s) 404A, the charging station(s) 406A, or the other vehicle(s) 408A. Using one or more examples of the instant solution, the vehicle 402A can provide energy to one or more of the elements depicted herein in various advantageous ways as described and/or depicted herein. Further, the safety and efficiency of the vehicle may be increased, and the environment may be positively affected as described and/or depicted herein. The term "charging station" herein may be referred to as a charging point, a charging bay, or a charging device and may refer to a device that is connected to a vehicle, such as through a charging port on the vehicle, where electricity is provided to the vehicle or received from the vehicle (Vehicle-to-Grid or V2G). It may also refer to a location connected to the charging port on the vehicle, such as an outlet or device at a home that provides electricity to charge the vehicle's battery. The connection can be between the vehicle and the charging infrastructure. The connection can be a physical and/or a wireless connection.

The terms 'energy,' 'electricity,' 'power,' and the like may be used to denote any form of energy received, stored, used, shared, and/or lost by the vehicle(s). The energy may be referred to in conjunction with a voltage source and/or a current supply of charge provided from an entity to the vehicle(s) during a charge/use operation. Energy may also be in the form of fossil fuels (for example, for use with a hybrid vehicle) or via alternate power sources, including but not limited to lithium-based, nickel-based, hydrogen fuel cells, atomic/nuclear energy, fusion-based energy sources, and energy generated during an energy sharing and/or usage operation for increasing or decreasing one or more vehicles energy levels at a given time.

In one example, the charging station 406A manages the amount of energy transferred from the vehicle 402A such that there is sufficient charge remaining in the vehicle 402A to arrive at a destination. In another example, a wireless connection is used to wirelessly direct an amount of energy transfer between vehicles 408A, wherein the vehicles may both be in motion. In another example, wireless charging may occur via a fixed charger and batteries of the vehicle in alignment with one another (such as a charging mat in a garage or parking space). In another example, an idle vehicle, such as a vehicle 402A (which may be autonomous) is directed to provide an amount of energy to a charging station 406A and return to the original location (for example, its original location or a different destination). In another example, a mobile energy storage unit (not shown) is used to collect surplus energy from at least one other vehicle 408A and transfer the stored surplus energy at a charging station 406A. In another example, factors determine an amount of energy to transfer to a charging station 406A, such as distance, time, traffic conditions, road conditions, environmental/weather conditions, the vehicle's condition (weight, etc.), an occupant(s) schedule while utilizing the vehicle, a prospective occupant(s) schedule waiting for the vehicle, etc. In another example, the vehicle(s) 408A, the charging station(s) 406A and/or the electric grid(s) 404A can provide energy to the vehicle 402A.

In one example of the instant solution, a location such as a building, a residence, or the like (not depicted), is communicably coupled to one or more of the electric grid(s) 404A, the vehicle 402A, and/or the charging station(s) 406A. The rate of electric flow to one or more of the location, the vehicle 402A and/or the other vehicle(s) 408A is modified, depending on external conditions, such as weather. For example, when the external temperature is extremely hot or extremely cold, raising the chance for an outage of electricity, the flow of electricity to a connected vehicle 402A/408A is slowed to help minimize the chance of an outage.

In one example of the instant solution, vehicles 402A and 408A may be utilized as bidirectional vehicles. Bidirectional vehicles are those that may serve as mobile microgrids that can assist in the supplying of electrical power to the grid 404A and/or reduce the power consumption when the grid is stressed. Bidirectional vehicles incorporate bidirectional charging, which in addition to receiving a charge to the vehicle, the vehicle can transfer energy from the vehicle to the grid 404A, otherwise referred to as "V2G". In bidirectional charging, the electricity flows both ways; to the vehicle and from the vehicle. When a vehicle is charged, alternating current (AC) electricity from the grid 404A is converted to direct current (DC). This may be performed by one or more of the vehicle's own converter(s) or a converter on the charging station 406A. The energy stored in the vehicle's batteries may be sent in an opposite direction back to the grid. The energy is converted from DC to AC through a converter usually located in the charging station 406A, otherwise referred to as a bidirectional charger. Further, the instant solution as described and depicted with respect to FIG. 4A can be utilized in this and other networks and/or systems.

Figure 4B:
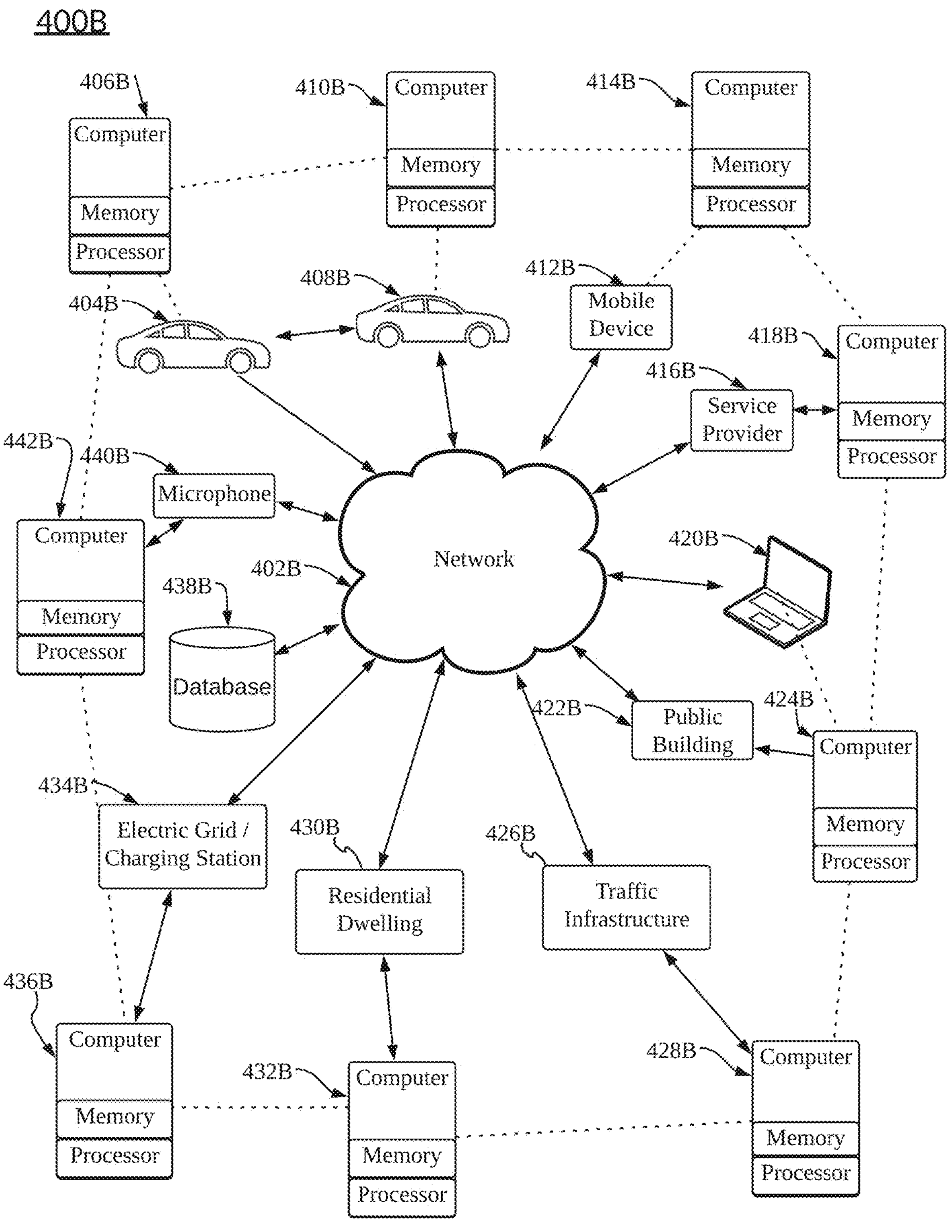
FIG. 4B illustrates a diagram depicting interconnections between different elements, according to an example of the instant solution.

FIG. 4B is a diagram showing interconnections between different elements 400B. The instant solution may be stored and/or executed entirely or partially on and/or by one or more computing devices 414B, 418B, 424B, 428B, 432B, 436B, 406B, 442B and 410B associated with various entities, all communicably coupled and in communication with a network 402B. A database 438B is communicably coupled to the network and allows for the storage and retrieval of data. In one example, the database is an immutable ledger. One or more of the various entities may be a vehicle 404B, service provider 416B, public building 422B, traffic infrastructure 426B, residential dwelling 430B, an electric grid/charging station 434B, a microphone 440B, and/or another vehicle 408B. Other entities and/or devices, such as one or more private users using a mobile device 412B, a laptop 420B, an augmented reality (AR) device, a virtual reality (VR) device, and/or any wearable device may also interwork with the instant solution. The mobile device 412B, laptop 420B, microphone 440B, and other devices may be connected to one or more of the connected computing devices 414B, 418B, 424B, 428B, 432B, 436B, 406B, 442B, and 410B. The one or more public buildings 422B may include various agencies. The one or more public buildings 422B may utilize a computing device 424B. The one or more service provider(s) 416B may include a dealership, a tow truck service, a collision center, or other repair shop. The one or more service provider(s) 416B may utilize a computing apparatus 418B. These various computer devices may be directly and/or communicably coupled to one another, such as via wired networks, wireless networks, blockchain networks, and the like. In one example, the microphone 440B may be utilized as a virtual assistant. In another example, the one or more traffic infrastructure 426B may include one or more traffic signals, one or more sensors including one or more cameras, vehicle speed sensors or traffic sensors, and/or other traffic infrastructure. The one or more traffic infrastructure 426B may utilize a computing device 428B.

In one example of the instant solution, anytime an electrical charge is given or received to/from a charging station and/or an electrical grid, the entities that allow that to occur are one or more of a vehicle, a charging station, a server, and a network communicably coupled to the vehicle, the charging station, and the electrical grid.

In one example, a vehicle 408B/404B can transport a person, an object, a permanently or temporarily affixed apparatus, and the like. In another example, the vehicle 408B may communicate with vehicle 404B via V2V communication through the computers associated with each vehicle 406B and 410B and may be referred to as a car, vehicle, automobile, and the like. The vehicle 404B/408B may be a self-propelled wheeled conveyance, such as a car, a sports utility vehicle, a truck, a bus, a van, or other motor or battery-driven or fuel cell-driven vehicle. For example, vehicle 404B/408B may be an electric vehicle, a hybrid vehicle, a hydrogen fuel cell vehicle, a plug-in hybrid vehicle, or any other type of vehicle with a fuel cell stack, a motor, and/or a generator. Other examples of vehicles include bicycles, scooters, trains, planes, boats, and any other form of conveyance that is capable of transportation. The vehicle 404B/408B may be semi-autonomous or autonomous. For example, vehicle 404B/408B may be self-maneuvering and navigate without human input. An autonomous vehicle may have and use one or more sensors and/or a navigation unit to drive autonomously. All of the data described or depicted herein can be stored, analyzed, processed and/or forwarded by one or more of the elements in FIG. 4B.

Figure 4C:
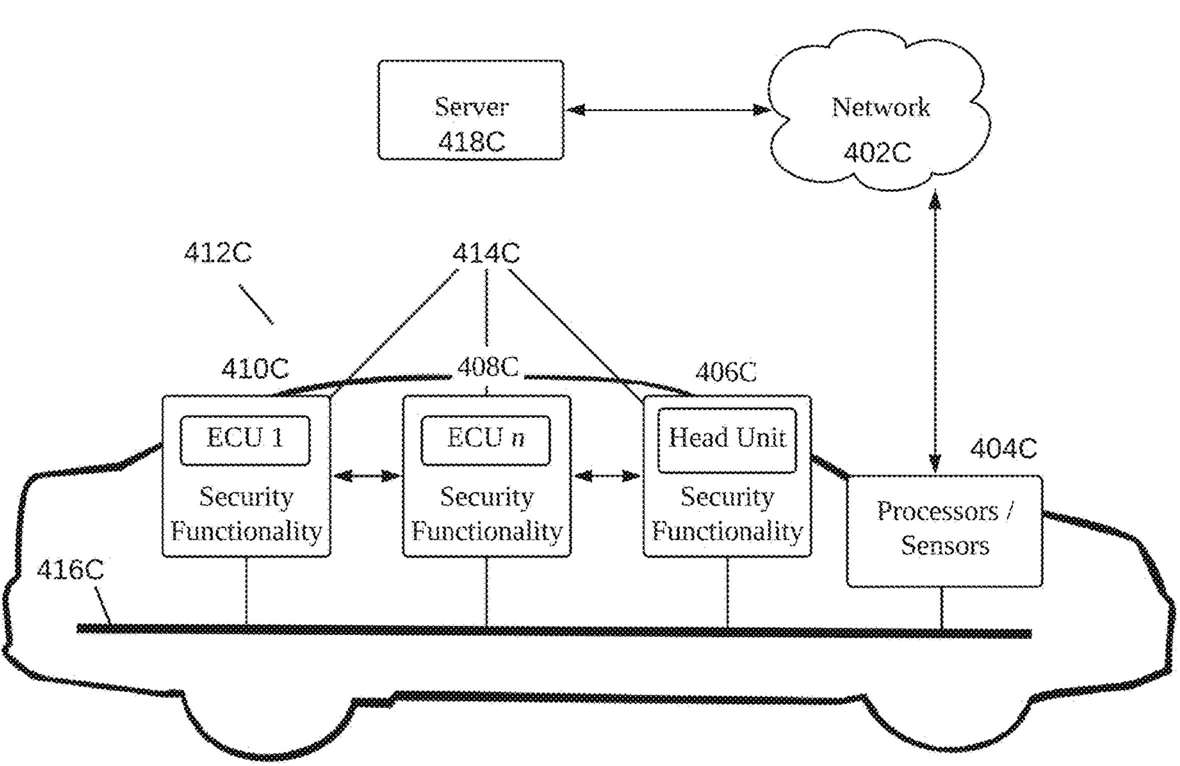
FIG. 4C illustrates a further diagram depicting interconnections between different elements, according to an example of the instant solution.

FIG. 4C is another block diagram showing interconnections between different elements in one example 400C. A vehicle 412C is presented and includes ECUs 410C, 408C, and a head unit (otherwise known as an infotainment system) 406C. An ECU is an embedded system in automotive electronics that controls one or more of the electrical systems or subsystems in a vehicle. ECUs may include but are not limited to the management of a vehicle's engine, brake system, gearbox system, door locks, dashboard, airbag system, infotainment system, electronic differential, and active suspension. ECUs are connected to the vehicle's Controller Area Network (CAN) bus 416C. The ECUs may also communicate with a vehicle computer 404C via the CAN bus 416C. The vehicle's processors/sensors (such as the vehicle computer) 404C can communicate with external elements, such as a server 418C via a network 402C (such as the Internet). Each ECU 410C, 408C, and head unit 406C may contain its own security policy. The security policy defines permissible processes that can be executed in the proper context. In one example, the security policy may be partially or entirely provided in the vehicle computer 404C.

ECUs 410C, 408C, and head unit 406C may each include a custom security functionality element 414C defining authorized processes and contexts within which those processes are permitted to run. Context-based authorization to determine validity if a process can be executed allows ECUs to maintain secure operation and prevent unauthorized access from elements such as the vehicle's CAN Bus. When an ECU encounters a process that is unauthorized, that ECU can block the process from operating. Automotive ECUs can use different contexts to determine whether a process is operating within its permitted bounds, such as proximity contexts, nearby objects, distance to approaching objects, speed, and trajectory relative to other moving objects, and operational contexts such as an indication of whether the vehicle is moving or parked, the vehicle's current speed, the transmission state, user-related contexts such as devices connected to the transport via wireless protocols, use of the infotainment, cruise control, parking assist, driving assist, location-based contexts, and/or other contexts.

Figure 4D:
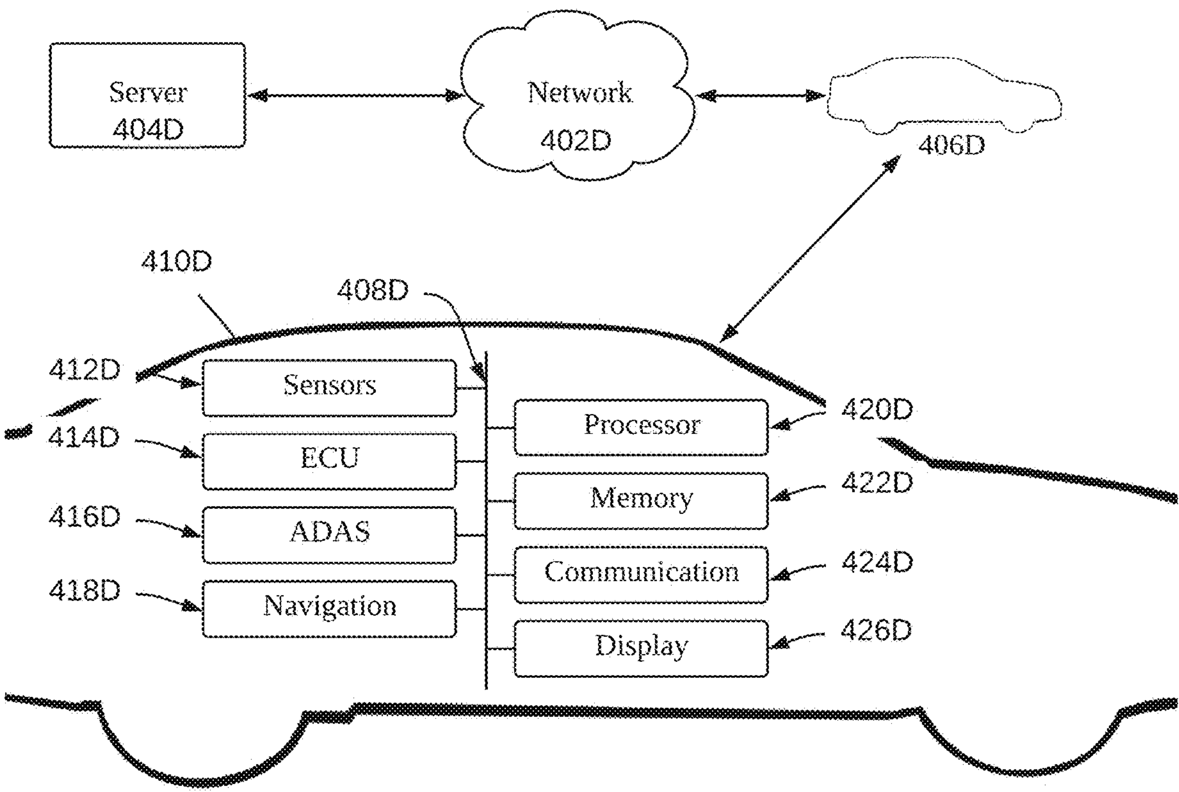
FIG. 4D illustrates yet a further diagram depicting interconnections between elements, according to an example of the instant solution.

Referring to FIG. 4D, an operating environment 400D for a connected vehicle, is illustrated according to some examples of the instant solution. As depicted, the vehicle 410D includes a CAN bus 408D connecting elements 412D-426D of the vehicle. Other elements may be connected to the CAN bus and are not depicted herein. The depicted elements connected to the CAN bus include a sensor set 412D, Electronic Control Units 414D, autonomous features or Advanced Driver Assistance Systems (ADAS) 416D, and the navigation system 418D. In some examples of the instant solution, the vehicle 410D includes a processor 420D, a memory 422D, a communication unit 424D, and an electronic display 426D.

The processor 420D includes an arithmetic logic unit, a microprocessor, a general-purpose controller, and/or a similar processor array to perform computations and provide electronic display signals to a display unit 426D. The processor 420D processes data signals and may include various computing architectures, including a complex instruction set computer (CISC) architecture, a reduced instruction set computer (RISC) architecture, or an architecture implementing a combination of instruction sets. The vehicle 410D may include one or more processors 420D. Other processors, operating systems, sensors, displays, and physical configurations that are communicably coupled to one another (not depicted) may be used with the instant solution.

Memory 422D is a non-transitory memory storing instructions or data that may be accessed and executed by the processor 420D. The instructions and/or data may include code to perform the techniques described herein. The memory 422D may be a dynamic random-access memory (DRAM) device, a static random-access memory (SRAM) device, flash memory, or another memory device. In some examples of the instant solution, the memory 422D also may include non-volatile memory or a similar permanent storage device and media, which may include a hard disk drive, a floppy disk drive, a compact disc read only memory (CD-ROM) device, a digital versatile disk read only memory (DVD-ROM) device, a digital versatile disk random access memory (DVD-RAM) device, a digital versatile disk rewritable (DVD-RW) device, a flash memory device, or some other mass storage device for storing information on a permanent basis. A portion of the memory 422D may be reserved for use as a buffer or virtual random-access memory (virtual RAM). The vehicle 410D may include one or more memories 422D without deviating from the current solution.

The memory 422D of the vehicle 410D may store one or more of the following types of data: navigation route data 418D, and autonomous features data 416D. In some examples of the instant solution, the memory 422D stores data that may be necessary for the navigation application 418D to provide the functions.

The navigation system 418D may describe at least one navigation route including a start point and an endpoint. In some examples of the instant solution, the navigation system 418D of the vehicle 410D receives a request from a user for navigation routes wherein the request includes a starting point and an ending point. The navigation system 418D may query a real-time data server 404D (via a network 402D), such as a server that provides driving directions, for navigation route data corresponding to navigation routes, including the start point and the endpoint. The real-time data server 404D transmits the navigation route data to the vehicle 410D via a wireless network 402D, and the communication system 424D stores the navigation data 418D in the memory 422D of the vehicle 410D.

The ECU 414D controls the operation of many of the systems of the vehicle 410D, including the ADAS systems 416D. The ECU 414D may, responsive to instructions received from the navigation system 418D, deactivate any unsafe and/or unselected autonomous features for the duration of a journey controlled by the ADAS systems 416D. In this way, the navigation system 418D may control whether ADAS systems 416D are activated or enabled so that they may be activated for a given navigation route.

The sensor set 412D may include any sensors in the vehicle 410D generating sensor data. For example, the sensor set 412D may include short-range sensors and long-range sensors. In some examples of the instant solution, the sensor set 412D of the vehicle 410D may include one or more of the following vehicle sensors: a camera, a Light Detection and Ranging (LiDAR) sensor, an ultrasonic sensor, an automobile engine sensor, a radar sensor, a laser altimeter, a manifold absolute pressure sensor, an infrared detector, a motion detector, a thermostat, a sound detector, a carbon monoxide sensor, a carbon dioxide sensor, an oxygen sensor, a mass airflow sensor, an engine coolant temperature sensor, a throttle position sensor, a crankshaft position sensor, a valve timer, an air-fuel ratio meter, a blind spot meter, a curb feeler, a defect detector, a Hall effect sensor, a parking sensor, a radar gun, a speedometer, a speed sensor, a tire-pressure monitoring sensor, a torque sensor, a transmission fluid temperature sensor, a turbine speed sensor (TSS), a variable reluctance sensor, a vehicle speed sensor (VSS), a water sensor, a wheel speed sensor, a global positioning system (GPS) sensor, a mapping functionality, and any other type of automotive sensor. The navigation system 418D may store the sensor data in the memory 422D.

The communication unit 424D transmits and receives data to and from the network 402D or to another communication channel. In some examples of the instant solution, the communication unit 424D may include a dedicated short-range communication (DSRC) transceiver, a DSRC receiver, and other hardware or software necessary to make the vehicle 410D a DSRC-equipped device.

The vehicle 410D may interact with other vehicles 406D via V2V technology. V2V communication includes sensing radar information corresponding to relative distances to external objects, receiving GPS information of the vehicles, setting areas where the other vehicles 406D are located based on the sensed radar information, calculating probabilities that the GPS information of the object vehicles will be located at the set areas, and identifying vehicles and/or objects corresponding to the radar information and the GPS information of the object vehicles based on the calculated probabilities, in one example.

For a vehicle to be adequately secured, the vehicle must be protected from unauthorized physical access as well as unauthorized remote access (e.g., cyber-threats). To prevent unauthorized physical access, a vehicle is equipped with a secure access system such as a keyless entry in one example. Meanwhile, security protocols are added to a vehicle's computers and computer networks to facilitate secure remote communications to and from the vehicle in one example.

ECUs are nodes within a vehicle that control tasks ranging from activating the windshield wipers to controlling anti-lock brake systems. ECUs are often connected to one another through the vehicle's central network, which may be referred to as a controller area network (CAN). State-of-the-art features such as autonomous driving are strongly reliant on implementing new, complex ECUs such as ADAS, sensors, and the like. While these new technologies have helped improve the safety and driving experience of a vehicle, they have also increased the number of externally-communicating units inside of the vehicle, making them more vulnerable to attack. Below are some examples of protecting the vehicle from physical intrusion and remote intrusion.

In an example of the instant solution, a CAN includes a CAN bus with a high and low terminal and a plurality of ECUs, which are connected to the CAN bus via wired connections. The CAN bus is designed to allow microcontrollers and devices to communicate with each other in an application without a host computer. The CAN bus implements a message-based protocol (i.e., ISO 11898 standards) that allows ECUs to send commands to one another at a root level. Meanwhile, the ECUs represent controllers for controlling electrical systems or subsystems within the vehicle. Examples of the electrical systems include power steering, anti-lock brakes, air-conditioning, tire pressure monitoring, cruise control, and many other features.

In one example, the ECU includes a transceiver and a microcontroller. The transceiver may be used to transmit and receive messages to and from the CAN bus. For example, the transceiver may convert the data from the microcontroller into a format of the CAN bus and also convert data from the CAN bus into a format for the microcontroller. Meanwhile, the microcontroller interprets the messages and also decides what messages to send using ECU software installed therein in one example.

To protect the CAN from cyber threats, various security protocols may be implemented. For example, sub-networks (e.g., sub-networks A and B, etc.) may be used to divide the CAN into smaller sub-CANs and limit an attacker's capabilities to access the vehicle remotely. In one example of the instant solution, a firewall (or gateway, etc.) may be added to block messages from crossing the CAN bus across sub-networks. If an attacker gains access to one sub-network, the attacker will not have access to the entire network. To make sub-networks even more secure, the most critical ECUs are not placed on the same sub-network, in one example.

In addition to protecting a vehicle's internal network, vehicles may also be protected when communicating with external networks such as the Internet. One of the benefits of having a vehicle connection to a data source such as the Internet is that information from the vehicle can be sent through a network to remote locations for analysis. Examples of vehicle information include GPS, onboard diagnostics, tire pressure, and the like. These communication systems are often referred to as telematics because they involve the combination of telecommunications and informatics. Further, the instant solution as described and depicted can be utilized in this and other networks and/or systems, including those that are described and depicted herein.

Figure 4E:
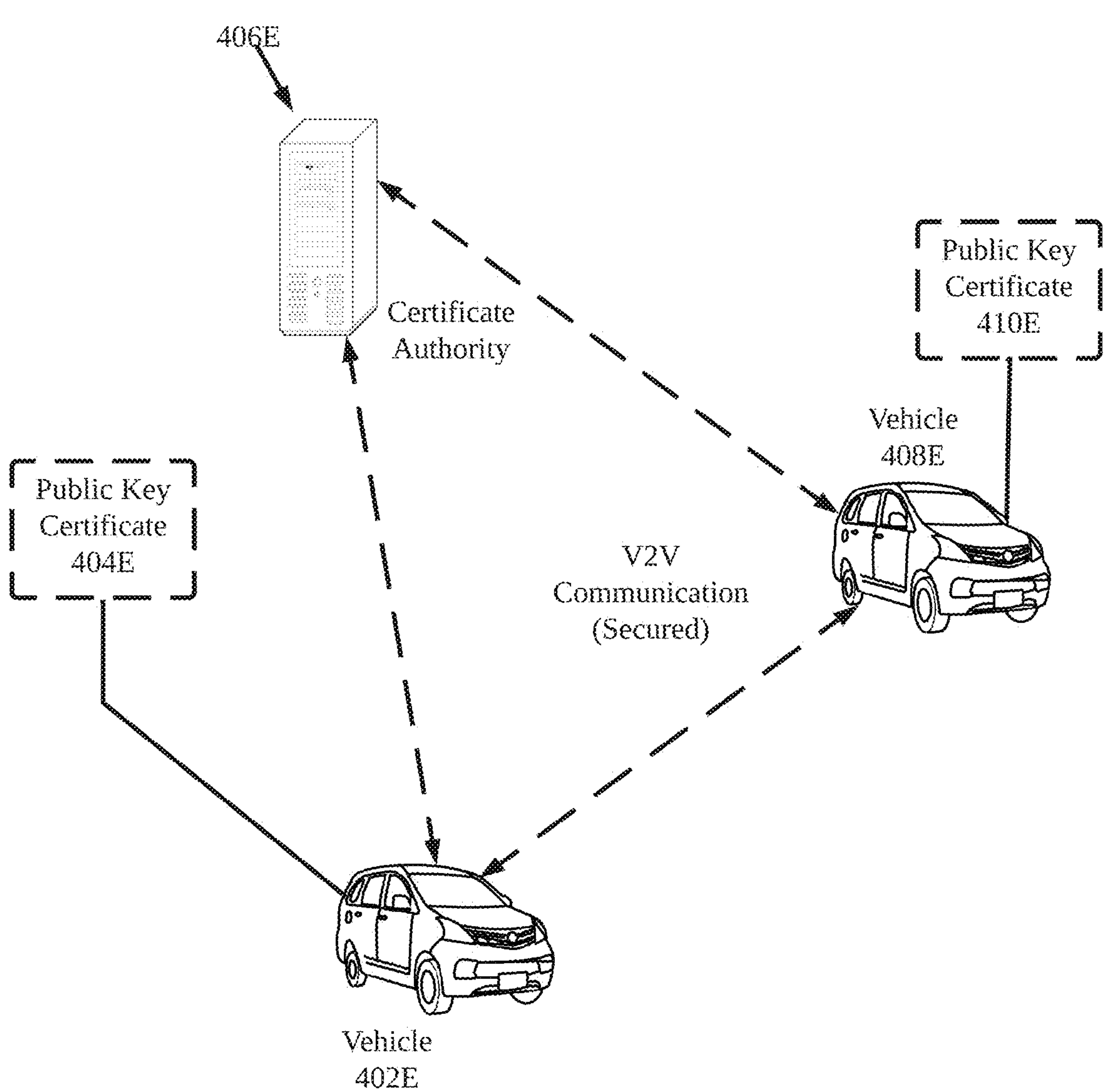
FIG. 4E illustrates yet a further diagram depicting an example of vehicles performing secured Vehicle-to-Vehicle (V2V) communications using security certificates, according to an example of the instant solution.

FIG. 4E illustrates an example 400E of vehicles 402E and 408E performing secured V2V communications using security certificates, according to examples of the instant solution. Referring to FIG. 4E, the vehicles 402E and 408E may communicate via V2V communications over a short-range network, a cellular network, or the like. Before sending messages, the vehicles 402E and 408E may sign the messages using a respective public key certificate. For example, the vehicle 402E may sign a V2V message using a public key certificate 404E. Likewise, the vehicle 408E may sign a V2V message using a public key certificate 410E. The public key certificates 404E and 410E are associated with the vehicles 402E and 408E, respectively, in one example.

Upon receiving the communications from each other, the vehicles may verify the signatures with a certificate authority 406E or the like. For example, the vehicle 408E may verify with the certificate authority 406E that the public key certificate 404E used by vehicle 402E to sign a V2V communication is authentic. If the vehicle 408E successfully verifies the public key certificate 404E, the vehicle knows that the data is from a legitimate source. Likewise, the vehicle 402E may verify with the certificate authority 406E that the public key certificate 410E used by the vehicle 408E to sign a V2V communication is authentic. Further, the instant solution as described and depicted with respect to FIG. 4E can be utilized in this and other networks and/or systems including those that are described and depicted herein.

In some examples of the instant solution, a computer may include a security processor. In particular, the security processor may perform authorization, authentication, cryptography (e.g., encryption), and the like, for data transmissions that are sent between ECUs and other devices on a CAN bus of a vehicle, and also data messages that are transmitted between different vehicles. The security processor may include an authorization module, an authentication module, and a cryptography module. The security processor may be implemented within the vehicle's computer and may communicate with other vehicle elements, for example, the ECUs/CAN network, wired and wireless devices such as wireless network interfaces, input ports, and the like. The security processor may ensure that data frames (e.g., CAN frames, etc.) that are transmitted internally within a vehicle (e.g., via the ECUs/CAN network) are secure. Likewise, the security processor can ensure that messages transmitted between different vehicles and devices attached or connected via a wire to the vehicle's computer are also secured.

For example, the authorization module may store passwords, usernames, PIN codes, biometric scans, and the like for different vehicle users. The authorization module may determine whether a user (or technician) has permission to access certain settings such as a vehicle's computer. In some examples of the instant solution, the authorization module may communicate with a network interface to download any necessary authorization information from an external server. When a user desires to make changes to the vehicle settings or modify technical details of the vehicle via a console or GUI within the vehicle or via an attached/connected device, the authorization module may require the user to verify themselves in some way before such settings are changed. For example, the authorization module may require a username, a password, a PIN code, a biometric scan, a predefined line drawing or gesture, and the like. In response, the authorization module may determine whether the user has the necessary permissions (access, etc.) being requested.

The authentication module may be used to authenticate internal communications between ECUs on the CAN network of the vehicle. As an example, the authentication module may provide information for authenticating communications between the ECUs. As an example, the authentication module may transmit a bit signature algorithm to the ECUs of the CAN network. The ECUs may use the bit signature algorithm to insert authentication bits into the CAN fields of the CAN frame. All ECUs on the CAN network typically receive each CAN frame. The bit signature algorithm may dynamically change the position, amount, etc., of authentication bits each time a new CAN frame is generated by one of the ECUs. The authentication module may also provide a list of ECUs that are exempt (safe list) and that do not need to use the authentication bits. The authentication module may communicate with a remote server to retrieve updates to the bit signature algorithm and the like.

The encryption module may store asymmetric key pairs to be used by the vehicle to communicate with other external user devices and vehicles. For example, the encryption module may provide a private key to be used by the vehicle to encrypt/decrypt communications, while the corresponding public key may be provided to other user devices and vehicles to enable the other devices to decrypt/encrypt the communications. The encryption module may communicate with a remote server to receive new keys, updates to keys, keys of new vehicles, users, etc., and the like. The encryption module may also transmit any updates to a local private/public key pair to the remote server.

Figure 5A:
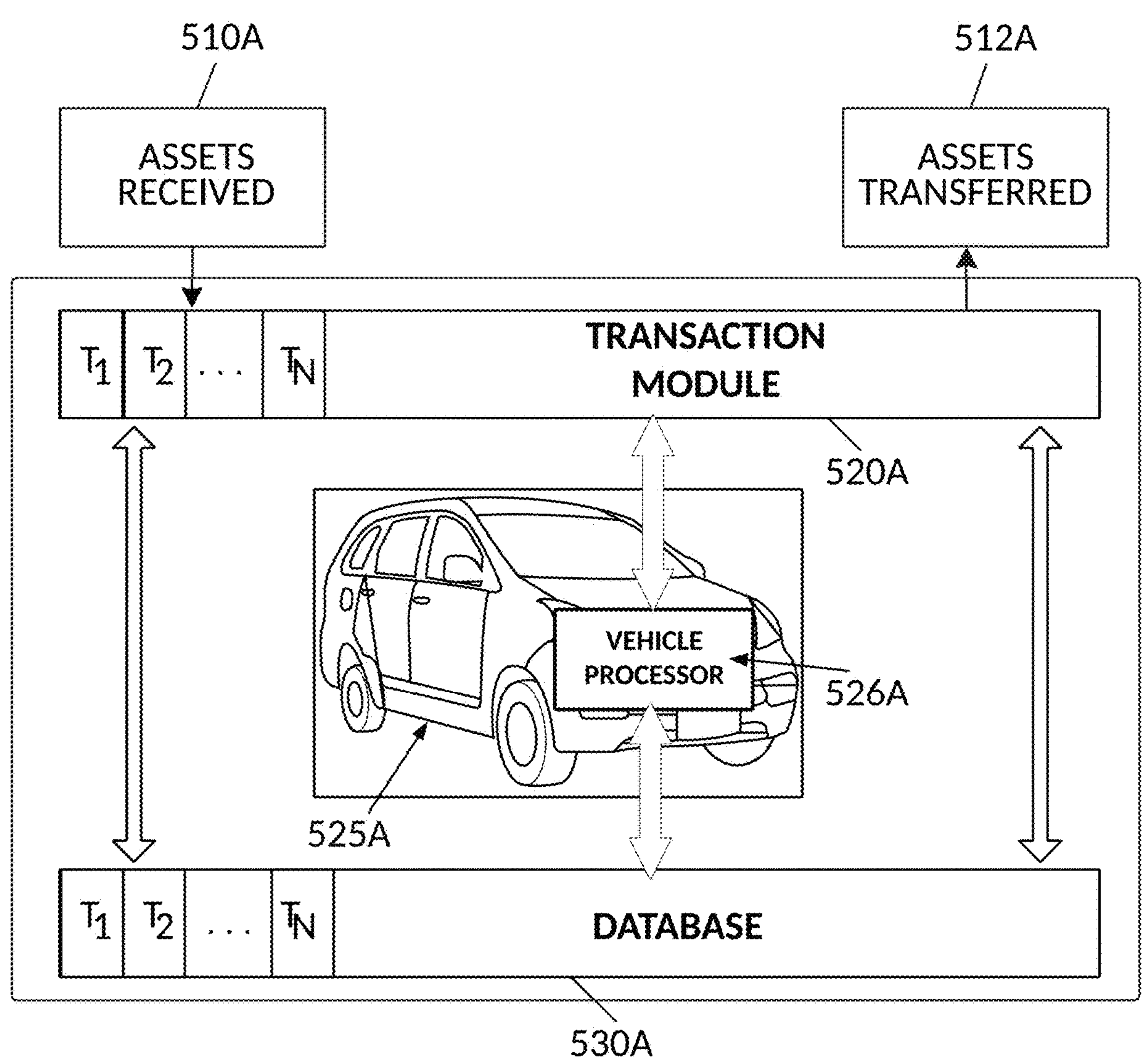
FIG. 5A illustrates an example vehicle configuration for managing database transactions associated with a vehicle, according to an example of the instant solution.

FIG. 5A illustrates an example vehicle configuration 500A for managing database transactions associated with a vehicle, according to examples of the instant solution. Referring to FIG. 5A, as a particular vehicle 525A is engaged in transactions (e.g., vehicle service, dealer transactions, delivery/pickup, transportation services, etc.), the vehicle may receive assets 510A and/or expel/transfer assets 512A according to a transaction(s). A vehicle processor 526A resides in the vehicle 525A and communication exists between the vehicle processor 526A, a database 530A, and the transaction module 520A. The transaction module 520A may record information, such as assets, parties, credits, service descriptions, date, time, location, results, notifications, unexpected events, etc. Those transactions in the transaction module 520A may be replicated into a database 530A. The database 530A can be one of a SQL database, a relational database management system (RDBMS), a relational database, a non-relational database, a blockchain, a distributed ledger, and may be on board the vehicle, may be off-board the vehicle, may be accessed directly and/or through a network, or be accessible to the vehicle.

In one example of the instant solution, a vehicle may engage with another vehicle to perform various actions such as to share, transfer, acquire service calls, etc. when the vehicle has reached a status where the services need to be shared with another vehicle. For example, the vehicle may be due for a battery charge and/or may have an issue with a tire and may be en route to pick up a package for delivery. A vehicle processor resides in the vehicle and communication exists between the vehicle processor, a first database, and a transaction module. The vehicle may notify another vehicle, which is in its network and which operates on its service, such as its blockchain member service. A vehicle processor resides in another vehicle and communication exists between the vehicle processor, a second database, and a transaction module. The another vehicle may then receive the information via a wireless communication request to perform the package pickup from the vehicle and/or from a server (not shown). The transactions are logged in the transaction modules and of both vehicles. The credits are transferred from the vehicle to the other vehicle and the record of the transferred service is logged in the first database. The first database can be one of a SQL database, an RDBMS, a relational database, a non-relational database, a blockchain, a distributed ledger, and may be on board the vehicle, may be off-board the vehicle, may be accessible directly and/or through a network.

Figure 5B:
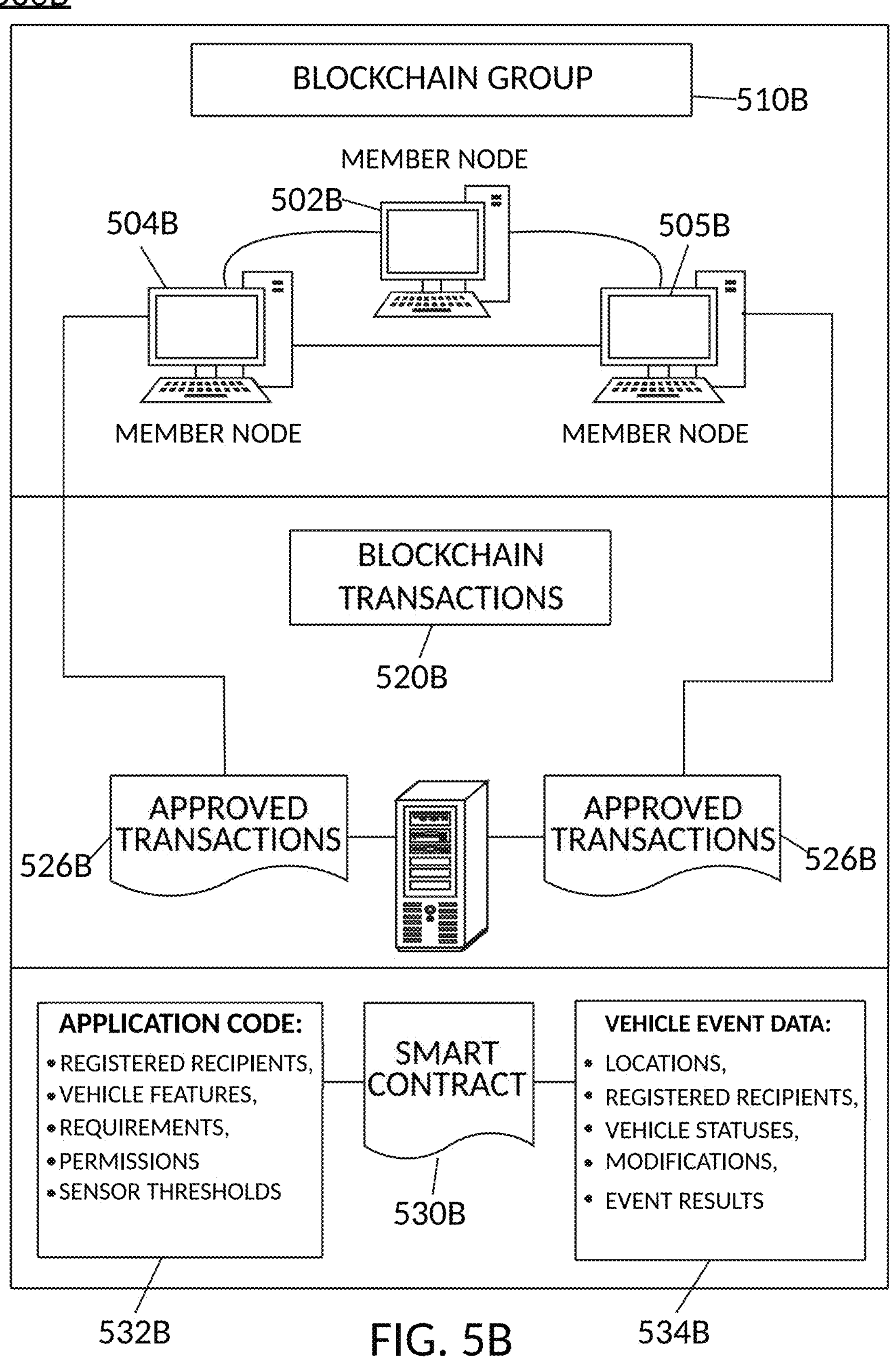
FIG. 5B illustrates an example blockchain group, according to an example of the instant solution.

FIG. 5B illustrates a blockchain architecture configuration 500B, according to examples of the instant solution. Referring to FIG. 5B, the blockchain architecture 500B may include certain blockchain elements, for example, a group of blockchain member nodes 502B-505B as part of a blockchain group 510B. In one example of the instant solution, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 520B are stored in memory of computers as the transactions are received and approved by the consensus model dictated by the members' nodes. Approved transactions 526B are stored in current blocks of the blockchain and committed to the blockchain via a committal procedure, which includes performing a hash of the data contents of the transactions in a current block and referencing a previous hash of a previous block. Within the blockchain, one or more smart contracts 530B may exist that define the terms of transaction agreements and actions included in smart contract executable application code 532B, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/at/below a particular threshold for a particular period of time, then the result may be a change to a current status, which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 534B, such as a location(s) to be traveled, an average speed, a top speed, acceleration rates, whether there were any collisions, was the expected route taken, what is the next destination, whether safety measures are in place, whether the vehicle has enough charge/fuel, etc. All such information may be the basis of smart contract terms 530B, which are then stored in a blockchain. For example, sensor thresholds stored in the smart contract can be used as the basis for whether a detected service is necessary and when and where the service should be performed.

In one example of the instant solution, a blockchain logic example includes a blockchain application interface as an API or plug-in application that links to the computing device and execution platform for a particular transaction. The blockchain configuration may include one or more applications, which are linked to application programming interfaces (APIs) to access and execute stored program/application code (e.g., smart contract executable code, smart contracts, etc.), which can be created according to a customized configuration sought by participants and can maintain their own state, control their own assets, and receive external information. This can be deployed as an entry and installed, via appending to the distributed ledger, on all blockchain nodes.

The smart contract application code provides a basis for the blockchain transactions by establishing application code, which when executed causes the transaction terms and conditions to become active. The smart contract, when executed, causes certain approved transactions to be generated, which are then forwarded to the blockchain platform. The platform includes a security/authorization, computing devices, which execute the transaction management and a storage portion as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors, which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 5A and 5B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code that is registered, stored, and/or replicated with a blockchain (e.g., distributed network of blockchain peers). An entry is an execution of the smart contract code, which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 5C:
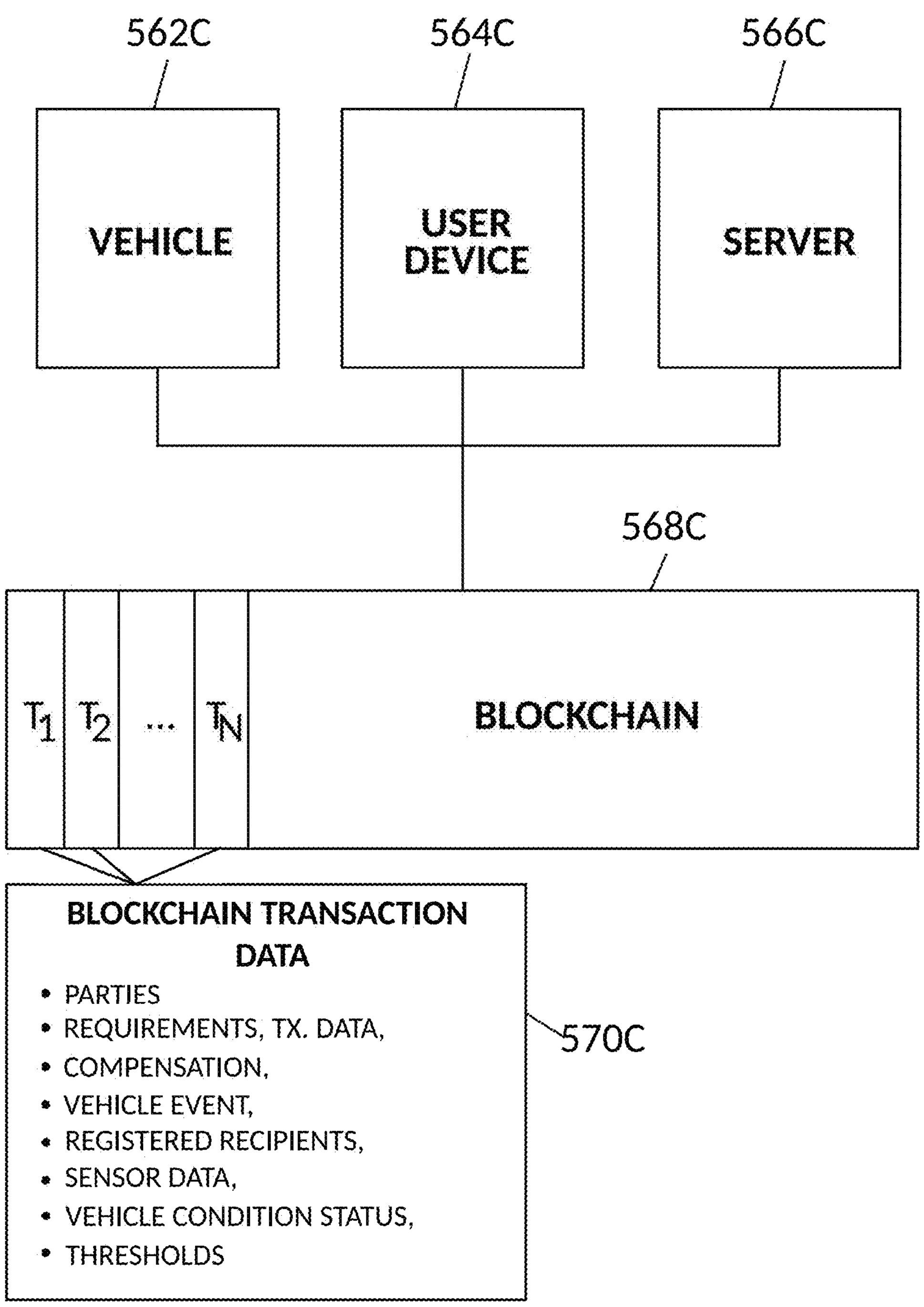
FIG. 5C illustrates an example interaction between elements and a blockchain, according to an example of the instant solution.

FIG. 5C illustrates a blockchain configuration for storing blockchain transaction data, according to examples of the instant solution. Referring to FIG. 5C, the example configuration 500C provides for the vehicle 562C, the user device 564C and a server 566C sharing information with a distributed ledger (i.e., blockchain) 568C. The server may represent a service provider entity inquiring with a vehicle service provider to share user profile rating information in the event that a known and established user profile is attempting to rent a vehicle with an established rated profile. The server 566C may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 570C is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

Figure 5D:
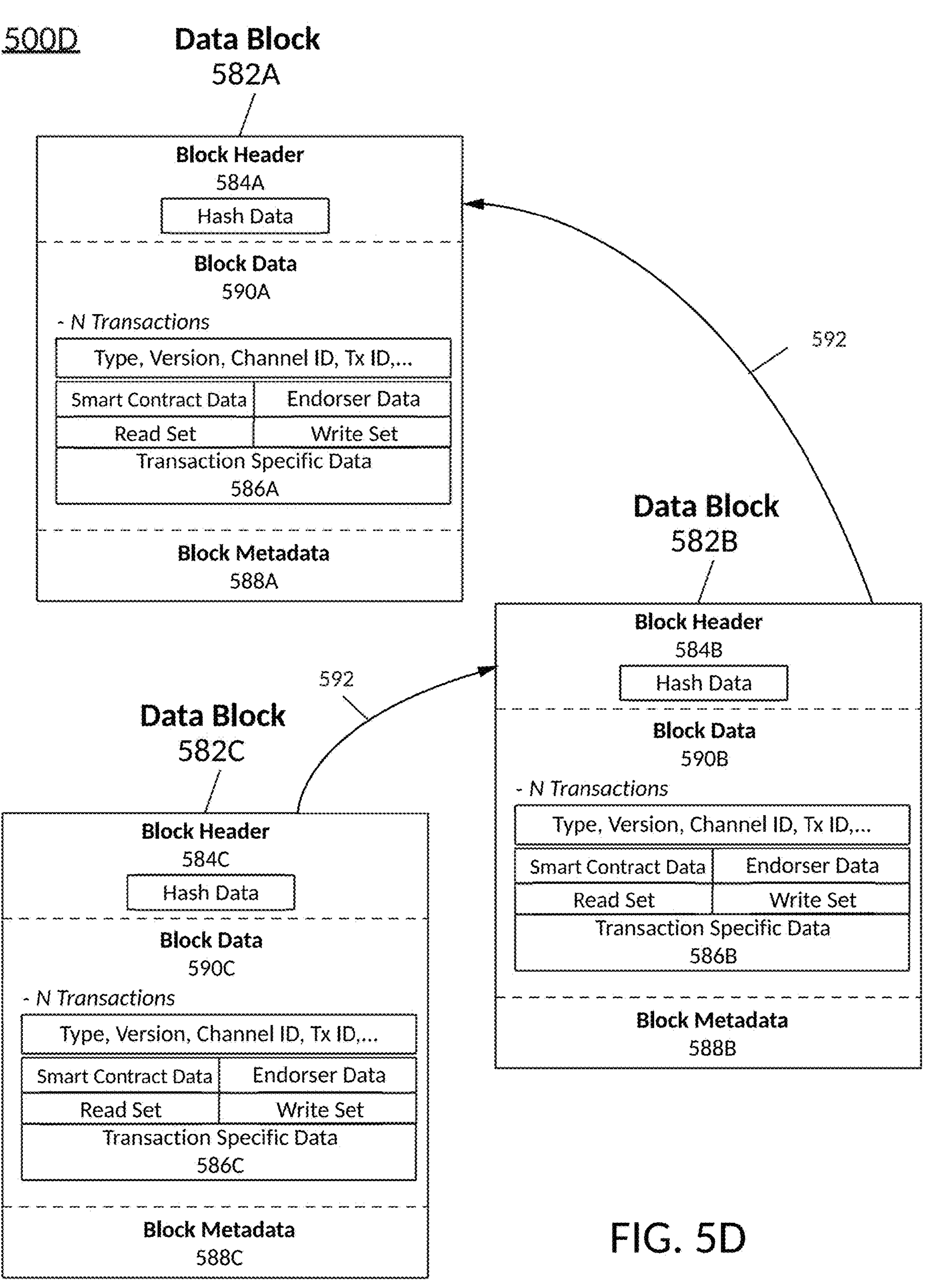
FIG. 5D illustrates an example data block interaction, according to an example of the instant solution.

FIG. 5D illustrates blockchain blocks 500D that can be added to a distributed ledger, according to examples of the instant solution, and contents of block structures 582A to 582*n*. Referring to FIG. 5D, clients (not shown) may submit entries to blockchain nodes to enact activity on the blockchain. As an example, clients may be applications that act on behalf of a requester, such as a device, person, or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers, which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain that stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 5D. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts, which simulate the entry proposals. When an endorsing node endorses an entry, the endorsing node creates an entry endorsement, which is a signed response from the endorsing node to the client application indicating the endorsement of the simulated entry. The method of endorsing an entry depends on an endorsement policy that may be specified within smart contract executable code. An example of an endorsement policy is "the majority of endorsing peers must endorse the entry." Different channels may have different endorsement policies. Endorsed entries are forwarded by the client application to an ordering service.

The ordering service accepts endorsed entries, orders them into a block, and delivers the blocks to the committing peers. For example, the ordering service may initiate a new block when a threshold of entries has been reached, a timer times out, or another condition is met. In this example, a blockchain node is a committing peer that has received a data block 582A for storage on the blockchain. The ordering service may be made up of a cluster of orderers. The ordering service does not process entries, smart contracts, or maintain the shared ledger. Rather, the ordering service may accept the endorsed entries and specify the order in which those entries are committed to the distributed ledger. The architecture of the blockchain network may be designed such that the specific implementation of 'ordering' becomes a pluggable component.

Entries are written to the distributed ledger in a consistent order. The order of entries is established to ensure that the updates to the state database are valid when they are committed to the network. Unlike a cryptocurrency blockchain system where ordering occurs through the solving of a cryptographic puzzle, or mining, in this example the parties of the distributed ledger may choose the ordering mechanism that best suits that network.

Referring to FIG. 5D, a block 582A (also referred to as a data block) that is stored on the blockchain and/or the distributed ledger may include multiple data segments such as a block header 584A to 584*n*, transaction-specific data 586A to 586*n*, and block metadata 588A to 588*n*. It should be appreciated that the various depicted blocks and their contents, such as block 582A and its contents are merely for purposes of an example and are not meant to limit the scope of the examples of the instant solution. In some cases, both the block header 584A and the block metadata 588A may be smaller than the transaction-specific data 586A, which stores entry data; however, this is not a requirement. The block 582A may store transactional information of N entries (e.g., 100, 500, 1000, 2000, 3000, etc.) within the block data 590A to 590*n*. The block 582A may also include a link to a previous block (e.g., on the blockchain) within the block header 584A. In particular, the block header 584A may include a hash of a previous block's header. The block header 584A may also include a unique block number, a hash of the block data 590A of the current block 582A, and the like. The block number of the block 582A may be unique and assigned in an incremental/sequential order starting from zero. The first block in the blockchain may be referred to as a genesis block, which includes information about the blockchain, its members, the data stored therein, etc.

The block data 590A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, an input (smart contract executable code and functions), a client (creator) identifier such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some examples of the instant solution, the block data 590A may also store transaction-specific data 586A, which adds additional information to the hash-linked chain of blocks in the blockchain. Accordingly, the data 586A can be stored in an immutable log of blocks on the distributed ledger. Some of the benefits of storing such data 586A are reflected in the various examples of the instant solution disclosed and depicted herein. The block metadata 588A may store multiple fields of metadata (e.g., as a byte array, etc.). Metadata fields may include signature on block creation, a reference to a last configuration block, an entry filter identifying valid and invalid entries within the block, last offset of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data and a validation code identifying whether an entry was valid/invalid.

The other blocks 582B to 582*n* in the blockchain also have headers, files, and values. However, unlike the first block 582A, each of the headers 584A to 584*n* in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 592, to establish an auditable and immutable chain-of-custody.

Figure 5E:
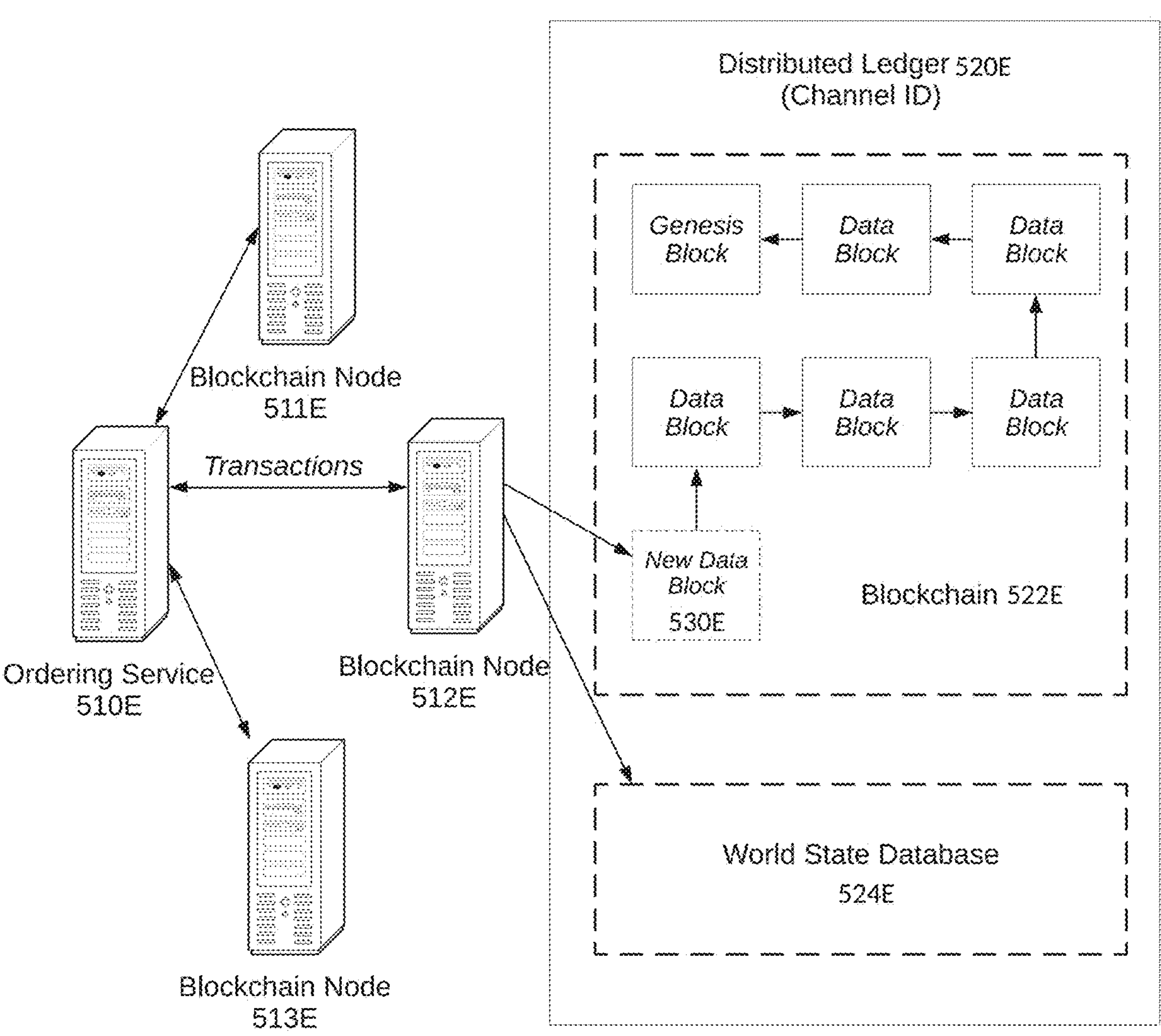
FIG. 5E illustrates a blockchain network diagram, according to an example of the instant solution.

FIG. 5E illustrates a process 500E of a new block being added to a distributed ledger 520E, according to examples of the instant solution, and FIG. 5D illustrates the contents of FIG. 5E's new data block structure 530E for blockchain, according to examples of the instant solution. Referring to FIG. 5E, clients (not shown) may submit transactions to blockchain nodes 511E, 512E, and/or 513E. Clients may be instructions received from any source to enact activity on the blockchain 522E. As an example, clients may be applications that act on behalf of a requester, such as a device, person, or entity to propose transactions for the blockchain. The plurality of blockchain peers (e.g., blockchain nodes 511E, 512E, and 513E) may maintain a state of the blockchain network and a copy of the distributed ledger 520E. Different types of blockchain nodes/peers may be present in the blockchain network including endorsing peers which simulate and endorse transactions proposed by clients and committing peers which verify endorsements, validate transactions, and commit transactions to the distributed ledger 520E. In this example, the blockchain nodes 511E, 512E, and 513E may perform the role of endorser node, committer node, or both.

The distributed ledger 520E includes a blockchain which stores immutable, sequenced records in blocks, and a state database 524E (current world state) maintaining a current state of the blockchain 522E. One distributed ledger 520E may exist per channel and each peer maintains its own copy of the distributed ledger 520E for each channel of which they are a member. The blockchain 522E is a transaction log, structured as hash-linked blocks where each block contains a sequence of N transactions. The linking of the blocks (shown by arrows in FIG. 5E) may be generated by adding a hash of a prior block's header within a block header of a current block. In this way, all transactions on the blockchain 522E are sequenced and cryptographically linked together preventing tampering with blockchain data without breaking the hash links. Furthermore, because of the links, the latest block in the blockchain 522E represents every transaction that has come before it. The blockchain 522E may be stored on a peer file system (local or attached storage), which supports an append-only blockchain workload.

The current state of the blockchain 522E and the distributed ledger 520E may be stored in the state database 524E. Here, the current state data represents the latest values for all keys ever included in the chain transaction log of the blockchain 522E. Chaincode invocations execute transactions against the current state in the state database 524E. To make these chaincode interactions extremely efficient, the latest values of all keys are stored in the state database 524E.

The state database 524E may include an indexed view into the transaction log of the blockchain 522E, and it can therefore be regenerated from the chain at any time. The state database 524E may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing node creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction." Different channels may have different endorsement policies. Endorsed transactions are forwarded by the client application to the ordering service 510E.

The ordering service 510E accepts endorsed transactions, orders them into a block, and delivers the blocks to the committing peers. For example, the ordering service 510E may initiate a new block when a threshold of transactions has been reached, a timer times out, or another condition is met. In the example of FIG. 5E, the blockchain node 512E is a committing peer that has received a new data block 530E for storage on blockchain 522E. The first block in the blockchain may be referred to as a genesis block which includes information about the blockchain, its members, the data stored therein, etc.

The ordering service 510E may be made up of a cluster of orderers. The ordering service 510E does not process transactions, smart contracts, or maintain the shared ledger. Rather, the ordering service 510E may accept the endorsed transactions and specifies the order in which those transactions are committed to the distributed ledger 522E. The architecture of the blockchain network may be designed such that the specific implementation of 'ordering' becomes a pluggable component.

Transactions are written to the distributed ledger 520E in a consistent order. The order of transactions is established to ensure that the updates to the state database 524E are valid when they are committed to the network. Unlike a cryptocurrency blockchain system where ordering occurs through the solving of a cryptographic puzzle, or mining, in this example the parties of the distributed ledger 520E may choose the ordering mechanism that best suits the network.

When the ordering service 510E initializes a new data block 530E, the new data block 530E may be broadcast to committing peers (e.g., blockchain nodes 511E, 512E, and 513E). In response, each committing peer validates the transaction within the new data block 530E by checking to make sure that the read set and the write set still match the current world state in the state database 524E. Specifically, the committing peer can determine whether the read data that existed when the endorsers simulated the transaction is identical to the current world state in the state database 524E. When the committing peer validates the transaction, the transaction is written to the blockchain 522E on the distributed ledger 520E, and the state database 524E is updated with the write data from the read-write set. If a transaction fails, that is, if the committing peer finds that the read-write set does not match the current world state in the state database 524E, the transaction ordered into a block will still be included in that block, but it will be marked as invalid, and the state database 524E will not be updated.

Figure 5F:
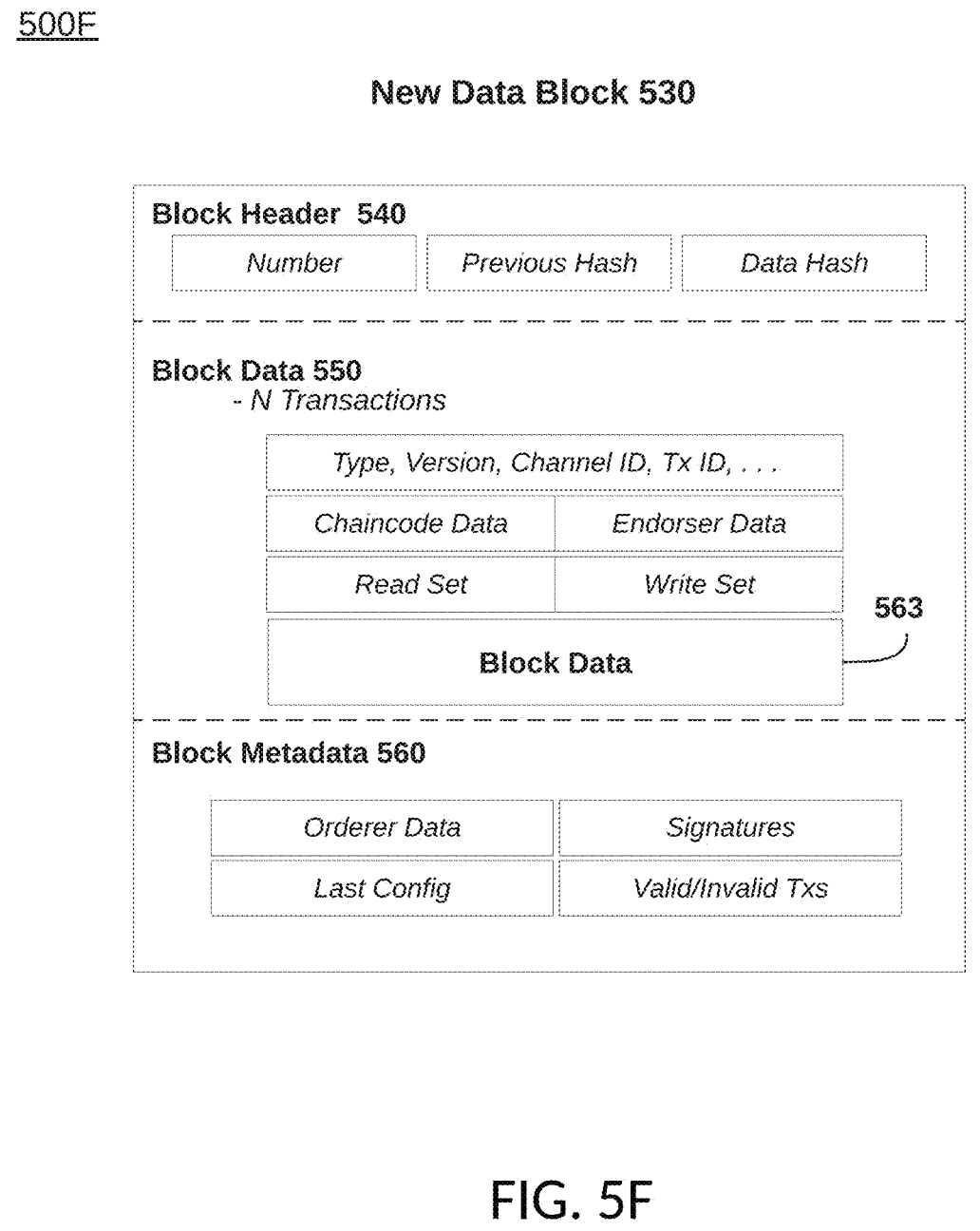

Referring to FIG. 5F 500F, a new data block 530 (also referred to as a data block) that is stored on the blockchain 522E of the distributed ledger 520E may include multiple data segments such as a block header 540, block data 550, and block metadata 560. It should be appreciated that the various depicted blocks and their contents, such as new data block 530 and its contents shown in FIG. 5F, are merely examples and are not meant to limit the scope of the examples of the instant solution. The new data block 530 may store transactional information of N transaction(s) (e.g., 1, 10, 100, 500, 1000, 2000, 3000, etc.) within the block data 550. The new data block 530 may also include a link to a previous block (e.g., on the blockchain 522E in FIG. 5E) within the block header 540. In particular, the block header 540 may include a hash of a previous block's header. The block header 540 may also include a unique block number, a hash of the block data 550 of the new data block 530, and the like. The block number of the new data block 530 may be unique and assigned in various orders, such as an incremental/sequential order starting from zero.

The block data 550 may store transactional information of each transaction that is recorded within the new data block 530. For example, the transaction data may include one or more of a type of the transaction, a version, a timestamp, a channel ID of the distributed ledger 520E (shown in FIG. 5E), a transaction ID, an epoch, a payload visibility, a chaincode path (deploy tx), a chaincode name, a chaincode version, an input (chaincode and functions), a client (creator) identifier such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In one example of the instant solution, the block data 563 may include data comprising charging time duration of a vehicle, content selected for delivery to the vehicle, a reservation time slot at a charging station, real-time attributes of a charging station, and the like.

Although in FIG. 5F the blockchain data 563 is depicted in the block data 550 but may also be located in the block header 540 or the block metadata 560.

The block metadata 560 may store multiple fields of metadata (e.g., as a byte array, etc.). Metadata fields may include signature on block creation, a reference to a last configuration block, a transaction filter identifying valid and invalid transactions within the block, last offset of an ordering service that ordered the block, and the like. The signature, the last configuration block, and the orderer metadata may be added by the ordering service 510E in FIG. 5E. Meanwhile, a committer of the block (such as blockchain node 512E in FIG. 5E) may add validity/invalidity information based on an endorsement policy, verification of read/write sets, and the like. The transaction filter may include a byte array of a size equal to the number of transactions in the block data and a validation code identifying whether a transaction was valid/invalid.

The above examples of the instant solution may be implemented in hardware, in a computer program executed by a processor, in firmware, or in a combination of the above. A computer program may be embodied on a computer-readable storage medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternate, the storage medium may be integral to the processor. The processor and the storage medium may reside in an application-specific integrated circuit ("ASIC"). In the alternate, the processor and the storage medium may reside as discrete components. For example, FIG. 6 illustrates an example computing system architecture 600, which may represent or be integrated in any of the above-described components, etc.

Figure 6:
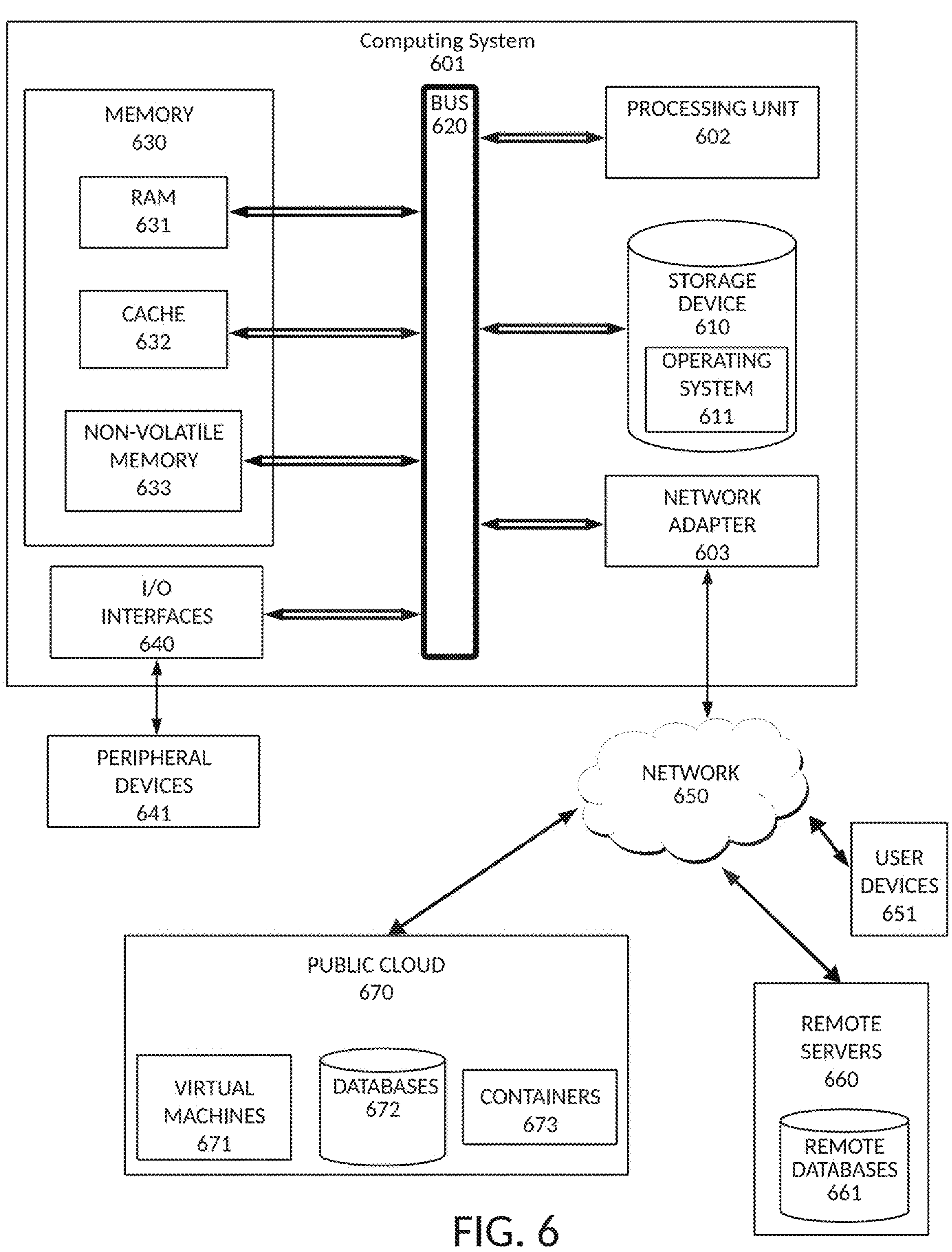
FIG. 6 illustrates an example system that supports one or more of the examples of the instant solution.

FIG. 6 illustrates a computing environment according to examples of the instant solution. FIG. 6 is not intended to suggest any limitation as to the scope of use or functionality of examples of the instant solution of the application described herein. Regardless, the computing environment 600 can be implemented to perform any of the functionalities described herein. In computer environment 600, computing system 601 is operational within numerous other general-purpose or special-purpose computing system environments or configurations.

Computing system 601 may take the form of a desktop computer, laptop computer, tablet computer, smartphone, smartwatch or other wearable computer, server computing system, thin client, thick client, network PC, minicomputing system, mainframe computer, quantum computer, and distributed cloud computing environment that includes any of the described systems or devices, and the like or any other form of computer or mobile device now known or to be developed in the future that is capable of running a program, accessing a network 650 or querying a database. Depending upon the technology, the performance of a computer-implemented method may be distributed among multiple computers and between multiple locations. However, in this presentation of the computing environment 600, a detailed discussion is focused on a single computer, specifically computing system 601, to keep the presentation as simple as possible.

Computing system 601 may be located in a cloud, even though it is not shown in a cloud in FIG. 6. On the other hand, computing system 601 is not required to be in a cloud except to any extent as may be affirmatively indicated. Computing system 601 may be described in the general context of computing system-executable instructions, such as program modules, executed by a computing system 601. Generally, program modules may include routines, programs, objects, components, logic, data structures, and so on that perform tasks or implement certain abstract data types. As shown in FIG. 6, computing system 601 in computing environment 600 is shown in the form of a general-purpose computing device. The components of computing system 601 may include, but are not limited to, one or more processors or processing units 602, a system memory 630, and a bus 620 that couples various system components, including system memory 630 to processing unit 602.

Processing unit 602 includes one or more computer processors of any type now known or to be developed. The processing unit 602 may contain circuitry distributed over multiple integrated circuit chips. The processing unit 602 may also implement multiple processor threads and multiple processor cores. Cache 632 is a memory that may be in the processor chip package(s) or located "off-chip," as depicted in FIG. 6. Cache 632 is typically used for data or code that the threads or cores running on the processing unit 602 should be available for rapid access. In some computing environments, processing unit 602 may be designed to work with qubits and perform quantum computing.

Network adapter 603 enables the computing system 601 to connect and communicate with one or more networks 650, such as a local area network (LAN), a wide area network (WAN), and/or a public network (e.g., the Internet). It bridges the computer's internal bus 620 and the external network, exchanging data efficiently and reliably. The network adapter 603 may include hardware, such as modems or Wi-Fi® signal transceivers, and software for packetizing and/or de-packetizing data for communication network transmission. Network adapter 603 supports various communication protocols to ensure compatibility with network standards. For Ethernet connections, it adheres to protocols such as IEEE 802.3, while for wireless communications, it might support IEEE 802.11 standards, Bluetooth®, near-field communication (NFC), or other network wireless radio standards.

Computing system 601 may include a removable/non-removable, volatile/non-volatile computer storage device 610. By way of example only, storage device 610 can be a non-removable, non-volatile magnetic media (not shown and typically called a "hard drive"). One or more data interfaces can connect it to the bus 620. In examples of the instant solution where computing system 601 is required to have a large amount of storage (for example, where computing system 601 locally stores and manages a large database), then this storage may be provided by storage devices 610 designed for storing very large amounts of data, such as a storage area network (SAN) that is shared by multiple, geographically distributed computers.

The operating system 611 is software that manages computing system 601 hardware resources and provides common services for computer programs. Operating system 611 may take several forms, such as various known proprietary operating systems or open-source Portable Operating System Interface type operating systems that employ a kernel.

The bus 620 represents one or more of several types of bus structures, including a memory bus or memory controller, a peripheral bus, an accelerated graphics port, and a processor or local bus using various bus architectures. By way of example, and not limitation, such architectures include Industry Standard Architecture (ISA) buses, Micro Channel Architecture (MCA) buses, Enhanced ISA (EISA) buses, Video Electronics Standards Association (VESA) local buses, and Peripheral Component Interconnect (PCI) bus. The bus 620 is the signal conduction path that allows the various components of computing system 601 to communicate with each other.

Memory 630 is any volatile memory now known or to be developed in the future. Examples include dynamic random-access memory (RAM 631) or static type RAM 631. Typically, the volatile memory is characterized by random access, but this is not required unless affirmatively indicated. In computing system 601, memory 630 is in a single package and is internal to computing system 601, but alternately or additionally, the volatile memory may be distributed over multiple packages and/or located externally with respect to computing system 601. By way of example only, memory 630 can be provided for reading from and writing to a non-removable, non-volatile magnetic media (shown as storage device 610, and typically called a "hard drive"). Memory 630 may include at least one program product having a set (e.g., at least one) of program modules configured to carry out various functions. A typical computing system 601 may include cache 632, a specialized volatile memory generally faster than RAM 631 and generally located closer to the processing unit 602. Cache 632 stores frequently accessed data and instructions accessed by the processing unit 602 to speed up processing time. The computing system 601 may include non-volatile memory 633 in ROM, PROM, EEPROM, and flash memory. Non-volatile memory 633 often contains programming instructions for starting the computer, including the basic input/output system (BIOS) and information required to start the operating system 611.

Computing system 601 may also communicate with one or more peripheral devices 641 via an input/output (I/O) interface 640. Such devices may include a keyboard, a pointing device, a display, etc.; one or more devices that enable a user to interact with computing system 601; and/or any devices (e.g., network card, modem, etc.) that enable computing system 601 to communicate with one or more other computing devices. Such communication can occur via I/O interfaces 640. As depicted, I/O interface 640 communicates with the other components of computing system 601 via bus 620.

Network 650 is any computer network that can receive and/or transmit data. Network 650 can include a WAN, LAN, private cloud, or public Internet, capable of communicating computer data over non-local distances by any technology that is now known or to be developed in the future. Any connection depicted can be wired and/or wireless and may traverse other components that are not shown. In some examples of the instant solution, a network 650 may be replaced and/or supplemented by LANs designed to communicate data between devices located in a local area, such as a Wi-Fi® network. The network 650 typically includes computer hardware such as copper transmission cables, optical transmission fibers, wireless transmission, routers, firewalls, switches, gateway computers, edge servers, and network infrastructure known now or to be developed in the future. Computing system 601 connects to network 650 via network adapter 603 and bus 620.

User devices 651 are any computing systems used and controlled by an end user in connection with computing system 601. For example, in a hypothetical case where computing system 601 is designed to provide a recommendation to an end user, this recommendation may typically be communicated from network adapter 603 of computing system 601 through network 650 to a user device 651, allowing user device 651 to display, or otherwise present, the recommendation to an end user. User devices can be a wide array of devices, including personal computers (PCs), laptops, tablets, hand-held, mobile phones, etc.

Remote servers 660 are any computers that serve at least some data and/or functionality over a network 650, for example, WAN, a virtual private network (VPN), a private cloud, or via the Internet to computing system 601. These networks 650 may communicate with a LAN to reach users. The user interface may include a web browser or an application that facilitates communication between the user and remote data. Such applications have been called "thin" desktops or "thin clients." Thin clients typically incorporate software programs to emulate desktop sessions. Mobile applications can also be used. Remote servers 660 can also host remote databases 661, with the database located on one remote server 660 or distributed across multiple remote servers 660. Remote databases 661 are accessible from database client applications installed locally on the remote server 660, other remote servers 660, user devices 651, or computing system 601 across a network 650.

A public cloud 670 is an on-demand availability of computing system resources, including data storage and computing power, without direct active management by the user. Public clouds 670 are often distributed, with data centers in multiple locations for availability and performance. Computing resources on public clouds 670 are shared across multiple tenants through virtual computing environments comprising virtual machines 671, databases 672, containers 673, and other resources. A container 673 is an isolated, lightweight software for running an application on the host operating system 611. Containers 673 are built on top of the host operating system's kernel and contain only applications and some lightweight operating system APIs and services. In contrast, virtual machine 671 is a software layer that includes a complete operating system 611 and kernel. Virtual machines 671 are built on top of a hypervisor emulation layer designed to abstract a host computer's hardware from the operating software environment. Public clouds 670 generally offer hosted databases 672 abstracting high-level database management activities. It should be further understood that one or more of the elements described or depicted in FIG. 6 can perform one or more of the actions, functionalities, or features described or depicted herein. Computing environment 600, which may be located in or associated with a vehicle, enhances the functionality and interoperability of components, including computing systems within vehicles. The architecture incorporates a processor and a storage medium, which can be integrated with the processor or configured as separate components. This flexible setup allows for customization based on specific vehicular computing needs, whether embedded within an application-specific integrated circuit (ASIC) for dedicated tasks or as discrete units for modular scalability. The computing system, depicted in FIG. 6, demonstrates adaptability to various vehicular settings, from passenger cars and commercial trucks to autonomous and connected vehicles, supporting a range of functionalities.

Computing system 601 includes a processing unit 602 connected to a system memory 630 via a bus 620. This configuration facilitates the rapid processing and communication necessary for real-time vehicular operations, such as navigation, telematics, and autonomous driving functionalities. A network adapter 603 ensures the system's connectivity to at least vehicular networks and the Internet of Vehicles (IoV), as well as supporting protocols and standards essential for vehicular communication, safety, and entertainment systems.

Storage solutions within the computing system 601 support the robust data requirements of vehicles, from storing extensive maps and software updates to logging vehicle diagnostics and telematics information. The system's operating system 611 is designed to manage these resources efficiently.

The bus architecture 620 is tailored to vehicular needs, supporting high-speed data transfer and reliable communication between the computing system's components, essential for the timely execution of vehicular functions. Memory 630, including both volatile and non-volatile options, is optimized for the operational demands of vehicles, providing the necessary speed and capacity for tasks ranging from immediate processing needs to long-term data storage.

Peripheral interfaces 641 and I/O interfaces 640 are integrated to facilitate interaction with other vehicular systems and components, such as sensors, actuators, and user interfaces, highlighting the system's capacity for vehicular integration. Moreover, the system's design accounts for connectivity with external networks 650, including at least dedicated vehicular communication networks.

One or more of the components described or depicted herein, including at least vehicle 202, computer 224, vehicle node 310, AI/ML systems 330/340/360/332, computers/servers 410C/414C/418C/424C/428C/432C/436C/442C/406C, server 418D, server 404E, Certificate Authority 3061, Member Nodes 502B-505B, server 566C, and servers 510E-513E, may be one or more of the components including at least 601, 641, 650, 651, 660, 670, and 671.

According to various additional embodiments, a system described herein may implement a geofence-based content delivery system that activates specific parameters, features, and content delivery as a vehicle approaches, but before the vehicle enters, a geographic location of a charging station (CS). This solution focuses on enhancing user experience and ensuring secure and personalized content delivery through a combination of geofencing, real-time vehicle data, and multi-factor authentication.

For example, the system may operate by establishing a geofence around the charging station. The geofence may be defined using GPS coordinates of the charging station and generating a virtual boundary line around the charging station that includes GPS coordinates that are a predefined distance away from the GPS coordinates of the charging station. For example, the geofence may have a predefined shape such as a circle, oval, rectangle, triangle, or the like, with the center of the predefined shape representing a location of the charging station.

As the vehicle nears this geofence, certain parameters and features are triggered based on the vehicle's proximity to the CS. For example, when the vehicle enters the geofenced area, the system may automatically activate specific content on the vehicle's infotainment system or associated mobile devices. This content could include location-specific information, advertisements, entertainment options, or reminders related to the charging process.

As another example, when the vehicle enters the geofence or the charging area (location of the charging station), the system may perform an additional layer of verification by reading the vehicle's license plate using sensors such as cameras, infrared, etc. and also using optical character recognition (OCR) on the image data to identify the characters on the license plate. This license plate reading may be an initial step in a multi-factor authentication process, ensuring that the correct vehicle is being serviced and that the content delivered is relevant and secure.

Following the license plate verification, the system may check the vehicle's onboard systems and associated devices for further validation. For example, the system may authenticate the user by cross-referencing the vehicle's identification number (VIN) with the user's profile, ensuring that the content being delivered is matched to the correct user. Additionally, the system may analyze previously consumed content on the vehicle's infotainment system or linked mobile devices to further refine the content delivery, making it more personalized and context-specific.

The system may also provide a honing process that adjusts the level of validation and verification based on the content type and user behavior. For example, if the content being delivered is highly personalized or involves secure transactions, the system may require additional authentication steps, such as a biometric scan (e.g., fingerprint or facial recognition) on the user's mobile device. Conversely, for less sensitive content, the system might rely solely on the geofence trigger and license plate recognition. This solution also considers the scenario where the destination is the charging station itself. When the system detects that the CS is the end destination, it can preemptively prepare the vehicle and associated devices for the charging session, queuing up relevant content or features to be activated as soon as the vehicle enters the geofence. This could include adjusting the vehicle's settings, pre-loading specific content on the infotainment system, or sending notifications to the user's mobile device about nearby amenities or services.

Figure 7A:
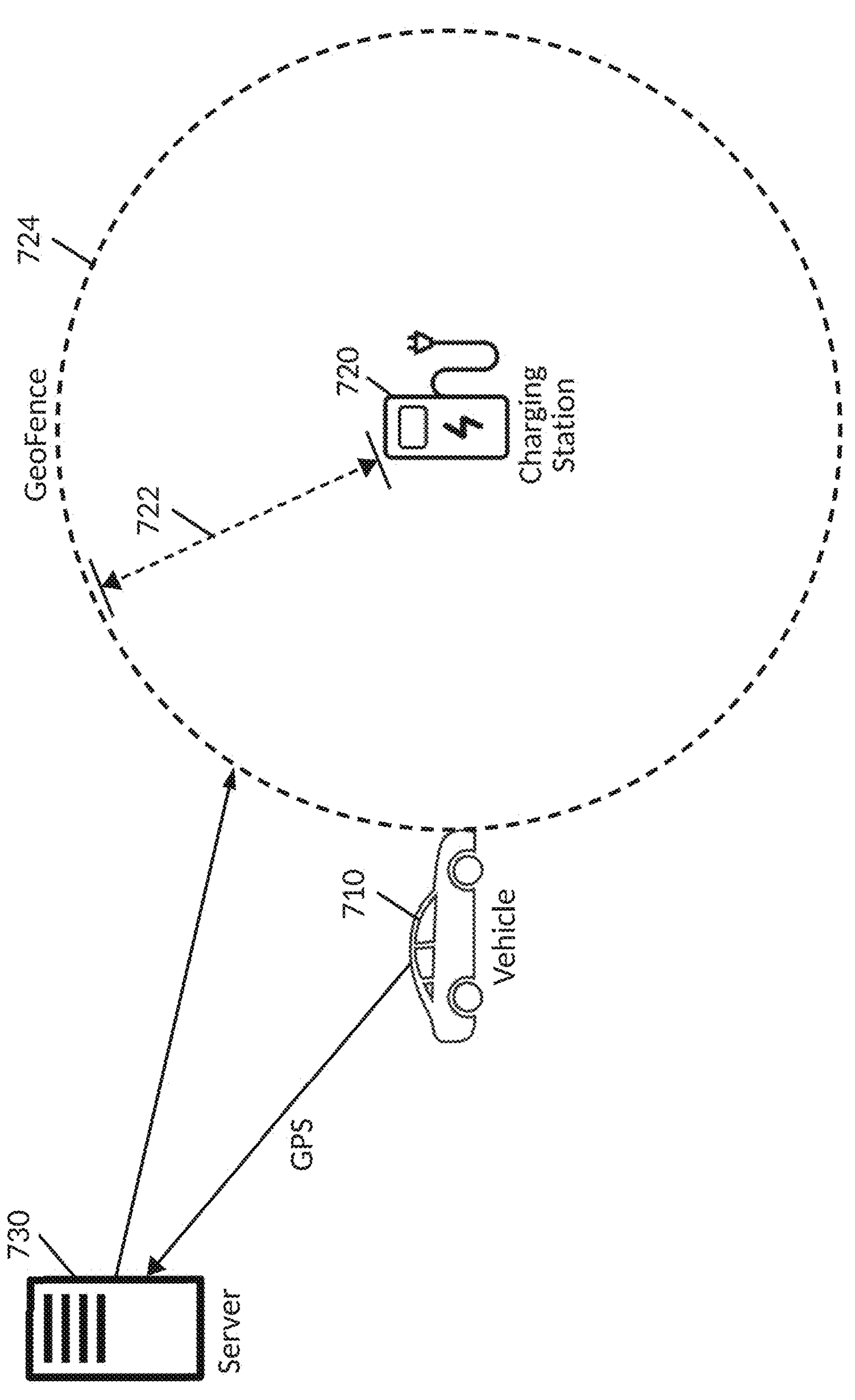
FIGS. 7A-7C are diagrams illustrating a process of delivering content to a vehicle when the vehicle enters a geofence around a charging station according to examples of the instant solution.
Figure 7B:
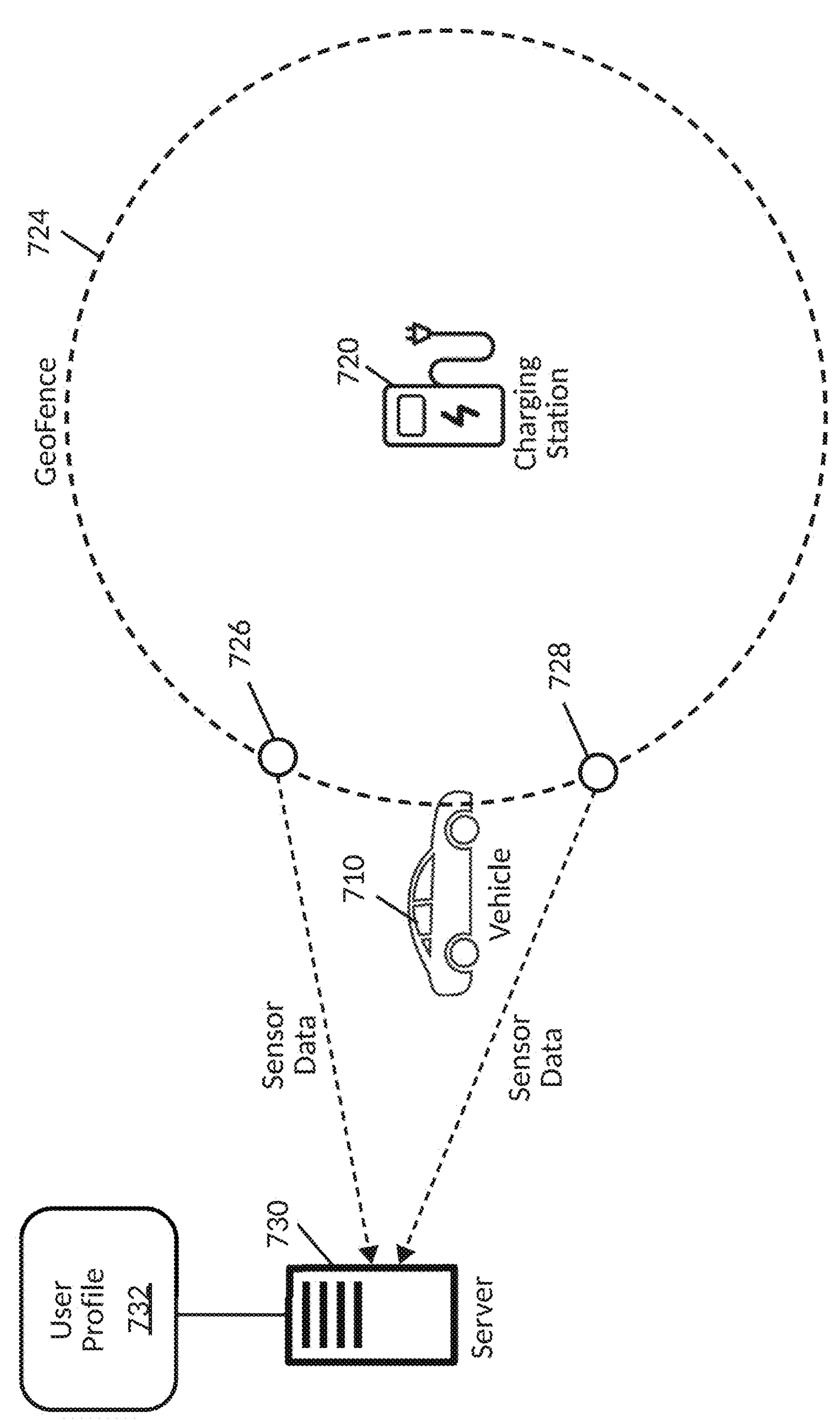
Figure 7C:
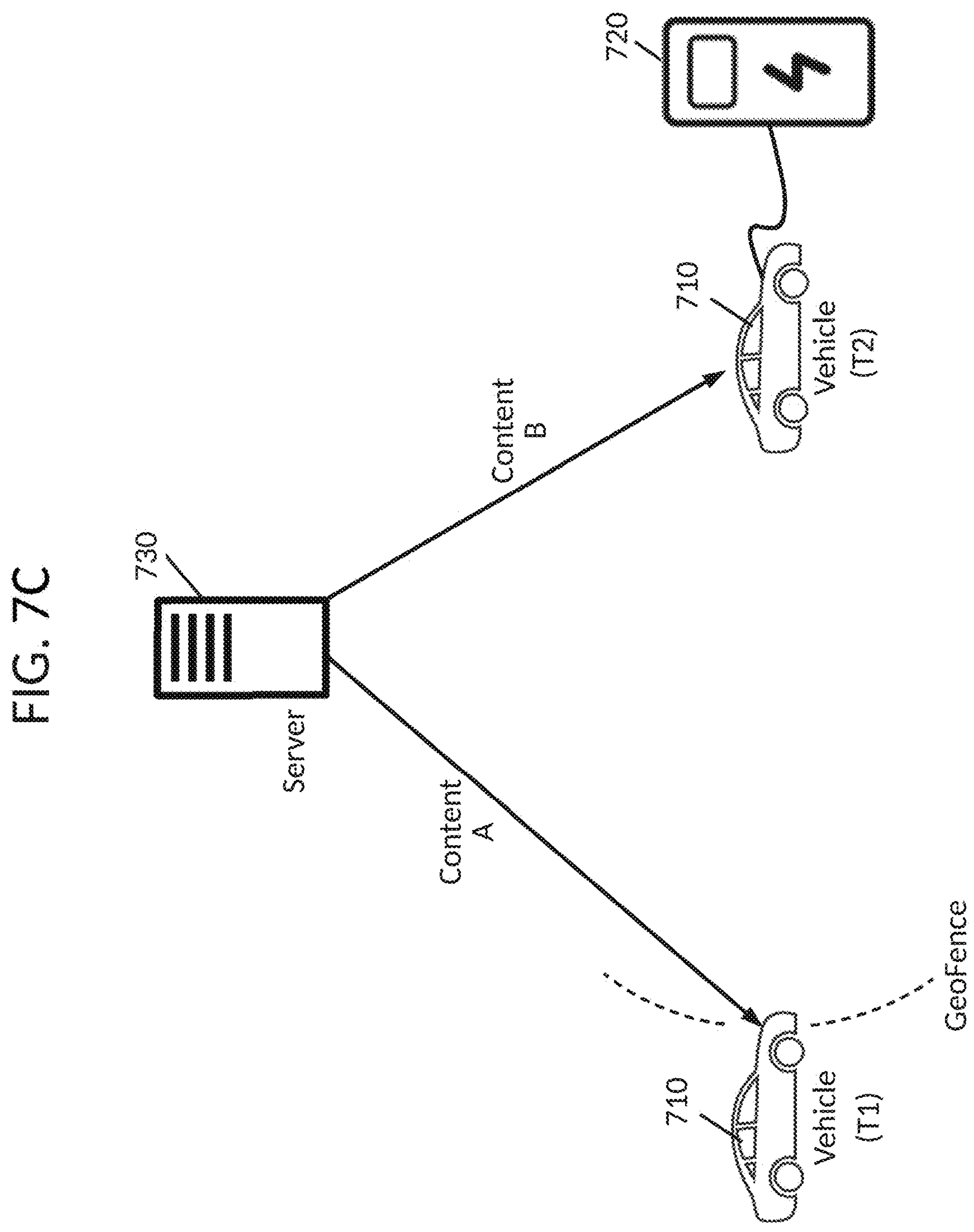

FIGS. 7A-7C illustrate a process of delivering content to a vehicle when the vehicle enters a geofence around a charging station according to examples of the instant solution. For example, FIG. 7A illustrates a process 700A of a vehicle 710 traversing a geographic boundary line of a geofence 724 around a charging station 720 according to an example embodiment.

Referring to FIG. 7A, the server 730 may establish the geofence 724 around the charging station 720 using a predefined shape such as a circle, etc. Here, the server 730 may use the GPS location of the charging station 720 as a center of the geofence 724, and add a distance 722 around the charging station 720 in all directions to create the geofence 724. Here, the distance 722 may correspond to a radius of the circle, etc.

According to various embodiments, the geofence 724 may be a virtual geographic boundary line that is defined using a server 730. Here, the server 730 may have installed therein a GPS-based mapping software. The vehicle 710 may iteratively capture GPS coordinates of the vehicle 710 from a satellite using sensors on the vehicle 710, and transmit the GPS coordinates of the vehicle 710 in real-time to the server 730. This enables the server 730 to detect if/when the vehicle traverses into the geofence 724 (in real-time). As an example, an outer boundary of the geofence 724 may be at least 1000 feet, 2000 feet, 1 mile, 2 miles, 5 miles, etc. from the location of the charging station 720.

According to various embodiments, the server 730 may deliver content to the vehicle 710 in response to the vehicle 710 entering the geofence 724 around the charging station, and before the vehicle 710 reaches the charging station 720. In other words, by entering into a predefined area (i.e., the geofence 724) outside of the charging station 720, the server 730 may deliver content to the vehicle 710. The content may entice the vehicle 710 to provide charge to the charging station 720 (bi-directional transfer of charge, etc.). As another example, the content may include a benefit, incentive, etc. to be provided to the vehicle 710 for receiving or providing charge at the charging station 720. As another example, the content may include entertainment content, music, movies, news, etc.

FIG. 7B illustrates a process 700B of verifying an identity of the vehicle 710 as it enters the geofence 724 around the charging station 720 according to an example embodiment. Referring to FIG. 7B, the server 730 may verify the vehicle 710 prior to or after delivering content to the vehicle 710 in response to the vehicle entering the geofence 724. In this example, one or more sensors such as sensors 726 and 728 may capture image data, infrared data, etc. of the vehicle 710 as it enters the geofence 724, and perform optical character recognition of the image data to identify a license plate number of the vehicle 710.

In some embodiments, a user profile 732 associated with the vehicle 710 may be recorded at the server 730 and may be used to verify that the user is registered for services from the server 730 using the license plate number. For example, the server 730 may receive the license plate data from the sensors 726 and 728 and identify the user profile 732 which is associated with the license plate. In this case, the user profile 732 may include an identifier of the license plate. The server 730 may verify that the user is registered to receive services. The verification may ensure that the vehicle 710 is registered for services and content, etc.

As another example, the server 730 may identify content preferences, shopping preferences, news preferences, entertainment preferences, and the like, of the user from the user profile 732. According to various embodiments, the server 730 may use the preferences to select optimal content to be delivered from the server 730 to the vehicle 710. For example, the server 730 may select content that matches the preferences of the user found in the user profile 732. Although not shown in FIG. 7B, the server 730 may also access an onboard system of the vehicle 730 and obtain a VIN number of the vehicle, etc. for additional verification of the vehicle 710.

FIG. 7C illustrates a process 700C of delivering content from the server 730 to the vehicle 710 at different locations along a route of the vehicle 710 according to an example of the instant solution. Referring to FIG. 7C, the server 730 may initially deliver a first piece of content to the vehicle 710 when the vehicle reaches the geofence 724 around the charging station 720 at a first point in time. Meanwhile, when the vehicle 710 reaches the charging station 720 at a second point in time after the first point in time and begins perform a charging operation with the charging station 720, the server 730 may deliver additional/different content to the vehicle 710.

As an example, the server 730 may initially deliver a first portion of a piece of content only, and require the vehicle 710 to perform a charging operation with the charging station 720 before receiving a remaining portion of the piece of content. As another example, the server 730 may initially deliver an offer for content to the vehicle 710 with advertisements, news, webpages, etc. when the vehicle 710 reaches the geofence 724, and may provide the content to the vehicle 710 when the vehicle 710 begins the charging operation at the charging station 720. Here, the server 730 may bi-furcate the content delivery process at different points in time including a first point in time at which the vehicle 710 enters the geofence 724 and a second point in time at which the vehicle 710 starts the charging operation.

As another example, at the first point in time when the vehicle enters the geofence 724, the server 730 may provide a description of a feature installed on the vehicle 710 that will be activated if the vehicle 710 performs a charging operation at the charging station 720. Meanwhile, when the vehicle 710 begins the charging operation, at the second point in time, the server 730 may trigger an activation of the feature on the vehicle 710 by sending a software update, a key, a passcode, a serial number, or the like. An example of the feature activation process is shown and described with respect to FIG. 1C.

In some embodiments, the vehicle 710 may include multiple display devices (GUIs) which are capable of displaying the content from the server 730. In this example, the content that is delivered to the vehicle 710 may be delivered to a head unit, vehicle computer, or other centralized location within the vehicle 710. Here, the vehicle 710 may control which display device receives the content from among the multiple display devices. For example, the vehicle 710 may use sensor data to identify a location of an occupant (or multiple occupants) and deliver the content to a GUI that is nearest the occupant or multiple GUIs that are nearest the multiple occupants, respectively. In some embodiments, when delivering to multiple GUIs, the vehicle 710 may simultaneously output the content on multiple GUIs.

The geofence 724 that is generated around the charging station 720 may be generated using a predefined software library, application programming interface (API), mapping software, and the like. The software may draw a virtual line on a map around a location of the charging station 720 on the map. The result is an area around the charging station 720 which is encompassed by the geofence 724. The software may use GPS coordinates to represent the virtual line, and may also compare the GPS coordinates of the virtual line to GPS coordinates of a vehicle to detect when the vehicle enters the geofence 724.

According to additional embodiments, the system described herein may pair charging station reservations with targeted content delivery, incentivizing vehicles that arrive in a timely manner to thereby increase the efficient utilization of charging bays. This solution leverages reservation data to offer personalized rewards or complimentary services, thus enhancing user experience and ensuring a smoother operation of charging facilities.

In this system, users can make reservations at a specific charging station for a designated time slot. The reservation system is integrated with the content delivery platform, allowing it to tailor content based on the reservation details and user preferences. For example, when a user reserves a charging slot, they are informed that arriving on time within their scheduled window will grant them complimentary access to a particular service or benefit, such as free Wi-Fi®, premium entertainment content, discounts at nearby businesses, or a complementary refreshment.

As the user's reserved charging window approaches, the system may deliver tailored notifications and reminders through various channels, such as the vehicle's infotainment system, mobile devices, or even wearable technology. These notifications not only remind the user of their upcoming reservation but also highlight the benefits they will receive by arriving on time, thus encouraging punctuality. Upon the vehicle's arrival at the charging station within the reserved time slot, the system automatically verifies the reservation and triggers the delivery of the promised complimentary service. This verification may include checking the vehicle's license plate, validating the user's identity through their associated mobile device, or confirming the reservation via a QR code or similar method.

The delivery of the complimentary service is seamlessly integrated into the content delivery platform. For instance, if the reward is free access to a streaming service, the user can immediately begin enjoying premium content on the in-car infotainment system or their mobile device while the vehicle charges. Alternatively, if the reward is a discount at a nearby restaurant, the system might push a notification to the user's smartphone with a digital coupon and directions to the venue.

This solution also includes a feedback loop that monitors user behavior and adjusts future content delivery strategies accordingly. For example, if a user frequently arrives on time and takes advantage of the offered services, the system may offer increasingly personalized rewards, further strengthening the user's incentive to reserve charging slots and arrive punctually. Additionally, data collected from user interactions can be used to optimize the scheduling and availability of charging bays, ensuring that the station operates at peak efficiency. The system can integrate dynamic content delivery based on the user's immediate needs or preferences. For example, if the user has a history of watching specific types of content or using particular services, the system can tailor the complimentary offerings to align with those preferences, enhancing the perceived value of the reward and encouraging continued engagement with the reservation system.

Figure 8A:
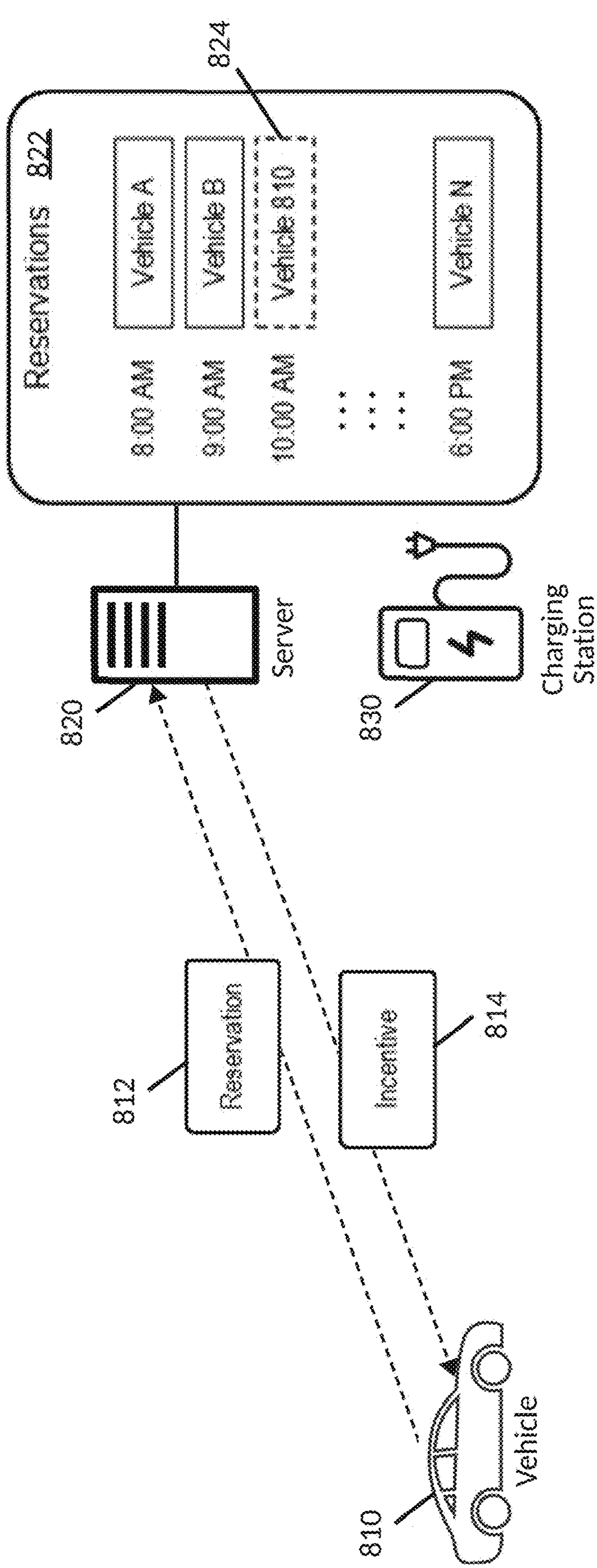
FIGS. 8A-8C are diagrams illustrating a process of reserving a time slot for a vehicle at a charging station and delivering an incentive to the vehicle upon timely arrival for the reserved time slot according to examples of the instant solution.
Figure 8B:
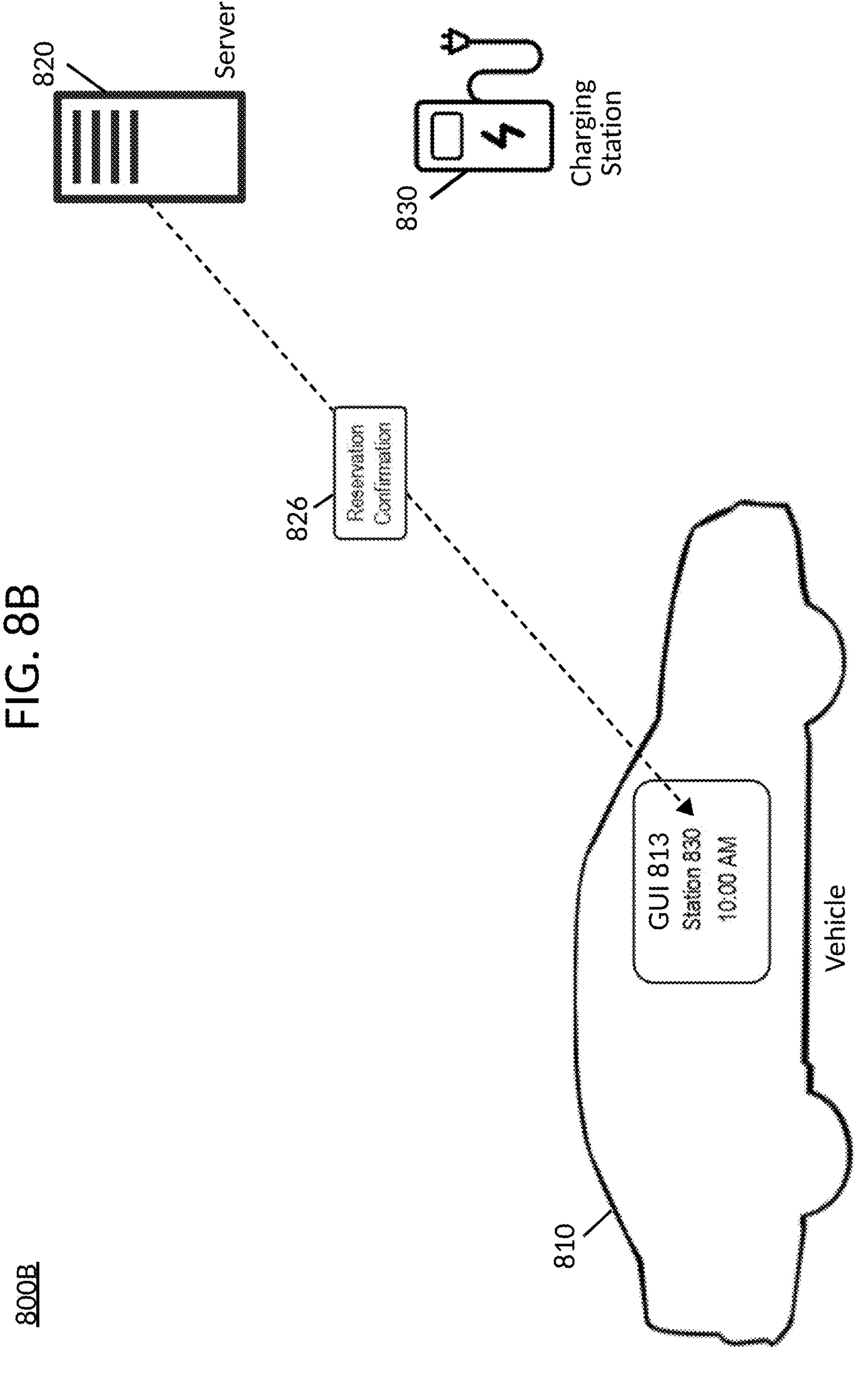

FIGS. 8A-8B illustrate a process of reserving a time slot for a vehicle at a charging station and delivering an incentive to the vehicle upon timely arrival for the reserved time slot according to examples of the instant solution. For example, FIG. 8A illustrates a process 800A of a server 820 assigning a reserved time slot to a vehicle 810 for performing a charging operation at a charging station 830 according to an example of the instant solution. Referring to FIG. 8A, the vehicle 810 may transmit a reservation request 812 to the server 820. The reservation request 812 may request a reservation at the charging station 830. In this case, the reservation request 812 may identify the charging station 830, the vehicle 810, an expected time of arrival, a current state of charge of the vehicle 810, a battery capacity, and the like.

In response, the server 820 may identify a time slot 824 which is the closest available time slot among a plurality of time slots to the expected time of arrival of the vehicle 810. Here, the server 820 may generate a list, record, etc. with reservations 822. The server 820 may add an identifier of the vehicle (e.g., VIN, user ID, etc.) to the time slot 824 within the list of reservations 822 thereby reserving the time slot 824 for the vehicle 810.

Furthermore, the server 820 may transmit a reservation confirmation 826 (shown in FIG. 8B) to a GUI 813 of the vehicle 810 which confirms the vehicle 810 has a reserved time slot and an identifier of the station where the slot is reserved. For example, FIG. 8B illustrates a process 800B of notifying the vehicle of the reservation. In this case, the GUI 813 may be a mobile device, a display device in the vehicle, or the like.

Referring again to FIG. 8A, in some embodiments, the server 820 may attempt to entice the vehicle 810 to arrive on time to the reservation. For example, the server 820 may determine an incentive 814 such as activation of a feature inside the vehicle, free Wi-Fi®, a free service, or the like, which the server 820 offers to provide to the vehicle 810 if the vehicle begins the charging operation on time (i.e., prior to or at the start of the time slot 824. The incentive 814 may be transmitted from the server 820 to the vehicle 810 thereby notifying the vehicle 810 of the incentive 814 for arriving on time.

Figure 8C:
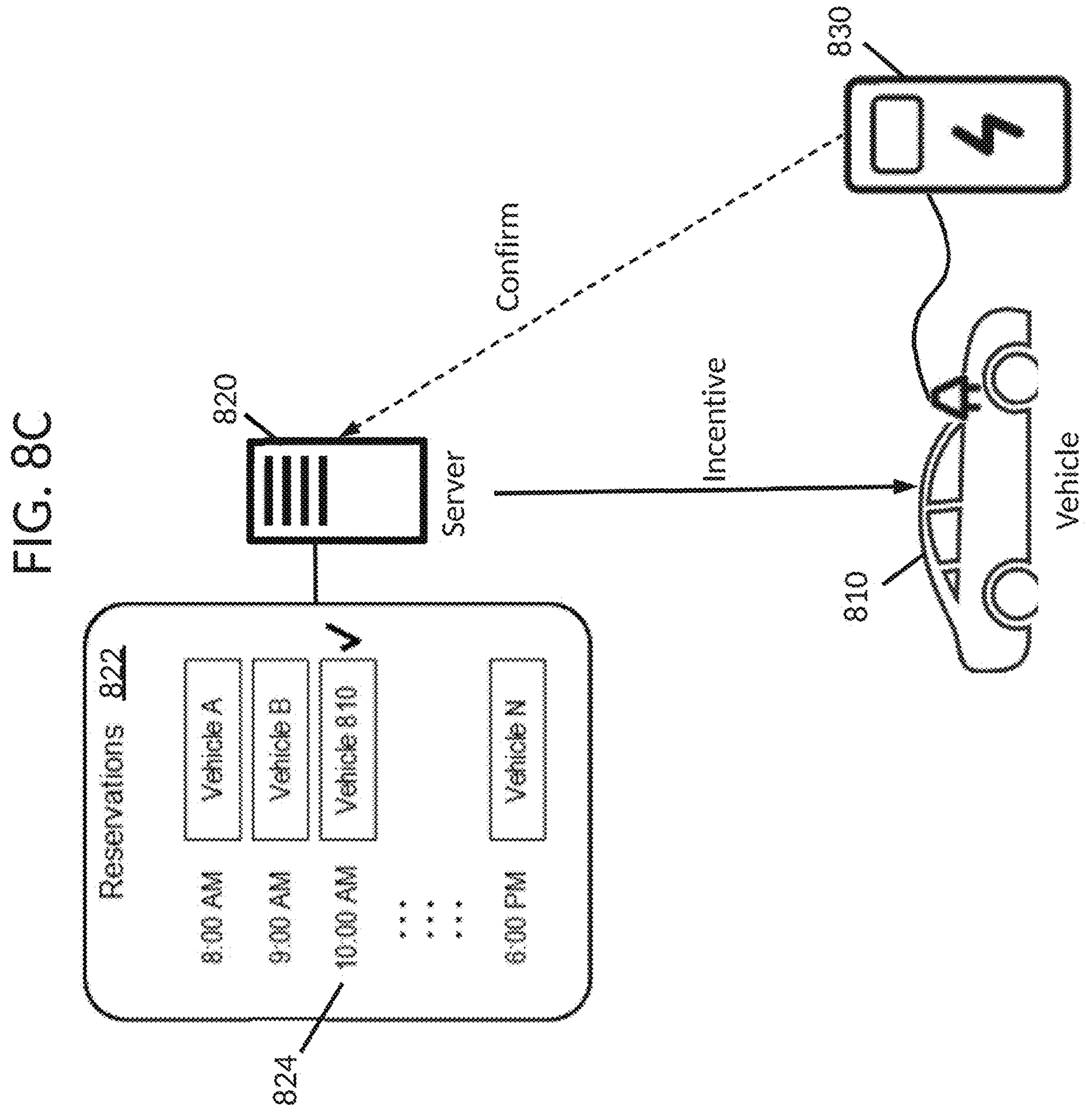

FIG. 8C illustrates a process 800C of detecting the arrival of the vehicle 810 to the charging station 830 "on time" and delivering content to the vehicle 810 in response to the on-time arrival. Referring to FIG. 8C, the vehicle 810 may connect/plug into the charging station 830 using a charging cable. In response, either the vehicle 810 or the charging station 830 may notify the server 820 that the charging operation has begun. The server 820 may identify the vehicle 810 from the notification and identify a time slot (e.g., the time lost 824) assigned to the vehicle in the list of reservations 822. Here, the server 820 may identify a current time from a system clock or use a timestamp included in the notification from the vehicle 810 or the charging station 830, and determine whether the vehicle 810 started the charging operation on time/early.

In response to confirming that the vehicle 810 is on time, the server 820 may deliver an incentive to the vehicle 810. For example, the incentive may be activation of a previously-installed feature on the vehicle 810. An example of this process is shown and described with respect to FIG. 1C, etc. As another example, the incentive may include free services, such as Wi-Fi®, or the like. As another example, the incentive may include free content such as movies, music, entertainment, news, and the like.

In some embodiments, the vehicle 810 may include multiple display devices (GUIs) which are capable of displaying the content from the server 820. In this example, the content that is delivered to the vehicle 810 may be delivered to a head unit, vehicle computer, or other centralized location within the vehicle 810. Here, the vehicle 810 may control which display device receives the content from among the multiple display devices. For example, the vehicle 810 may use sensor data to identify a location of an occupant (or multiple occupants) and deliver the content to a GUI that is nearest the occupant or multiple GUIs that are nearest the multiple occupants, respectively. In some embodiments, when delivering to multiple GUIs, the vehicle 810 may simultaneously output the content on multiple GUIs.

According to various additional embodiments, provide is a dynamic content delivery system that enhances the electric vehicle (EV) charging experience by providing real-time cost and queue data for upcoming charging stations (CSs) along a user's route. This embodiment focuses on delivering per/kWh pricing and additional contextual information, such as charging speed and queue length, enabling occupants to make informed decisions on where to charge the vehicle based on their preferences and needs.

For example, an occupant may input a destination into the vehicle's navigation system. In response, the system may calculate the most efficient route and identify potential charging stations along the way. Instead of merely listing the locations of these stations, the system may receive sensor data, queue data, message data, and the like, from the charging stations on an iterative basis which provides the system with up-do-date and real-time queue length waiting times and cost information. The system may deliver detailed, context-specific content to the vehicle which includes the per/kWh cost at each CS, wait times, benefits/incentives, and the like. This information allows the user to compare prices and choose the most cost-effective option that fits their schedule and charging needs. The system also provides additional parameters, such as the charging speed at each station. For example, faster charging stations may be more expensive per kWh, while slower stations offer lower costs. This allows users to weigh the trade-off between time and expense, choosing a station that aligns with their priorities—whether it's minimizing charging time or reducing costs.

The system may incorporate real-time data on the queue length at each charging station. If a particular CS has a shorter queue (shorter waiting time), the system may offer a lower per/kWh cost as an incentive to use that station, helping to balance demand and reduce congestion at more popular stations. This dynamic pricing model is presented to the user in a clear, accessible format, allowing them to select a station that best meets their criteria for cost, charging speed, and wait time. To further assist the user in making an informed decision, the system can provide recommendations based on the user's historical behavior and preferences. For example, if the user typically prioritizes lower costs over speed, the system might highlight slower, less expensive stations as the preferred options. Conversely, if the user frequently chooses the fastest charging options, the system may recommend stations with higher charging speeds, even if they come at a premium.

As the user approaches a selected charging station, the system continues to deliver relevant content. For example, it might notify the user of any changes in the queue length or pricing as they get closer, ensuring that the user has the most up-to-date information to avoid surprises upon arrival. Additionally, the system can provide real-time navigation adjustments if a more favorable charging option becomes available en route.

Figure 9A:
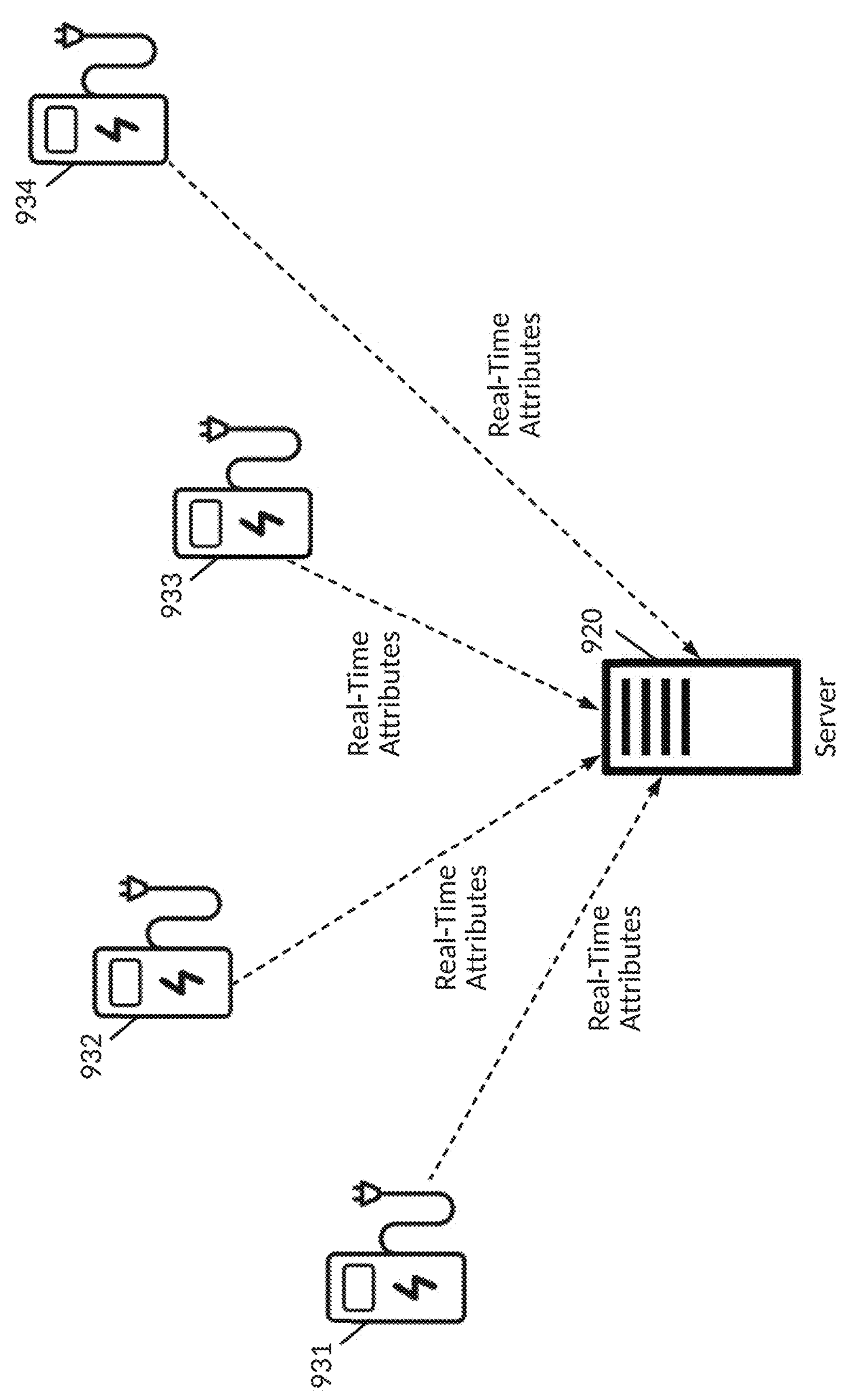
Figure 9C:
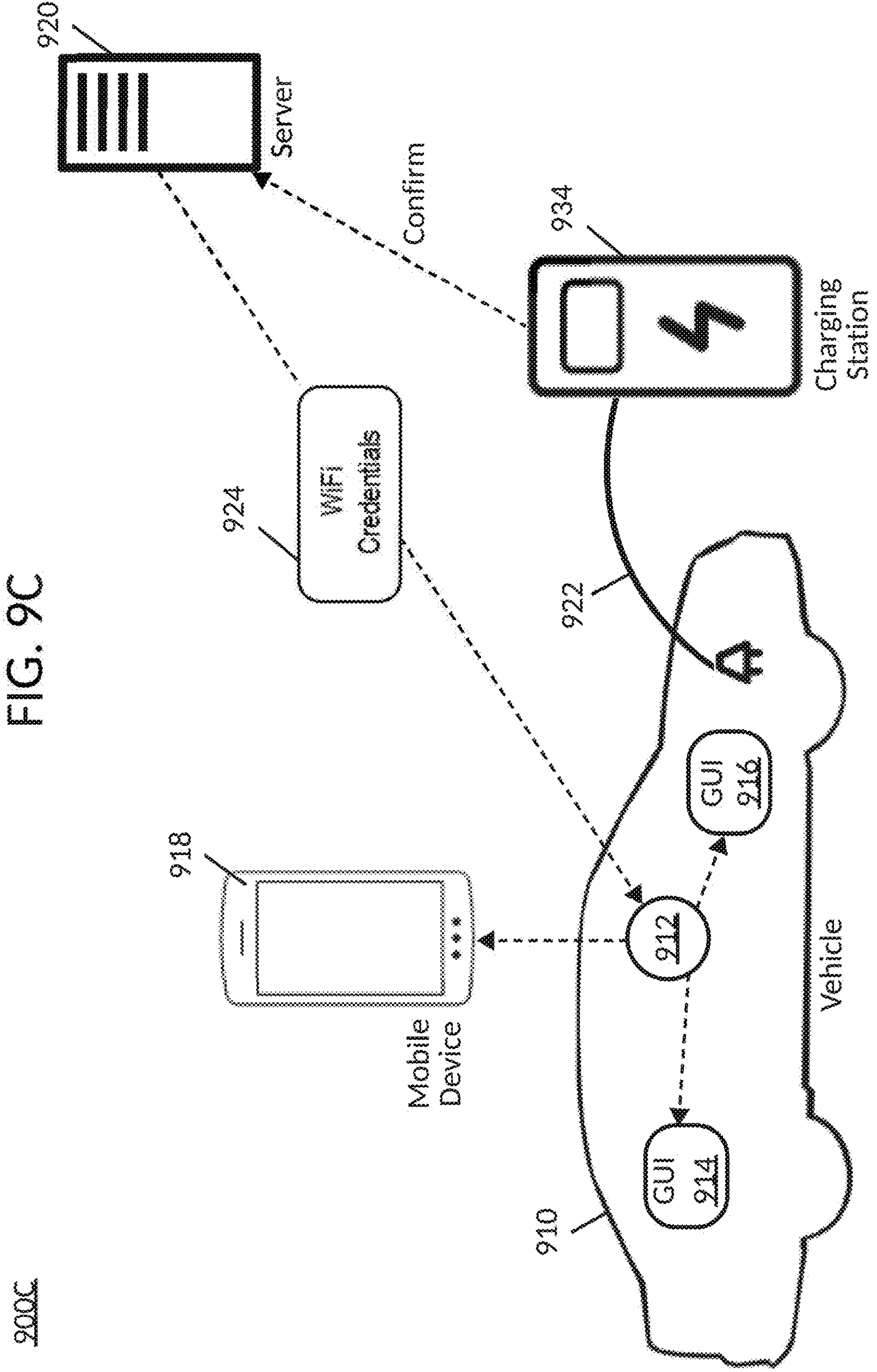

FIGS. 9A-9C illustrate a process of providing real-time visibility into charging station attributes according to examples of the instant solution. For example, FIG. 9A illustrates a process 900A of receiving real-time data from a plurality of charging stations according to an example of the instant solution. Referring to FIG. 9A, a server 920 may query a plurality of charging stations including, but not limited to, a charging station 931, a charging station 932, a charging station 933, and a charging station 934. In response, the charging stations may return real-time attributes such as sensor data (image data) showing availability or lines waiting to use the charging stations, current pricing data (e.g., per kwh), waiting times (e.g., minutes, etc.), and the like.

The data may be provided to the server 920 on an iterative/recurring basis. For example, the charging stations may provide updated messages with updated waiting times and cost data at a frequency of every 10 minutes, 15 minutes, 30 minutes, and the like. The server 920 may use this information to compare the different wait times and the costs at each of the different charging stations. In some embodiments, the server 920 may identify a charging station that has more availability (less wait time) and provide incentives to vehicles to use the charging station with more availability.

The messages may be hypertext transfer protocol (HTTP) messages that are transmitted from computing systems (such as servers, computing terminals, etc.) to the server 920. Here, the computing systems may be located at the charging stations and may be wired to the sensors and the queue data of the respective charging stations thereby obtaining the current data directly from the charging stations. The HTTP messages may include headers that identify the charging station and timestamps at when the messages are sent.

FIG. 9B illustrates a process 900B of generating a graphical user interface (GUI) 940 with the real-time attributes of the charging stations displayed along a route of a vehicle according to an example of the instant solution. Referring to FIG. 9B, the server 920 may detect a vehicle 910 travelling along a route 952 toward a destination 950. In this example, the server 920 may identify charging stations that are along the route 952 that the vehicle 910 is travelling toward the destination 950 and display a map on the GUI 940 which includes an identifier of a location of the charging stations and real-time attributes of the charging stations.

In this example, the charging station 931 (shown in FIG. 9A) is represented by a visual element 941 on the GUI 940, the charging station 932 is represented by a visual element 942 on the GUI 940, the charging station 933 is represented by a visual element 943 on the GUI 940, and the charging station 934 is represented by a visual element 944 on the GUI 940. Each of the visual elements including the visual element 941, the visual element 942, the visual element 943, and the visual element 944 include current real-time attributes for cost and wait times at the respective charging stations enabling a user of the vehicle 910 to quickly view the GUI 940 and understand which charging station is the fastest for charging, which charging station is the cheapest, etc. In this example, the charging station 934 corresponding to the visual element 944 on the GUI 940 corresponds to a fastest charging station among the charging stations on the route 952 of the vehicle 910.

In some embodiments, the visual elements may include current pricing attributes, current wait times, current charging speeds (e.g., average time a vehicle is charged, etc.), and the like. The server 920 may display the visual elements on the map within the GUI 940 to correspond to the actual locations of the corresponding charging stations in the physical world thus showing the occupant both the real-time attributes and the locations of the respective charging stations along the route 952. The occupant may use a cursor, finger, etc. to enter commands via the GUI 940. For example, the occupant may touch a visual element on the GUI 940 to select the corresponding charging station. In response, the server 920 may display routing instructions to the charging station.

In some embodiments, the vehicle 910 may be an autonomous vehicle. In this case, when the occupant touches the visual element, via the GUI, the vehicle 910 may automatically maneuver to the charging station that corresponds to the visual element. For example, the vehicle 910 may interact with an ADAS system of the vehicle 910, sensors on the vehicle 910, and the like, to autonomously maneuver the vehicle 910 to the charging station in response to the touch input on the GUI 940.

In some embodiments, the server 920 may also incentivize an occupant to visit a particular charging station among the plurality of charging stations such as a charging station that has a queue length below a threshold. Here, the threshold may be a particular maximum allowed wait time (e.g., no wait time, 5 minutes, 15 minutes, etc.) If the wait time at the charging station is less than the threshold, the server 920 may generate an incentive for the vehicle 910 to use the charging station. For example, the server 920 may generate an incentive such as a free service (e.g., free Wi-Fi®, etc.) and offer the free service to the vehicle 910 in response to the vehicle 910 performing a charging operation at a particular charging station. In the example of FIG. 9B, the server 920 may offer an incentive 945 to the vehicle 910 and display the incentive 945 on the GUI 940. Here, the incentive 945 is displayed along with the real-time attributes of the corresponding charging station thereby informing the occupant/viewer that the incentive 945 corresponds to the charging station at that location on the map. The server 920 may also monitor the vehicle 910 to determine if the vehicle 910 performs the charging operation at the corresponding charging station.

In some embodiments, the server 920 may generate a code, such as a QR code or the like with the current price value of a charging station encoded therein and display the code on the GUI 940. The code may be used by the occupant to show the charging station when it gets to the charging station to prove the price provided to the occupant from the server 920. In some embodiments, the code may be output to a mobile device of the occupant and used through the mobile device, for example, through a scanning operation at the charging station, etc.

For example, FIG. 9C illustrates a process 900C of detecting the vehicle 910 performing a charging operation at the charging station 934, and providing the incentive to the vehicle 910 in response according to an example of the instant solution. Referring to FIG. 9C, the vehicle 910 may travel to the charging station 934 corresponding to the incentive 945 shown on the GUI 940 in FIG. 9B and begin a charging operation with the charging station 934. Here, a cable 922 may be plugged into the vehicle 910. In response, the charging station 934 may notify the server 920, or otherwise confirm, that the vehicle 910 is performing the charging operation at the charging station 934.

In response, the server 920 may deliver a complimentary service to the vehicle 910 while the vehicle 910 is performing the charging operation. For example, the server 920 may provide free Wi-Fi® connection to the vehicle 910 and its devices. The server 920 may generate credentials 924 for accessing the Wi-Fi® connection and deliver the credentials 924 to a display device of the vehicle. In this example, the server 920 may deliver the credentials 924 to a computer 912 within the vehicle. The vehicle 910 may control which devices connect to the Wi-Fi® connection using the credentials 924. For example, the vehicle 910 may connect at least one of a display device within a head rest having a GUI 914, a head unit device with a GUI 916, and a mobile device 918 using the credentials 924. When the charging operation is terminated, the server 920 may disable the credentials 924 so that the Wi-Fi® experience is over.

Although an example of at least one of a system, method, and non-transitory computer-readable storage medium has been illustrated in the accompanied drawings and described in the foregoing detailed description, it will be understood that the application is not limited to the examples of the instant solution disclosed, but is capable of numerous rearrangements, modifications, and substitutions as set forth and defined by the following claims. For example, the system's capabilities of the various figures can be performed by one or more of the modules or components described herein or in a distributed architecture and may include a transmitter, receiver, or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of a data network, the Internet, a voice network, an Internet Protocol network, a wireless device, a wired device, and/or via a plurality of protocols. Also, the messages sent or received by any of the modules may be sent or received directly and/or via one or more of the other modules.

One skilled in the art will appreciate that a "system" may be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many examples of the instant solution. Indeed, methods, systems and apparatuses disclosed herein may be implemented in localized and distributed forms consistent with computing technology.

It should be noted that some of the system features described in this specification have been presented as modules to emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field-programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations that, when joined logically together, comprise the module and achieve the stated purpose for the module. Further, modules may be stored on a computer-readable storage medium, which may be, for instance, a hard disk drive, flash device, random access memory (RAM), tape, or any other such medium used to store data.

Indeed, a module of executable code may be a single instruction or many instructions and may even be distributed over several different code segments, among different programs, and across several memory devices. Similarly, operational data may be identified and illustrated within modules and embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the examples of the instant solution is not intended to limit the scope of the application as claimed but is merely representative of selected examples of the instant solution of the application.

One having ordinary skill in the art will readily understand that the above may be practiced with steps in a different order and/or with hardware elements in configurations that are different from those which are disclosed. Therefore, although the application has been described based upon these preferred examples of the instant solution, it would be apparent to those of skill in the art that certain modifications, variations, and alternate constructions would be apparent.

While preferred examples of the instant solution of the present application have been described, it is to be understood that the examples of the instant solution described are illustrative only and the scope of the application is to be defined solely by the appended claims when considered with a full range of equivalents and modifications (e.g., protocols, hardware devices, software platforms etc.) thereto.

What is claimed is:

1. A method comprising:

receiving a request for charge from a vehicle from a software application on the vehicle, where the request comprises an identifier of a destination of the vehicle and a state of charge (SOC) of the vehicle;

determining a charging time for the vehicle at a charging station based on the SOC;

dynamically selecting content from among a database of content based on the destination and the charging time;

detecting the vehicle performing a charging operation at the charging station; and delivering the dynamically selected content to a graphical user interface (GUI) of the software application while the vehicle is performing the charging operation.

2. The method of claim 1, comprising detecting the vehicle providing charge to the charging station and dynamically activating a previously-installed feature on the vehicle in response to the vehicle providing the charge to the charging station.

3. The method of claim 1, comprising dynamically playing content on the GUI of the software application of the vehicle while the vehicle receives charge from the charging station, detecting the vehicle disconnecting from the charging station at a point in time before the dynamically selected content is finished playing, generating an access code for continuing play of the dynamically selected content from the point in time, and outputting the access code to the GUI of the software application.

4. The method of claim 1, wherein the dynamically selecting comprises dynamically selecting at least one of news content, entertainment content, and merchant content associated with the destination comprising a playing time that is at least as long as the charging time for the vehicle.

5. The method of claim 1, wherein the delivering comprises simultaneously delivering additional content to a mobile device of an occupant of the vehicle while delivering the dynamically selected content to the GUI of the software application.

6. The method of claim 1, comprising detecting the vehicle waiting in line at the charging station prior to detecting the vehicle performing the charging operation, and delivering initial content to the GUI of the software application while the vehicle is waiting in line at the charging station.

7. The method of claim 1, comprising receiving previously viewed content from a plurality of display devices on the vehicle and dynamically selecting a display device from among the plurality of display devices within the vehicle based on the previously viewed content, wherein the delivering comprises delivering the dynamically selected content to the dynamically selected display device.

8. The method of claim 1, wherein the vehicle comprises a plurality of display devices, and the method comprises determining a location of an occupant within the vehicle, and controlling, by the vehicle, the content to be displayed on a display device from among the plurality of display devices and audio to be played via at least one speaker from among a plurality of speakers based on at least one of the location of the occupant within the vehicle or a profile of the occupant.

9. A system, comprising:

a memory; and at least one processor communicably coupled to the memory, the at least one processor configured to:

receive a request for charge from a vehicle from a software application on the vehicle, where the request comprises an identifier of a destination of the vehicle and a state of charge (SOC) of the vehicle, determine a charging time for the vehicle at a charging station based on the SOC, dynamically select content from among a database of content based on the destination and the charging time, detect the vehicle performing a charging operation at the charging station, and deliver the dynamically selected content to a graphical user interface (GUI) of the software application while the vehicle is performing the charging operation.

10. The system of claim 9, wherein the at least one processor is configured to detect the vehicle providing charge to the charging station and dynamically activate a previously-installed feature on the vehicle in response to the vehicle providing the charge to the charging station.

11. The system of claim 9, wherein the at least one processor is configured to dynamically play content on the GUI of the software application of the vehicle while the vehicle receives charge from the charging station, detect the vehicle disconnecting from the charging station at a point in time before the dynamically selected content is finished playing, generate an access code for continuing play of the dynamically selected content from the point in time, and output the access code to the GUI of the software application.

12. The system of claim 9, wherein the at least one processor is configured to dynamically select at least one of news content, entertainment content, and merchant content associated with the destination which comprises a playing time that is at least as long as the charging time for the vehicle.

13. The system of claim 9, wherein the at least one processor is configured to simultaneously deliver additional content to a mobile device of an occupant of the vehicle while delivering the dynamically selected content to the GUI of the software application.

14. The system of claim 9, wherein the at least one processor is configured to detect the vehicle waiting in line at the charging station prior to detecting the vehicle performing the charging operation, and deliver initial content to the GUI of the software application while the vehicle is waiting in line at the charging station.

15. The system of claim 9, wherein the at least one processor is configured to receive previously viewed content from a plurality of display devices on the vehicle, dynamically select a display device from among the plurality of display devices within the vehicle based on the previously viewed content, and deliver the dynamically selected content to the dynamically selected display device.

16. The system of claim 9, wherein the vehicle comprises a plurality of display devices and determines a location of an occupant within the vehicle, and controls the content to be displayed on a display device from among the plurality of display devices and audio to be played via at least one speaker from among a plurality of speakers based on at least one of the location of the occupant within the vehicle or a profile of the occupant.

17. A non-transitory computer-readable storage medium comprising instructions, that when read by a processor, cause the processor to perform:

receiving a request for charge from a vehicle from a software application on the vehicle, where the request comprises an identifier of a destination of the vehicle and a state of charge (SOC) of the vehicle;

determining a charging time for the vehicle at a charging station based on the SOC;

dynamically selecting content from among a database of content based on the destination and the charging time;

detecting the vehicle performing a charging operation at the charging station; and delivering the dynamically selected content to a graphical user interface (GUI) of the software application while the vehicle is performing the charging operation.

18. The non-transitory computer-readable storage medium of claim 17, wherein the processor is configured to perform detecting the vehicle providing charge to the charging station and dynamically activating a previously-installed feature on the vehicle in response to the vehicle providing the charge to the charging station.

19. The non-transitory computer-readable storage medium of claim 17, wherein the processor is configured to perform dynamically playing content on the GUI of the software application of the vehicle while the vehicle receives charge from the charging station, detecting the vehicle disconnecting from the charging station at a point in time before the dynamically selected content is finished playing, generating an access code for continuing play of the dynamically selected content from the point in time, and outputting the access code to the GUI of the software application.

20. The non-transitory computer-readable storage medium of claim 17, wherein the dynamically selecting comprises dynamically selecting at least one of news content, entertainment content, and merchant content associated with the destination comprising a playing time that is at least as long as the charging time for the vehicle.

* * * * *